(12) United States Patent
Doan et al.

(10) Patent No.: US 7,292,255 B2
(45) Date of Patent: Nov. 6, 2007

(54) IMAGE DATA ACQUISITION OPTIMISATION

(75) Inventors: Khanh Phi Van Doan, Ryde (AU); Ian Geoffrey Combes, Roselands (AU)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 09/863,405

(22) Filed: May 24, 2001

(65) Prior Publication Data

US 2002/0027563 A1  Mar. 7, 2002

(30) Foreign Application Priority Data

May 31, 2000 (AU) .................... PQ7862
May 31, 2000 (AU) .................... PQ7866
May 31, 2000 (AU) .................... PQ7868

(51) Int. Cl.
*G09G 5/00* (2006.01)
*G09G 5/10* (2006.01)
*G06K 9/36* (2006.01)
*G06K 9/46* (2006.01)
*G06T 11/20* (2006.01)

(52) U.S. Cl. .............. 345/629; 345/630; 345/648; 345/589; 345/590; 345/592; 345/440; 345/441; 382/240; 382/284

(58) Field of Classification Search ............. 345/440, 345/420, 421, 629, 619, 648, 630, 589–592, 345/441; 382/284, 240
See application file for complete search history.

(56) References Cited

U.S. PATENT DOCUMENTS 5,745,121 A * 4/1998 Politis .................. 345/619

6,014,147 A * 1/2000 Politis et al. ............... 345/620

(Continued)

FOREIGN PATENT DOCUMENTS

AU  767293  12/2001

OTHER PUBLICATIONS

Charles R. Dyer, et al., "Region Representation: Boundary Codes from Quadtrees", Communications of the ACM, Mar. 1980, vol. 23, No. 3, pp. 171-179.*

(Continued)

*Primary Examiner*—Jin-Cheng Wang
(74) *Attorney, Agent, or Firm*—Fitzpatrick, Cella, Harper & Scinto

(57) ABSTRACT

A method of creating an image is disclosed. The image is formed by rendering at least a plurality of graphical objects to be composited according to a first hierarchical structure (eg. 4500) representing a compositing expression for the image. The first hierarchical structure (4500) includes a plurality of nodes each representing at least a component of the image or an operation for combining sub-expressions of the compositing expression. The method stores a second hierarchical structure (300) for at least one node of the first hierarchical structure (4500). The second hierarchical structure (300) indicates at least an unobscured region of an object associated with the node. A space in which the object is defined is partitioned into a plurality of regions. The second hierarchical structure (300) is then overlayed on the object such that the object is substantially encompassed within the second hierarchical structure (300) and the overlayed second hierarchical structure (300) is traversed to identify any of the plurality of regions which include at least a portion of the unobscured region. Finally, the image is created by rendering the identified regions.

54 Claims, 39 Drawing Sheets

U.S. PATENT DOCUMENTS 6,191,797 B1 *  2/2001  Politis .................. 345/440
6,466,696 B1 * 10/2002  Politis .................. 382/226
6,795,589 B1 *  9/2004  Tlaskal et al. .......... 382/284

OTHER PUBLICATIONS

Hanan Samet, "The Quadtree and Related Hierarchical Data Structures", Computing Surveys, Jun. 1984, vol. 16, No. 2, pp. 187-260.*

Michael B. Dillencourt, Hannan Samet, "A General Approach to Connected-Component Labeling for Arbitrary Image Representations", Journal of the Assoc. for Comp. Mach., vol. 39, No. 2, Apr. 1992, pp. 253-280.*

Hanan Samet, "Data Structures for Quadtree Approximation and Compression", Communications of the ACM, Sep. 1985, vol. 28, No. 9, pp. 973-993.*

* cited by examiner

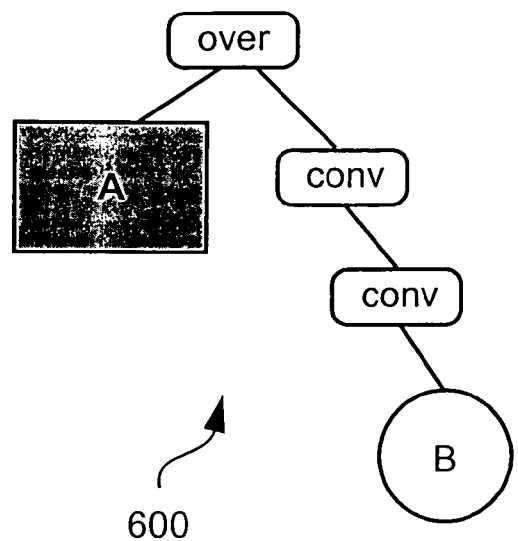 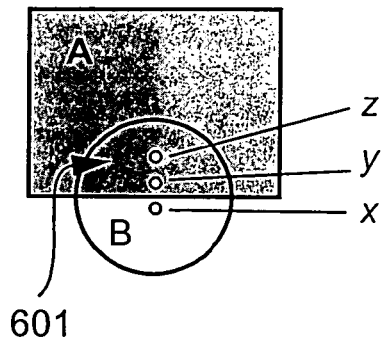
Fig. 6(a)　　　　　Fig. 6(b)
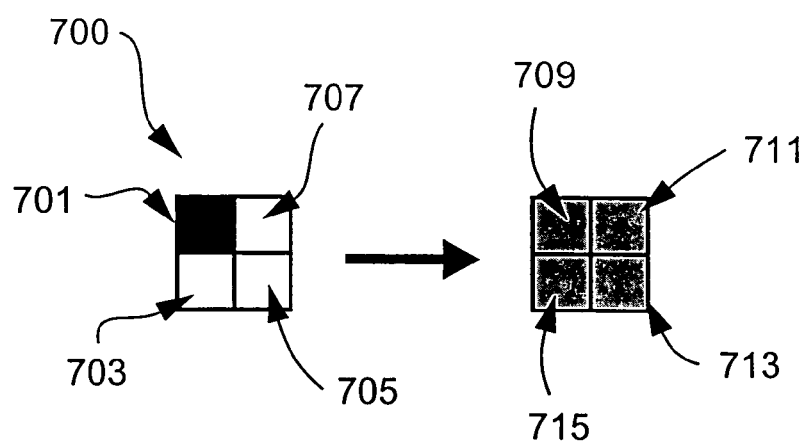
Fig. 7

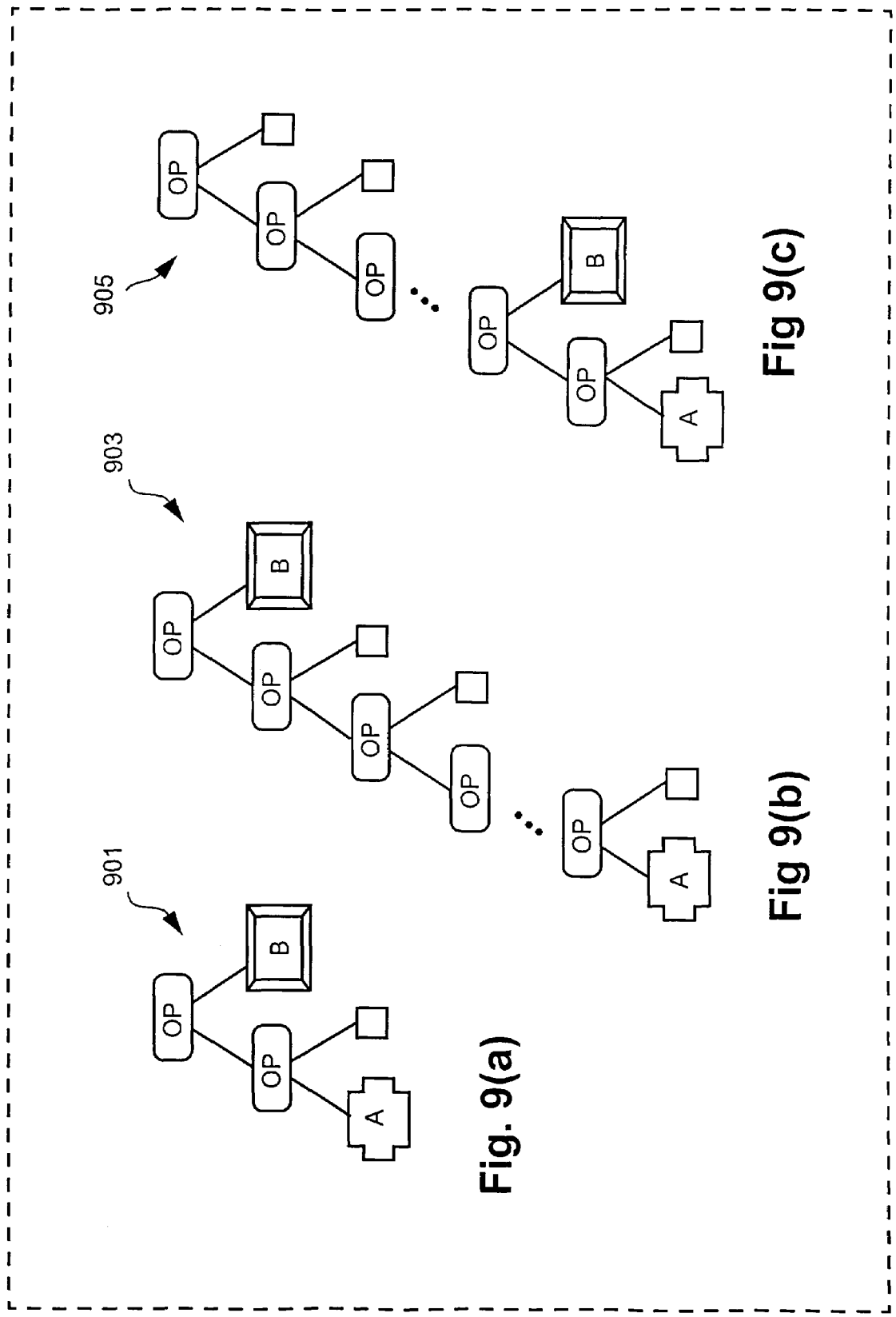

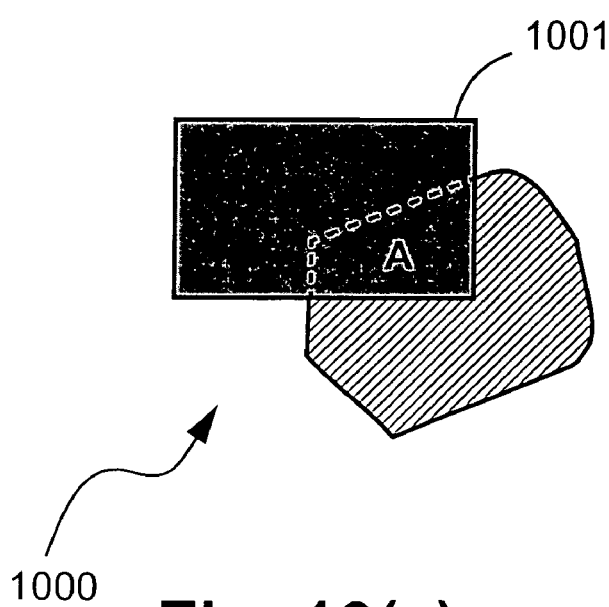
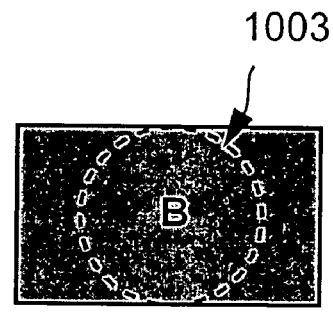
Fig. 10(a)  Fig. 10(b)
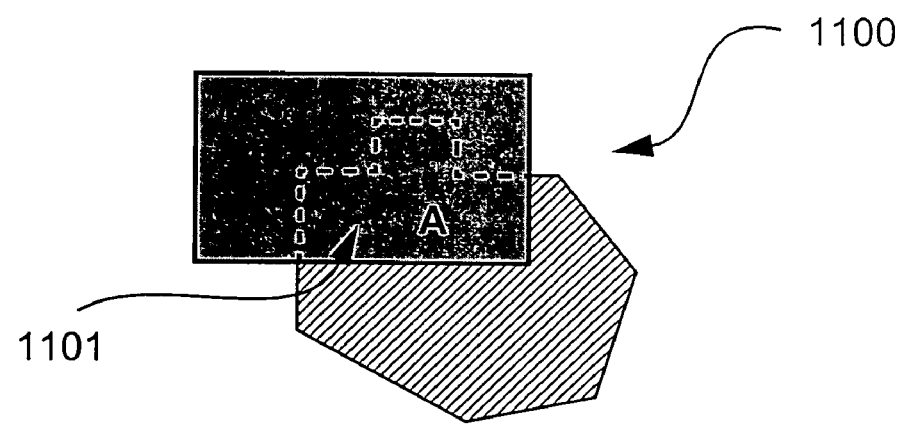
Fig. 11

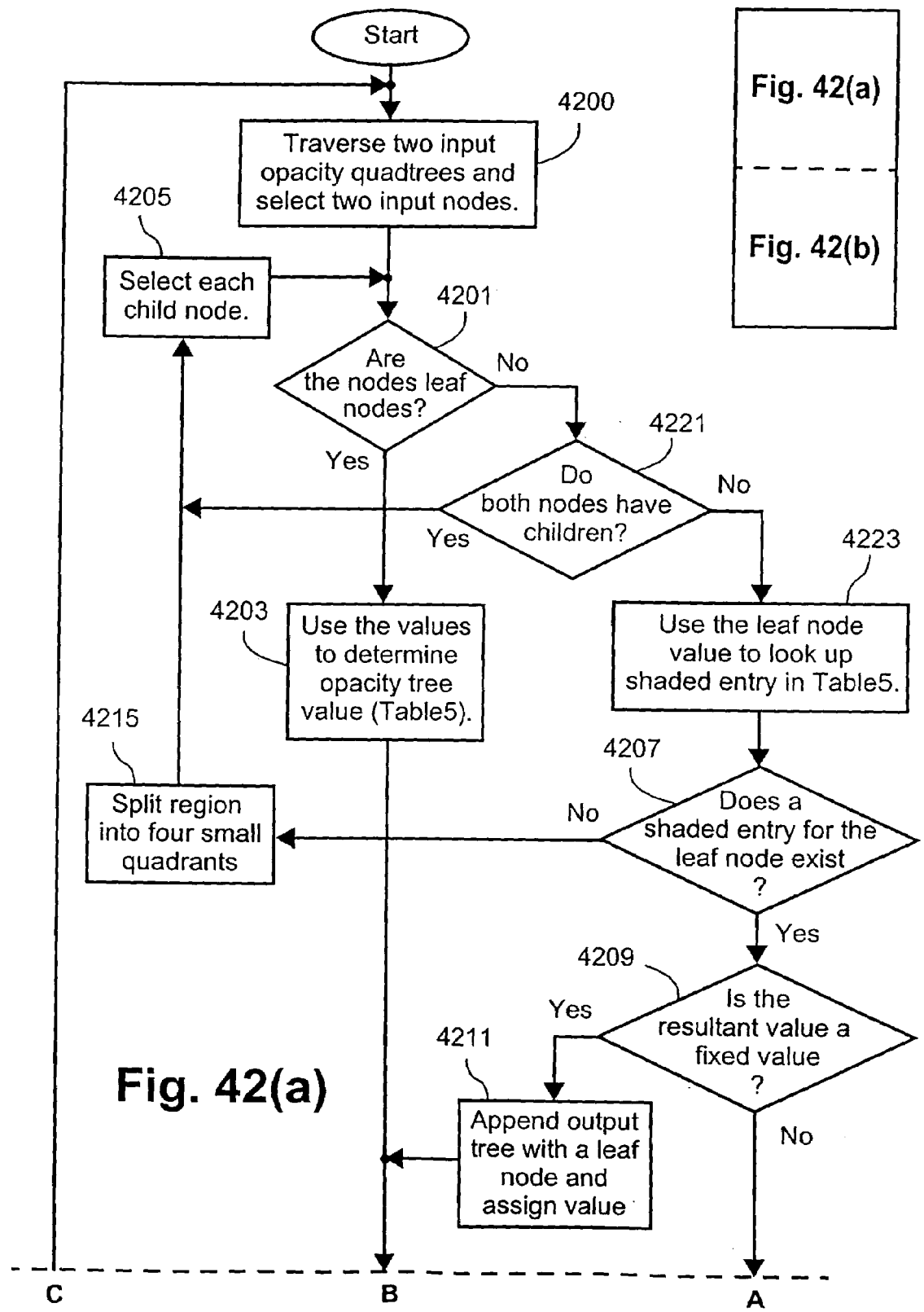

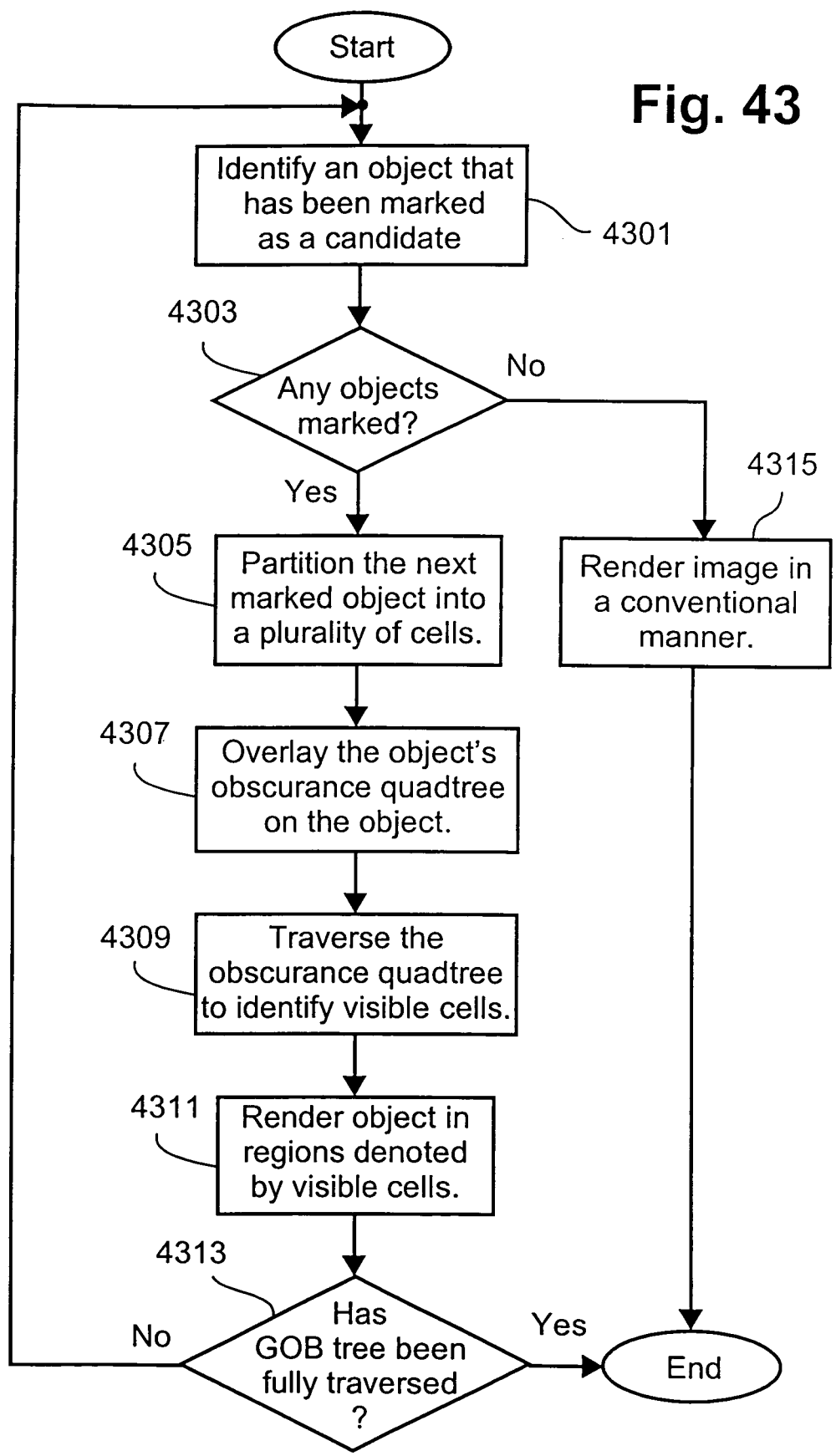

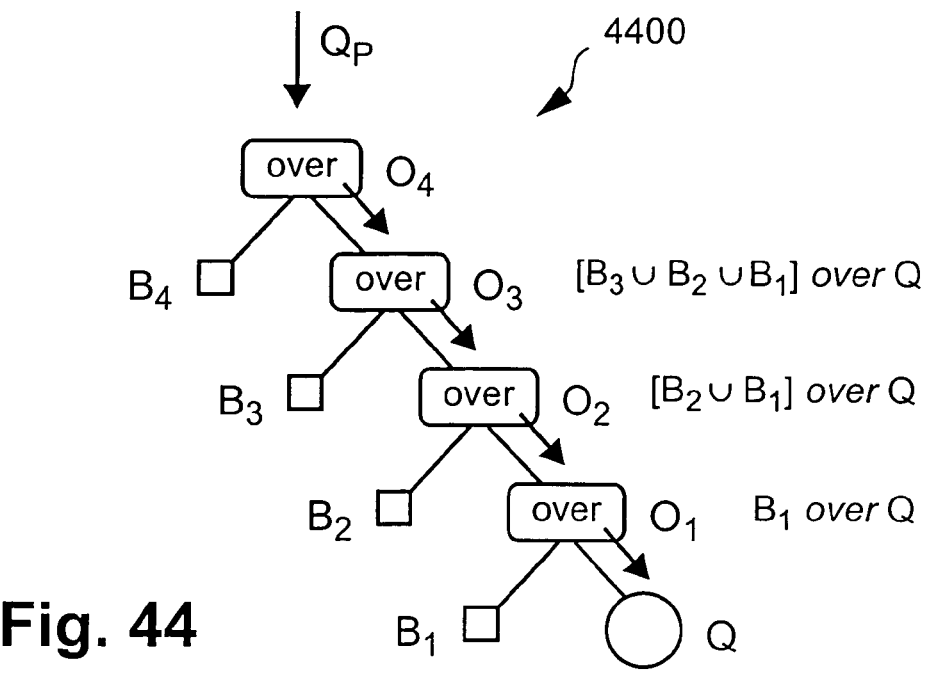
Fig. 44
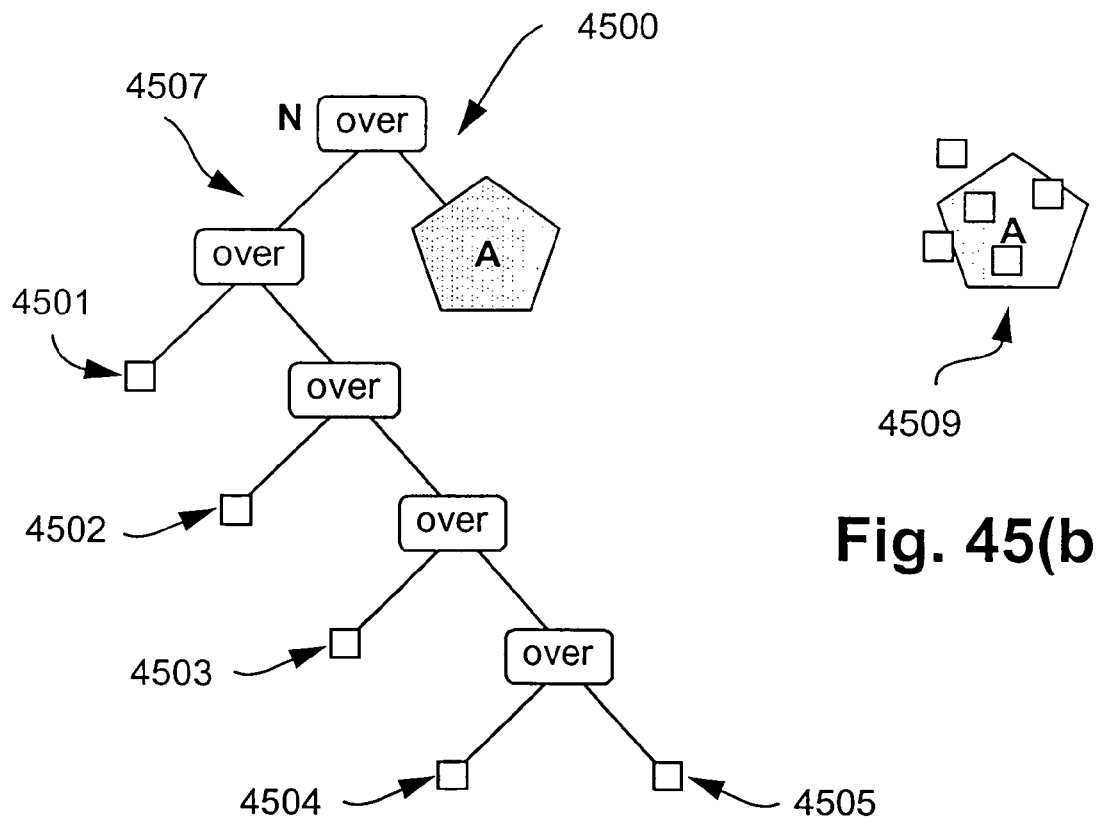
Fig. 45(b)
Fig. 45(a)

IMAGE DATA ACQUISITION OPTIMISATION

TECHNICAL FIELD OF THE INVENTION

The present invention relates generally to the creation of computer-generated images and, in particular, to a method and apparatus for creating an image formed by compositing multiple components. The invention also relates to a computer program product including a computer readable medium having recorded thereon a computer program for apparatus for creating an image made up by compositing multiple components.

BACKGROUND ART

Computer generated images are typically made up of many differing components or graphical objects which are rendered and composited together to create a final image. In recent times, an "opacity channel" (also known as a "matte", an "alpha channel", or simply "opacity") has been commonly used. The opacity channel contains information regarding the transparent nature of each object. The opacity channel is stored alongside each instance of a colour, so that, for example, a pixel-based image with opacity stores an opacity value as part of the representation of each pixel. An object without explicit opacity channel information is typically understood to be fully opaque within some defined bounds of the object, and assumed to be completely transparent outside those bounds.

A Graphic Object Tree (hereinafter "GOB tree") offers a systematic means for representing an image in terms of its constituent objects and which facilitates later rendering. GOB trees typically comprise a plurality of nodes including leaf nodes, unary nodes and binary nodes. Nodes of higher degree, or of alternative definition may also be used. A leaf node, being the outer most node of a GOB tree, has no descendent nodes and represents a primitive constituent of an image. Unary nodes represent an operation which modifies the pixel data coming out of the part of the tree below the unary operator. Unary nodes include such operations as colour conversions, convolutions (blurring etc) and operations such as red-eye removal. A binary node typically branches to left and right subtrees, wherein each subtree is itself a GOB tree comprising at least one leaf node. Binary nodes represent an operation which combines the pixel data of its two children to form a single result. For example, a binary node may be one of the standard "compositing operators" such as OVER, IN, OUT, ATOP and alpha-XOR, examples of which and other are seen in FIG. 30.

Several of the above types of nodes may be combined to form a GOB tree. An example of this is shown in FIG. 31. The result of the left-hand side of the GOB tree may be interpreted as a colour converted first image being clipped to spline boundaries defined by a path. This construct is composited with a second image.

Although the non-transparent area of a graphical object may of-itself be of a certain size, it need not be entirely visible in a final image, or only a portion of the object may have an effect on the final image. For example, assume an image of a certain size is to be rendered on a display. If the image is positioned so that only the top left corner of the image is displayed by the display device, the remainder of the image is not displayed. The final image as displayed on the display device thus comprises the visible portion of the image, and the invisible portion in such a case need not be rendered.

Another way in which only a portion of an object may have an effect is when the portion is obscured by another object. For example, a final image to be displayed (or rendered) may comprise one or more opaque graphical objects, some of which obscure other graphical objects. Hence, the obscured objects have no effect on the final image.

Conventionally, Raster Image Processor (RIP) modules have been utilised to process and render graphical images. The performance of an RIP can be affected by a number of factors including the volume of pixel data processed, the rendering resolution, which is related to the volume of data processed, the complexity of the rendering task, and the efficiency of the methods employed by the RIP. A number of these factors are outside the control of the RIP (e.g. rendering resolution, complexity). Whilst the volume of data processed by the RIP is very much affected by such factors as rendering resolution and job complexity, there is a minimum volume of data, particularly input pixel data, that must be processed in order to produce the required output image. Each pixel in the output image is derived from a specific source or sources. A pixel may be internally generated, or it may be the product of one or more input images used in the render.

An ideal RIP would only process or generate data which contributes to the final rendered image meaning that all computing resources are being efficiently utilised. However, no RIP is ideal. The performance of most RIPs is compromised by redundant or repetitive processing of data.

Many conventional RIP modules render an object by compositing every pixel within the object's bounding box unless the object is known to be fully opaque and occupies the whole bounding box. This often involves much unnecessary work since objects with irregular boundary outlines must first be padded with transparent pixels out to their bounding boxes, after which the padded pixels have to undergo the fall compositing operation.

DISCLOSURE OF THE INVENTION

It is an object of the present invention to substantially overcome, or at least ameliorate, one or more disadvantages of existing arrangements.

According to one aspect of the present invention there is provided a method of creating an image, said image being formed by rendering at least a plurality of graphical objects to be composited according to a first hierarchical structure representing a compositing expression for said image, said first hierarchical structure including a plurality of nodes each representing at least a component of said image or an operation for combining sub-expressions of said compositing expression, said method comprising the steps of:

storing a second hierarchical structure for at least one node of said first hierarchical structure, said second hierarchical structure indicating at least an unobscured region of an object associated with said node;

partitioning a space in which said object is defined into a plurality of regions;

overlaying said second hierarchical structure on said object such that said object is substantially encompassed within said second hierarchical structure;

traversing said overlayed second hierarchical structure to identify any of said plurality of regions which include at least a portion of said unobscured region; and creating said image by rendering said identified regions.

According to another aspect of the present invention there is provided a method of creating an image, said image being formed by rendering at least a plurality of graphical objects to be composited according to a first hierarchical structure representing a compositing expression for said image, said first hierarchical structure including a plurality of nodes each representing at least a component of said image or an operation for combining sub-expressions of said compositing expression, said method comprising the steps of:

storing a second hierarchical structure for at least one node of said first hierarchical structure, said second hierarchical structure indicating at least an unobscured region of an object associated with said node;

traversing said overlayed first hierarchical structure to detect said node including said second hierarchical structure;

partitioning a space in which said object is defined into a plurality of regions upon detecting said node;

overlaying said second hierarchical structure on said object such that said object is substantially encompassed within said second hierarchical structure;

traversing said second hierarchical structure to identify any of said plurality of regions which include at least a portion of said unobscured region; and creating said image by rendering said identified regions.

According to still another aspect of the present invention there is provided an apparatus for creating an image, said image being formed by rendering at least a plurality of graphical objects to be composited according to a first hierarchical structure representing a compositing expression for said image, said first hierarchical structure including a plurality of nodes each representing at least a component of said image or an operation for combining sub-expressions of said compositing expression, said apparatus comprising:

storage means for storing a second hierarchical structure for at least one node of said first hierarchical structure, said second hierarchical structure indicating at least an unobscured region of an object associated with said node;

partitioning means for partitioning a space in which said object is defined into a plurality of regions;

overlaying means for overlaying said second hierarchical structure on said object such that said object is substantially encompassed within said second hierarchical structure;

traversing means for traversing said overlayed second hierarchical structure to identify any of said plurality of regions which include at least a portion of said unobscured region; and image creating means for creating said image by rendering said identified regions.

According to still another aspect of the present invention there is provided an apparatus for creating an image, said image being formed by rendering at least a plurality of graphical objects to be composited according to a first hierarchical structure representing a compositing expression for said image, said first hierarchical structure including a plurality of nodes each representing at least a component of said image or an operation for combining sub-expressions of said compositing expression, said apparatus comprising:

storage means for storing a second hierarchical structure for at least one node of said first hierarchical structure, said second hierarchical structure indicating at least an unobscured region of an object associated with said node;

first traversing means for traversing said overlayed first hierarchical structure to detect said node including said second hierarchical structure;

partitioning means for partitioning a space in which said object is defined into a plurality of regions upon detecting said node;

overlaying means for overlaying said second hierarchical structure on said object such that said object is substantially encompassed within said second hierarchical structure;

second traversing means for traversing said second hierarchical structure to identify any of said plurality of regions which include at least a portion of said unobscured region; and image creating means for creating said image by rendering said identified regions.

According to still another aspect of the present invention there is provided A computer program for a computer comprising software code portions for performing a method of creating an image, said image being formed by rendering at least a plurality of graphical objects to be composited according to a first hierarchical structure representing a compositing expression for said image, said first hierarchical structure including a plurality of nodes each representing at least a component of said image or an operation for combining sub-expressions of said compositing expression, said program comprising:

code for storing a second hierarchical structure for at least one node of said first hierarchical structure, said second hierarchical structure indicating at least an unobscured region of an object associated with said node;

code for partitioning a space in which said object is defined into a plurality of regions;

code for overlaying said second hierarchical structure on said object such that said object is substantially encompassed within said second hierarchical structure;

code for traversing said overlayed second hierarchical structure to identify any of said plurality of regions which include at least a portion of said unobscured region; and code for creating said image by rendering said identified regions.

According to still another aspect of the present invention there is provided a computer readable medium storing a computer program, wherein said computer program comprises software code portions for performing a method of creating an image, said image being formed by rendering at least a plurality of graphical objects to be composited according to a first hierarchical structure representing a compositing expression for said image, said first hierarchical structure including a plurality of nodes each representing at least a component of said image or an operation for combining sub-expressions of said compositing expression, said program comprising:

code for storing a second hierarchical structure for at least one node of said first hierarchical structure, said second hierarchical structure indicating at least an unobscured region of an object associated with said node;

code for partitioning a space in which said object is defined into a plurality of regions;

code for overlaying said second hierarchical structure on said object such that said object is substantially encompassed within said second hierarchical structure;

code for traversing said overlayed second hierarchical structure to identify any of said plurality of regions which include at least a portion of said unobscured region; and code for creating said image by rendering said identified regions.

According to still another aspect of the present invention there is provided a method for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the method comprising the steps of:

performing a first traversal of said tree to determine opacity information for each node of said tree, wherein said opacity information represents combined opacity for a node based on regions associated with the node; and optimising said expression tree by performing a second traversal of said tree to determine obscurance information for each node of said tree using said opacity information, wherein said obscurance information represents at least an unobscured region associated with the node.

According to still another aspect of the present invention there is provided a method for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the method comprising the steps of:

performing a first traversal of said tree to construct a first hierarchical structure for each operation node of said tree, wherein said first hierarchical structure represents combined opacity information for a node based on regions associated with the node; and optimising said expression tree by performing a second traversal of said tree to construct a second hierarchical structure for each node of said tree using said opacity information, wherein said second hierarchical structure represents at least an unobscured region associated with the node.

According to still another aspect of the present invention there is provided a method for optimising an expression tree, said expression tree representing a compositing expression for compositing an image and comprising a plurality of nodes, each said node of said tree representing at least a component of said image or an operation for combining sub-expressions of said compositing expression, the method comprising the steps of:

performing a first traversal of said tree to identify nodes having an associated complex graphical object;

performing a second traversal of said tree to determine opacity information for each node identified in said first traversal;

constructing a first hierarchical structure for each node of said tree based on said opacity information, wherein said first hierarchical structure represents combined opacity information for a node based on regions associated with the node; and optimising said expression tree by performing a third traversal of said tree to construct a second hierarchical structure for each node of said tree using at least one first hierarchical structure, wherein said second hierarchical structure represents at least an unobscured region associated with the node.

According to still another aspect of the present invention there is provided An apparatus for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the apparatus comprising:

means for performing a first traversal of said tree to determine opacity information for each node of said tree, wherein said opacity information represents combined opacity for a node based on regions associated with the node; and means for optimising said expression tree by performing a second traversal of said tree to determine obscurance information for each node of said tree using said opacity information, wherein said obscurance information represents at least an unobscured region associated with the node.

According to still another aspect of the present invention there is provided an apparatus for optimising an expression tree, said expression tree representing a compositing expression for compositing an image and comprising a plurality of nodes, each said node of said tree representing at least a component of said image or an operation for combining sub-expressions of said compositing expression-and each said node having a region of the image represented by said node, the apparatus comprising:

mean for performing a first traversal of said tree to construct a first hierarchical structure for each operation node of said tree, wherein said first hierarchical structure represents combined opacity information for a node based on regions associated with the node; and means for optimising said expression tree by performing a second traversal of said tree to construct a second hierarchical structure for each node of said tree using said opacity information, wherein said second hierarchical structure represents at least an unobscured region associated with the node.

According to still another aspect of the present invention there is provided an apparatus for optimising an expression tree, said expression tree representing a compositing expression for compositing an image and comprising a plurality of nodes, each said node of said tree representing at least a component of said image or an operation for combining sub-expressions of said compositing expression, the apparatus comprising:

means for performing a first traversal of said tree to identify nodes having an associated complex graphical object;

means for performing a second traversal of said tree to determine opacity information for each node identified in said first traversal;

means for constructing a first hierarchical structure for each node of said tree based on said opacity information, wherein said first hierarchical structure represents combined opacity information for a node based on regions associated with the node; and means for optimising said expression tree by performing a third traversal of said tree to construct a second hierarchical structure for each node of said tree using at least one first hierarchical structure, wherein said second hierarchical structure represents at least an unobscured region associated with the node.

According to still another aspect of the present invention there is provided a computer program for a computer comprising software code portions for performing a method for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the program comprising:

code for performing a first traversal of said tree to determine opacity information for each node of said tree, wherein said opacity information represents combined opacity for a node based on regions associated with the node; and code for optimising said expression tree by performing a second traversal of said tree to determine obscurance information for each node of said tree using said opacity information, wherein said obscurance information represents at least an unobscured region associated with the node.

According to still another aspect of the present invention there is provided a computer readable medium storing a computer program, wherein said computer program comprises software code portions for performing a method for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the program comprising:

code for performing a first traversal of said tree to determine opacity information for each node of said tree, wherein said opacity information represents combined opacity for a node based on regions associated with the node; and code for optimising said expression tree by performing a second traversal of said tree to determine obscurance information for each node of said tree using said opacity information, wherein said obscurance information represents at least an unobscured region associated with the node.

According to still another aspect of the present invention there is provided a method for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the method comprising the steps of:

performing a first traversal of said tree to determine opacity information for each node of said tree, wherein said opacity information represents combined opacity information for a node based on regions associated with the node; and optimising said expression tree by performing a second traversal of said tree to determine compositing information for at least one node of said tree, wherein said compositing information for a node is determined using opacity information associated with the node, and wherein said compositing information represents at least obscured regions, load regions and regions to be composited for an object associated-with the node.

According to still another aspect of the present invention there is provided a method for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the method comprising the steps of:

performing a first traversal of said tree to determine opacity information for each node of said tree, wherein said opacity information represents combined opacity information for a node based on regions associated with the node; and optimising said expression tree by performing a second traversal of said tree to construct a first hierarchical structure for at least one node of said tree, wherein said first hierarchical structure is constructed for a node using opacity information associated with the node, and wherein said first hierarchical structure represents at least obscured regions, load regions and regions to be composited, for an object associated with the node.

According to still another aspect of the present invention there is provided a method for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the method comprising the steps of:

performing a first traversal of said tree to determine opacity information for each node of said tree, wherein said opacity information represents combined opacity information for a node based on regions associated with the node;

identifying nodes of said tree, for which a first hierarchical structure is required, depending on opacity information associated with the node; and optimising said expression tree by performing a second traversal of said tree to determine compositing information for each node of said tree identified in said first traversal, wherein said compositing information is determined for a node using opacity information associated with the node, and wherein said compositing information represents at least obscured regions, load regions and regions to be composited for an object associated with the node.

According to still another aspect of the present invention there is provided an apparatus for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the apparatus comprising:

means for performing a first traversal of said tree to determine opacity information for each node of said tree, wherein said opacity information represents combined opacity information for a node based on regions associated with the node; and means for optimising said expression tree by performing a second traversal of said tree to determine compositing information for at least one node of said tree, wherein said compositing information for a node is determined using opacity information associated with the node, and wherein said compositing information represents at least obscured regions, load regions and regions to be composited for an object associated with the node.

According to still another aspect of the present invention there is provided an apparatus for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the apparatus comprising:

means for performing a first traversal of said tree to determine opacity information for each node of said tree, wherein said opacity information represents combined opacity information for a node based on regions associated with the node; and means for optimising said expression tree by performing a second traversal of said tree to construct a first hierarchical structure for at least one node of said tree, wherein said first hierarchical structure is constructed for a node using opacity information associated with the node, and wherein said first hierarchical structure represents at least obscured regions, load regions and regions to be composited, for an object associated with the node.

According to still another aspect of the present invention there is provided an apparatus for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the apparatus comprising:

means for performing a first traversal of said tree to determine opacity information for each node of said tree, wherein said opacity information represents combined opacity information for a node based on regions associated with the node;

means for identifying nodes of said tree, for which a first hierarchical structure is required, depending on opacity information associated with the node; and means for optimising said expression tree by performing a second traversal of said tree to determine compositing information for each node of said tree identified in said first traversal, wherein said compositing information is determined for a node using opacity information associated with the node, and wherein said compositing information represents at least obscured regions, load regions and regions to be composited for an object associated with the node.

According to still another aspect of the present invention there is provided a computer program for a computer comprising software code portions for performing a method for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the program comprising:

code for performing a first traversal of said tree to determine opacity information for each node of said tree, wherein said opacity information represents combined opacity information for a node based on regions associated with the node; and code for optimising said expression tree by performing a second traversal of said tree to determine compositing information for at least one node of said tree, wherein said compositing information for a node is determined using opacity information associated with the node, and wherein said compositing information represents at least obscured regions, load regions and regions to be composited for an object associated with the node.

According to still another aspect of the present invention there is provided a computer readable medium storing a computer program, wherein said computer program comprises software code portions for performing a method for optimising an expression tree, said expression tree representing a compositing expression for compositing an image and comprising a plurality of nodes, each said node of said tree representing at least a component of said image or an operation for combining sub-expressions of said compositing expression and each said node having a region of the image represented by said node, the program comprising:

code for performing a first traversal of said tree to determine opacity information for each node of said tree, wherein said opacity information represents combined opacity information for a node based on regions associated with the node; and code for optimising said expression tree by performing a second traversal of said tree to determine compositing information for at least one node of said tree, wherein said compositing information for a node is determined using opacity information associated with the node, and wherein said compositing information represents at least obscured regions, load regions and regions to be composited for an object associated with the node.

BRIEF DESCRIPTION OF THE DRAWINGS

A number of preferred embodiments of the present invention will now be described with reference to the drawings, in which:

FIGS. 6(a) and (b) show an example of the effect on the hidden regions of an object following successive convolutions;

FIG. 7 shows the effect of edge contraction on edge cells;

FIGS. 9(a), (b) and (c) show three GOB trees with an obscuring object at different depths;

FIGS. 10(a) and (b) show a composite worthy object;

FIG. 11 shows a composite object where the overlapping of objects is defined by rectangular edges;

FIG. 43 is a flow chart showing a method of rendering an image using quadtrees;

FIG. 44 shows a GOB tree where a series of small objects appear in a right biased chain of over operations;

FIGS. 45(a) and (b) show a GOB tree where a large number of small objects are placed over a large object;

FIG. 49(a) shows a GOB tree processed in accordance with the method of propagating opacity quadtrees using bounding boxes;

DETAILED DESCRIPTION INCLUDING BEST MODE

Figure 1A:
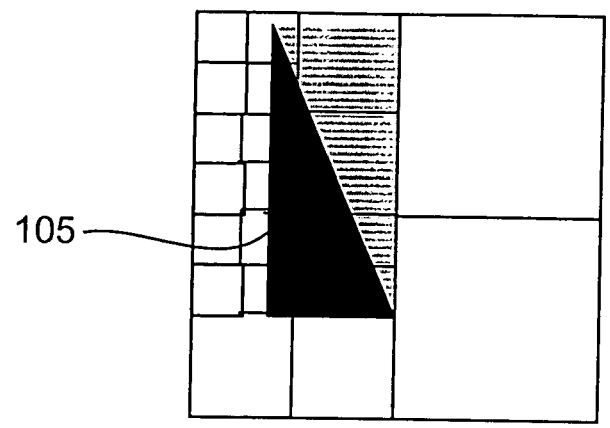
FIG. 1(a) shows a graphical object.

Where reference is made in any one or more of the accompanying drawings to steps and/or features, which have the same reference numerals, those steps and/or features have for the purposes of this description the same function(s) or operation(s), unless the contrary intention appears.

1.0 General Overview

A method of rendering an image is described below. The image is formed by rendering graphical objects according to a hierarchical GOB tree which represents a compositing expression for the image, whereby each of the graphical objects of the GOB tree has a predetermined boundary outline. The method uses quadtrees (referred to as "obscurance" quadtrees), which are stored at each leaf node of a GOB tree, to perform obscurance analysis on the graphical objects of the GOB tree. The obscurance analysis results in an optimisation of the amount of data processed during the rendering of the image represented by the GOB tree, by excluding the obscured regions of objects. A method for propagating the obscurance quadtrees for a GOB tree in order to optimise the GOB tree, is also described below. Preferably, quadtrees, referred to as "compositing" quadtrees, can also be used to perform compositing analysis on a GOB tree for optimising compositing operations in order to reduce the processing time needed to render an object. A method for propagating the compositing quadtrees for a GOB tree, in order to optimise the GOB tree, is also described below. Optimising a GOB tree using compositing quadtrees avoids redundant processing by limiting a compositing operation to the object's actual boundary outline. Furthermore, the use of compositing quadtrees can also identify regions that can be rendered using simpler and faster load operations, rather than more expensive compositing operations.

1.1 Representing Opacity Information Using Quadtrees

Quadtrees are hierarchical data structures capable of efficiently representing irregularly shaped regions. Quadtrees work by partitioning an image space into four equally sized quadrants, where each quadrant is further and successively partitioned until the quadrant represents a homogeneous region of the image, or until some fixed depth is reached. Depth in this context refers to the number of levels in the quadtree representing the image.

For obscurance analysis, the homogeneous regions of the image are of interest. The regions of interest are those corresponding to parts of objects that are of different levels of opaqueness (i.e. fully opaque, fully transparent or partially transparent regions). These regions are needed in order to take full advantage of possible optimisation opportunities that exist in the presence of the various operations (i.e. over, in, out, atop, etc.). Operators such as over require the fully opaque regions to determine where one object hides another, whereas operators such as in and out require the fully transparent regions to determine how an object clips out parts of other objects.

Figure 1B:
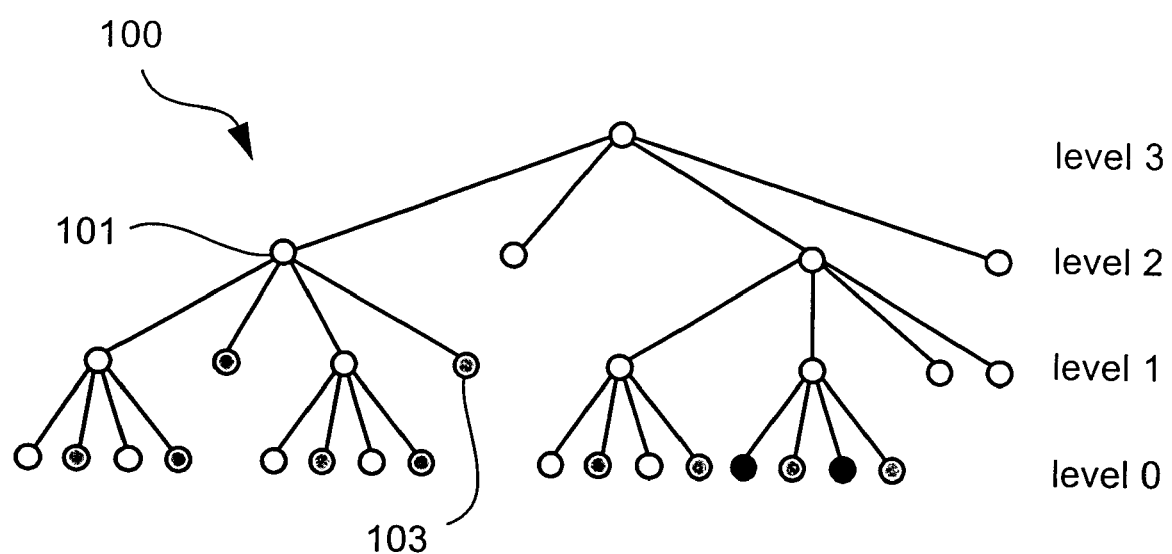
FIG. 1(b) shows an example of a quadtree describing opacity information of the graphical object of FIG. 1(a)

FIG. 1(b) shows an example of a quadtree 100 (hereinafter referred to as "an opacity quadtree") describing opacity information of an object 105 shown in FIG. 1(a). The object 105 is a rectangle divided into two halves by a diagonal. One half (the lower left half) is opaque, whilst the other, upper right half is partially opaque. The partitioning of the object 105 is also shown in FIG. 1(a) as square blocks under the object 105. As seen in FIG. 1(b), the opacity quadtree 100 comprises a number of internal (e.g. 101) and leaf (e.g. 103) nodes. Each leaf node (e.g. 103) is assigned a value of 'o', '-' or 'α' which represent the colours black, white and grey respectively, depending on whether a corresponding region in the image space is fully opaque, fully transparent, or partially transparent, respectively. If the dimensions of an image space is N×N, and the quadtree is of depth q, then a node on level i represents a square region of size $N/2^{q-1} \times N/2^{q-i}$.

The depth of an opacity quadtree determines the extent to which the image space is decomposed. That is, the depth determines the granularity or 'mesh' size of the opacity information of each object. The choice of mesh size is a compromise between the available computational resources and the effectiveness of the obscurance analysis process. The finer the mesh, the more resources are required to process the quadtrees. However, since any cell that straddles a fully opaque and a fully transparent region of an object is represented as being partially transparent, more opacity information is lost as the mesh size gets larger.

1.2 Configuration of Quadtrees 1.2.1 Data Structure

Opacity quadtrees are generally configured as a collection of linked nodes each comprising a value attribute and a set of four pointers. The value attribute indicates whether a node is a leaf node, and if so, the opacity value of the image region that the node represents. If a node is not a leaf node, then the set of pointers point to the node's four immediate children.

Alternatively, each node can store an additional pointer to the node's parent node, allowing the quadtree to be traversed in an upward direction as well as down. The ability to traverse a quadtree in an upward direction as well as down enables neighbouring nodes to be easily located, for example, by following an upward link to the nodes' common ancestor and then down towards the desired neighbour. Storing an additional pointer with each node, which points to a node's parent node, requires approximately four traversals of an opacity quadtree in order to visit every node of the tree, independent of the depth of the quadtree. However, including an additional pointer to the node's parent node does not allow parts of a quadtree to be shared with another quadtree, since a node can only point to one parent. Sharing of parts of a quadtree not only saves memory but also allows quadtrees to be merged more quickly. For example, if a fully transparent object is placed over another object, then the quadtree of the composite-object simply contains a pointer to the quadtree of the second object.

Preferably, instead of each node of an opacity quadtree containing a set of 4 pointers to the node's children, only one pointer is stored, which points to the first of the 4 children located consecutively in memory. Storing only one pointer in this configuration is advantageous when locating a neighbouring node of a particular node, since generally the neighbouring node is one of the siblings of the particular node. Thus, by allocating the siblings consecutively in memory, neighbouring nodes can generally be located quickly with minimal search effort. When the neighbouring node is not a sibling, then in the worst case it takes q steps to locate the neighbouring node, where q is the depth of the quadtree. Therefore, using the preferred quadtree data structure as described above, searching for a neighbouring node takes up to q/2 steps on average.

As will be described in more detail later in this document, preferably two additional attributes can be assigned to each node. The two additional attributes are an "area" and a "number of nodes" attribute. The area attribute stores the total area of the fully opaque region and the "number of nodes" attribute stores the total number of nodes found in a particular subtree at or below the node. These additional attributes can be used to determine whether the object represented by a particular quadtree is a worthy candidate for obscuring other objects.

Figure 2:
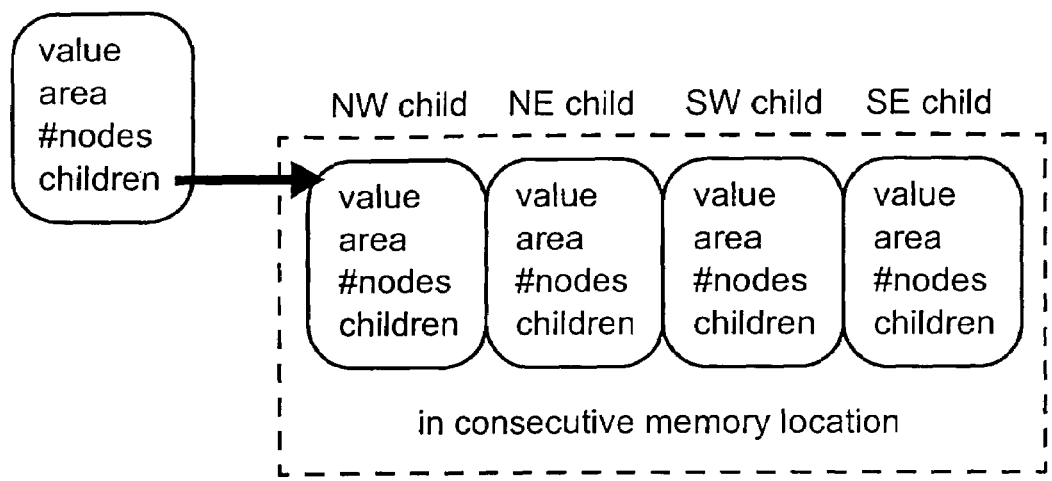
FIG. 2 shows a quadtree configured in accordance with a preferred data structure.

FIG. 2 shows a quadtree configured using the preferred data structure, where "NW" refers to a North West region of the image space, "NE" refers to a North East region of the image space, "SW" refers to a South West region of the image space, and "SE" refers to a South East region of the image space.

1.2.2 Optimising the Data Structure

In simulations carried out by the inventor in order to study characteristics of the quadtree representations of randomly generated axis-parallel rectangular objects, it was found that approximately half of the nodes in the quadtrees are leaf nodes residing at the bottom most level (i.e. level 0).

Therefore, if the processing of quadtrees can be optimised, even if it is only done on the bottom most level of the trees, the result is a greatly reduced processing time. Although the above-mentioned simulations only involved rectangular objects, the inventor hypothesised that for other objects that are not composed of axis-parallel edges, the proportion of nodes on the bottom level would be higher, and hence the resulting reduction in processing time would be even greater.

Preferably, nodes residing on the bottom most level of quadtrees are stored compactly. For nodes on the second bottom most level (ie. level 1) that have children, instead of allocating memory for the four child nodes and storing a pointer to the first of these child nodes, the values of the four child nodes can be packed together into a single 8-bit number. Since the preferred quadtree data structure contains nodes of three distinct values, two bits are needed to represent the value of a single node, and four values can be packed into 8 bits.

Figure 3:
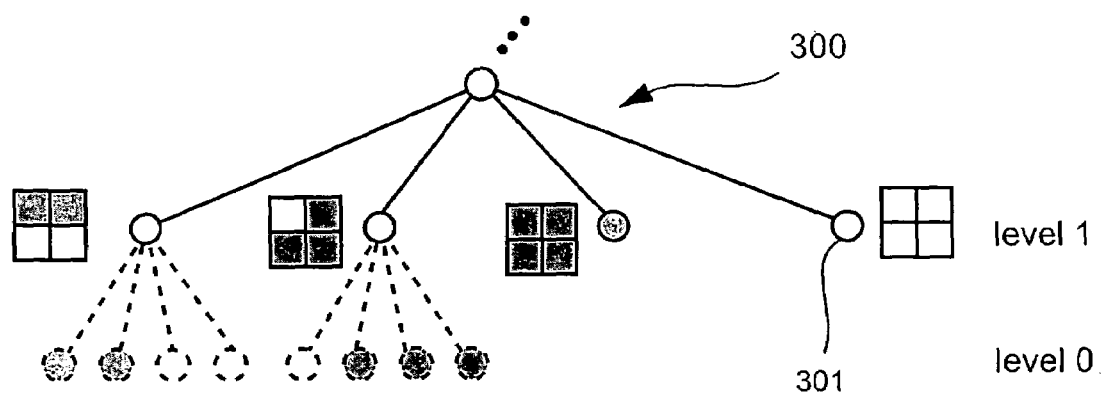
FIG. 3 shows an optimised quadtree configuration in accordance with the preferred data structure.

FIG. 3 shows an optimised quadtree configuration for nodes on the second bottom most level (ie. level 1) of the quadtree 300 that have children. As can be seen in FIG. 3, nodes residing on level 1 (e.g. 301) that do not have children (ie. leaf nodes) are also stored using the above described packed representation. In these cases, the values of the four quadrants in the packed 8-bit number are identical. Therefore, nodes on level 1 are preferably decomposed into their 4 quadrants regardless of whether the quadrants have identical values or not.

As with the node data structure shown in FIG. 2, the new packed nodes can also store the attributes "area" and "number of nodes". These attributes can be defined in the same way as in the node shown in FIG. 2. However, since the packed nodes are located at the bottom of the tree, where each quadrant is of unit area, the area reduces to the number of fully opaque quadrants, and the "number of nodes" is one if the four quadrants have identical values, and five otherwise.

The packed data representation not only requires smaller storage space but also leads to faster processing since the processing of nodes on the bottom level can be performed simultaneously on four siblings at a time. Furthermore, the quadtree node data processing can be performed using a simple table look-up requiring very little processing time. Since each packed data block is 8 bits wide, an operation involving two quadtrees (eg. merge) requires a look-up table of size 256×256=65536 bytes which is a relatively insignificant memory demand.

Although the optimised quadtree configuration shown in FIG. 3 can be extended to nodes residing on levels other than 0, the benefit of doing so is minimal since the packed data structure can only be used on nodes whose child quadrants are all leaf nodes, which rarely occurs on a level other than the bottom most level. Often one or more quadrants are decomposed into smaller cells.

2.0 Propagating Obscurance Quadtrees 2.1 Overview

Figure 18A:
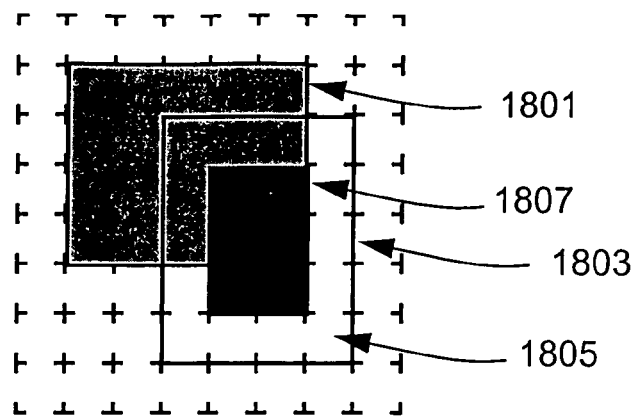
FIG. 18(a) shows two objects forming a composite object.
Figure 18B:
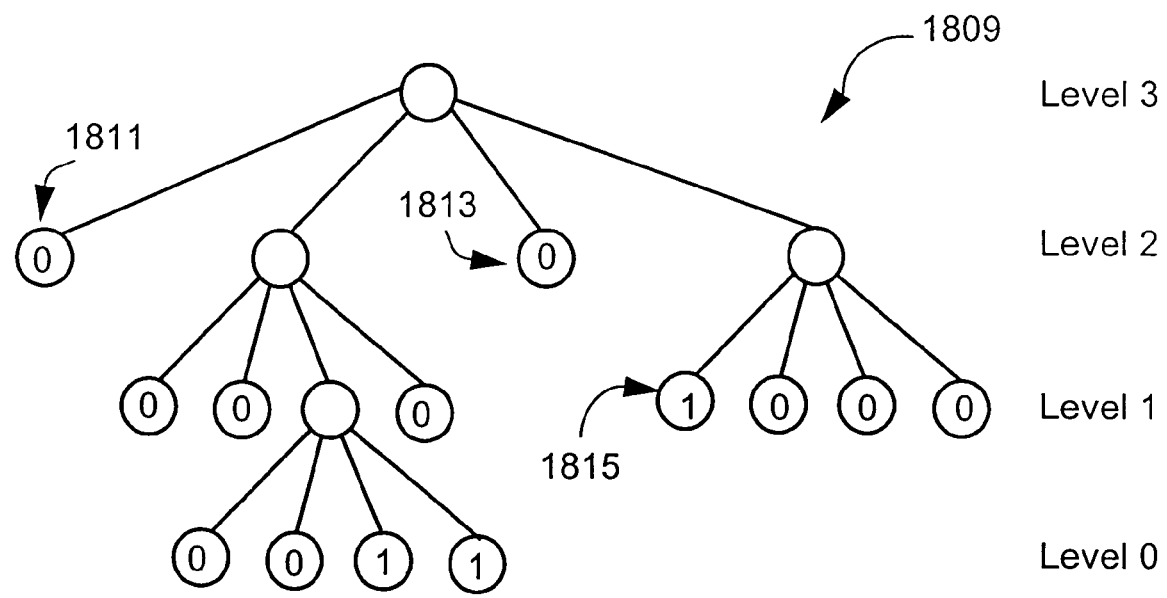
FIG. 18(b) shows the obscurance quadtree corresponding to one of the objects of FIG. 18(a)

Obscurance analysis requires knowledge of the opacity information of each object, in the form of opacity quadtrees, so that regions where objects have been hidden or clipped out by other regions can be identified. These obscured regions are generally irregular in shape and can also be represented using quadtrees, referred to as obscurance quadtrees. Unlike opacity quadtrees, obscurance quadtrees preferably contain only two distinct node values instead of three. The two distinct node values being '1' where the object is hidden, and '0' where the object is visible. FIG. 18(a) shows two objects 1801 and 1803. Object 1803 is partially transparent in one region 1805 and fully opaque in another region 1807. Further, object 1803 is composited over object 1801. The obscurance quadtree 1809 corresponding to object 1801 is shown in FIG. 18(b). As shown by the obscurance quadtree 1809, object 1801 is visible in all parts of level 2 quadrants 1 and 3, indicated by nodes 1811 and 1813, respectively. Further, object 1801 is hidden in level 1 quadrant as indicated by node 1815.

Figure 39:
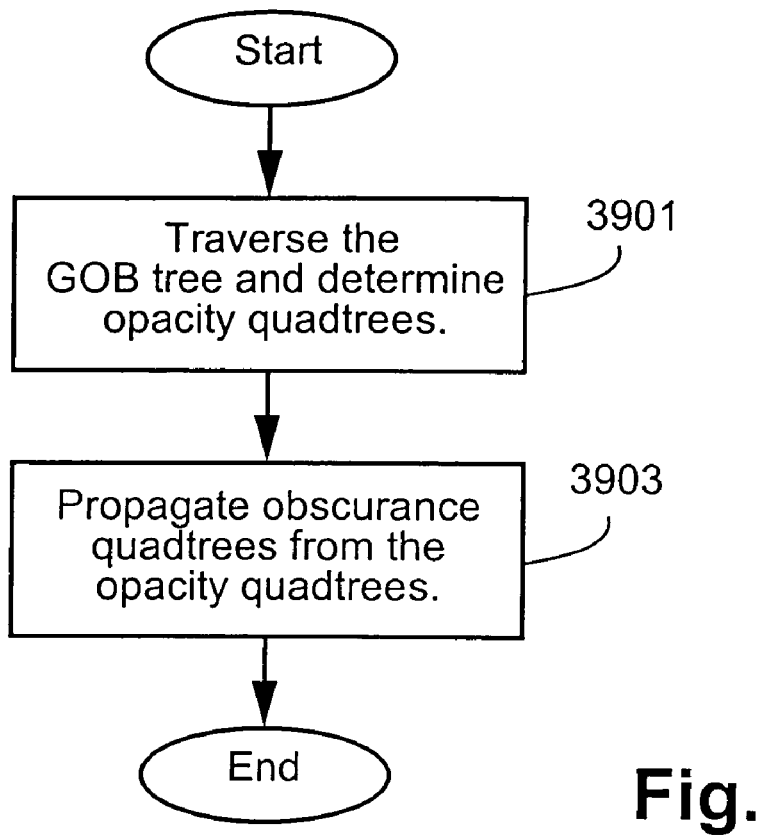
FIG. 39 is a flow chart showing a method of propagating obscurance quadtrees.

FIG. 39 is a flow chart showing a method of propagating obscurance quadtrees in order to optimise a GOB tree representing an image. The method comprises the computation of opacity quadtrees and the computation of obscurance quadtrees. The process begins at step 3901, where the computation of opacity quadtrees is preferably performed as a bottom-up GOB tree traversal process where the opacity quadtree of each graphics primitive is determined and propagated up the GOB tree. An opacity quadtree is constructed for each compositing node of the GOB tree. The opacity quadtree is constructed based on the opacity quadtrees of a particular node's child operands and the type of compositing operator represented by the node. An opacity quadtree is stored at each node of the GOB tree. At the next step 3903, obscurance quadtrees are computed from the opacity quadtrees and an obscurance quadtree is stored at each leaf node of the GOB tree. As will be discussed in further detail later in this document, an obscurance quadtree represents the union of all obscured regions represented by a corresponding leaf node. As each node in the GOB tree inherits the obscured regions of the node's parent node, since anything that obscures a composited object also obscures the individual objects that make up the composite, the obscurance quadtrees are propagated in a downwards GOB tree traversal. The process concludes when the final obscurance quadtree arrives at each leaf node. The final obscurance quadtree at each leaf node can then be used to limit to the amount of processing required to render the graphics object corresponding to the particular leaf node.

Figure 30:
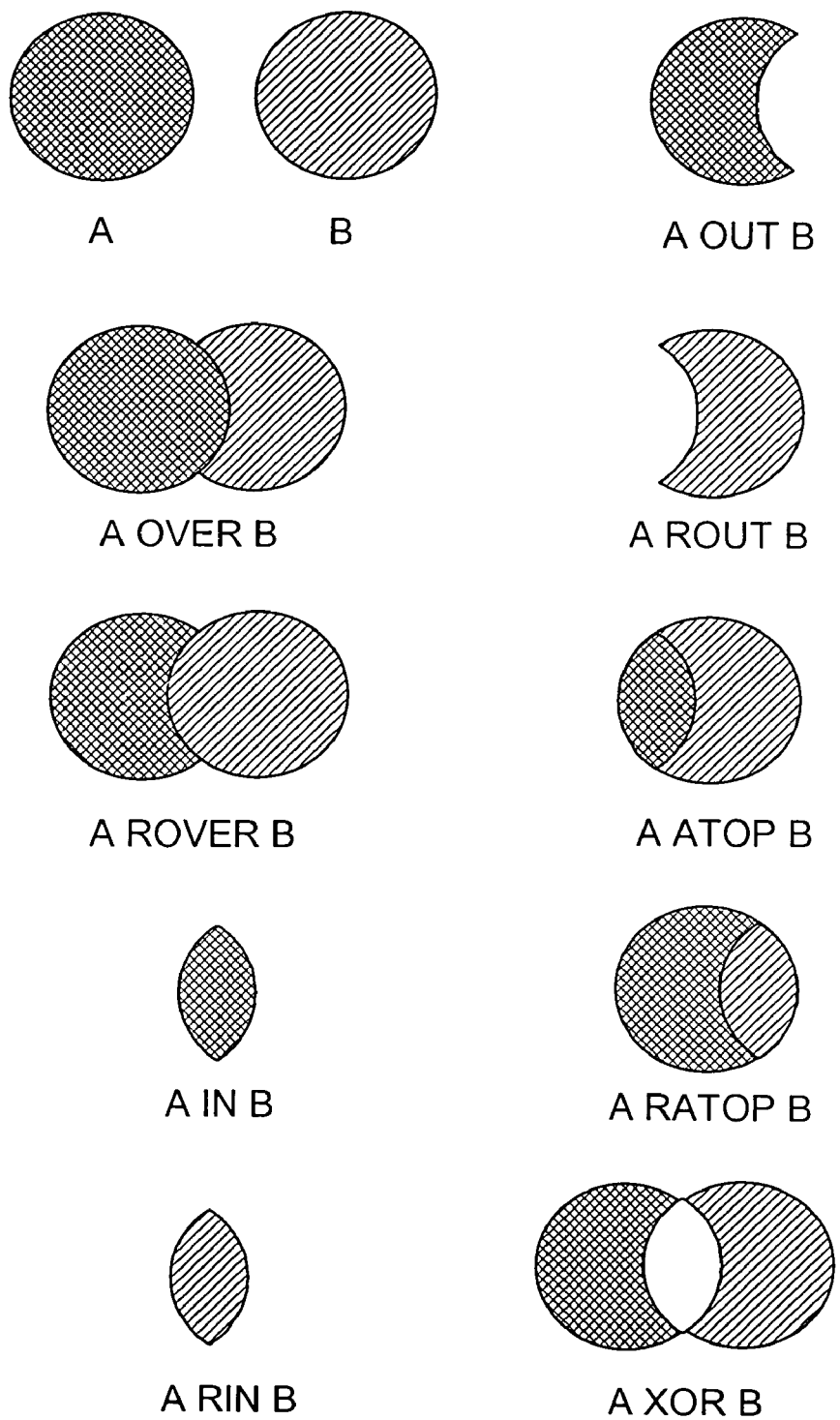
FIG. 30 shows examples of objects representing compositing operators.
Figure 31:
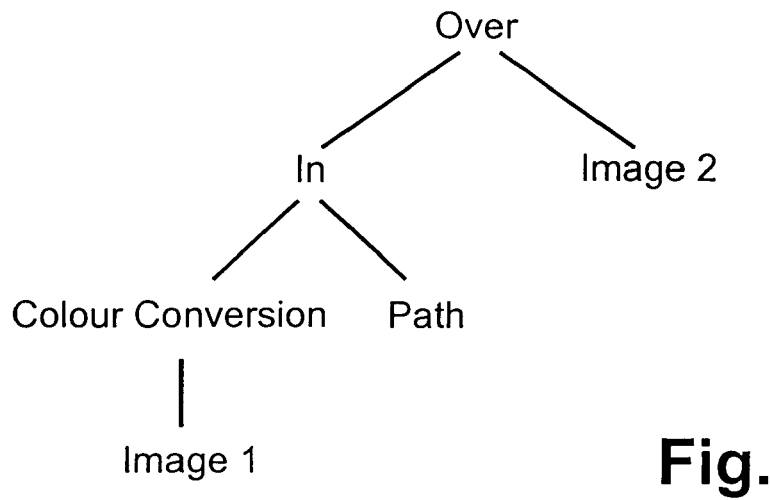
FIG. 31 shows an example of a GOB tree.

As large parts of a typical GOB tree comprise of binary compositing operators, a method for propagating opacity and obscurance quadtrees through the various binary operators shown in FIG. 30 will now be described.

2.2 Propagating Opacity Quadtrees

The opacity quadtree of a composite object can be readily constructed through a merge operation between the opacity quadtrees of the individual objects. The merge operation involves traversing both input quadtrees and constructing the resultant quadtree in parallel. The value of a node in the resultant quadtree is determined by the corresponding node values of the input quadtrees and the type of compositing operator involved. Table 1, below, shows resultant node values as a result of input node values. The columns 'L', 'R' and 'Resultant' denote the node values of the left and right input, and the resultant quadtrees, respectively.

TABLE 1

| Operation | L | R | Resultant |
|---|---|---|---|
| over, | — | R | R |
| plusc, rops | L | — | L |
| | α | α | α |
| | o | α | o |
| | α | o | o |
| | o | o | o |
| Out | — | X | — |
| | L | — | L |
| | α | α | α |
| | o | α | α |
| | α | o | — |
| | o | o | — |
| In | — | X | — |
| | X | — | — |
| | α | α | α |
| | o | α | α |
| | α | o | α |
| | o | o | o |
| Atop | — | R | R |
| | X | — | -α |
| | α | α | α |
| | o | α | o |
| | α | o | o |
| | o | o | o |
| Xor | — | R | R |
| | L | — | L |
| | α | α | α |
| | o | α | α |
| | α | o | α |
| | o | o | — |
| Plusw | — | R | R |
| | L | — | L |
| | α | α | α |
| | o | α | α |
| | α | o | α |
| | o | o | α |

As seen in Table 1, the entries for each operator have been divided into two parts: those corresponding to regions where one or both of the operands are fully transparent, and those for the remaining regions. In the latter, the different combinations of node values in the input quadtrees are listed with the corresponding node value of the resultant quadtree, whereas in the former, they can be represented more compactly. In Table 1, L denotes the value (o/-/α) of the left operand's region, R denotes the value (o/-/α) of the right operand's region, and X denotes a 'don't care' value.

2.3 Propagating Obscurance Quadtrees

As discussed above, obscurance quadtrees preferably have 2 distinct node values: namely '1' denoting a hidden region, and '0' denoting a visible region. Using standard set notation, if $Q_P$ represents the union of all the '1' (hidden) regions of the obscurance quadtree of a composite object, then the '1' (hidden) regions of its left and right operands can be stated as shown in Table 2 below, where $Q_L$ and $Q_R$ represent the opacity quadtrees of the left and right operands, respectively:

TABLE 2

| Operator | Left operand | Right operand |
|---|---|---|
| Over | $Q_P$ | $Q_P \cup \{Q_L = \text{'o'}\}$ |
| Out | $Q_P \cup \{Q_R = \text{'o'}\}$ | $Q_P \cup \{Q_R = \text{'o' or } Q_L = \text{'—'}\}$ |
| In | $Q_P \cup \{Q_R = \text{'—'}\}$ | $Q_P \cup \{Q_R = \text{'o' or } Q_L = \text{'—'}\}$ |
| Atop | $Q_P \cup \{Q_R = \text{'—'}\}$ | $Q_P \cup \{Q_L = \text{'o' and } Q_R = \text{'o'}\}$ |
| Xor | $Q_P \cup \{Q_L = \text{'o' and } Q_R = \text{'o'}\}$ | $Q_P \cup \{Q_L = \text{'o' and } Q_R = \text{'o'}\}$ |
| Plusc, plusw, rops | $Q_P$ | $Q_P$ |

Note that each obscured region as defined in Table 1 for the left operand can be unioned with the set $\{Q_L=\text{'-'}\}$ without affecting the final rendered image. This can be performed since the set $\{Q_L=\text{'-'}\}$ represents the 'empty' region of the object, and hence adding this set to the hidden region simply forces a rendering system not to render the operand where the operand is empty. Likewise, the set $\{Q_R=\text{'-'}\}$ can be added to the obscured region of the right operand without affecting a rendered image. However, such an addition can affect the amount of work needed to compute the obscurance quadtrees. In most cases, the addition of $\{Q_L=\text{'-'}\}$ and $\{Q_R=\text{'-'}\}$ to the obscured region can lead to unnecessary computations. For example, the left operand for the over operator, has an obscurance quadtree of $Q_P \cup \{Q_L=\text{'-'}\}$ requiring one merge operation, instead of the original $Q_P$ which does not require any computation.

In other cases, the addition of $\{Q_L=\text{'-'}\}$ and $\{Q_R=\text{'-'}\}$ to the obscured region results in the amount of work involved being slightly less. For example, the obscurance quadtree for a right operand of the out operator (i.e $Q_P \cup \{Q_R=\text{'o' or } Q_L=\text{'-'}\} \cup \{Q_R=\text{'-'}\}$) can be expressed as $Q_{P \cup \{QR=\text{'o'}\}} \cup \{Q_R=\text{'-'}\} \cup \{Q_L=\text{'-'}\}$.

The expression $Q_P \cup \{Q_R=\text{'o'}\} \cup \{Q_R=\text{'-'}\} \cup \{Q_L=\text{'-'}\}$ can be determined more efficiently than the original, $Q_P \cup \{Q_R=\text{'o' or } Q_L=\text{'-'}\}$, since there are more cases where the new expression can be determined from the knowledge of only the value of $Q_R$, namely where $\{Q_R=\text{'-'}\}$. As will be discussed in Section 4.1, a merge operation can be performed more efficiently on parts of quadtrees where the results are dependent on only the values of one quadtree rather than both. However, in most cases the addition of $\{Q_L=\text{'-'}\}$ and $\{Q_R=\text{'-'}\}$ to the obscured region is of negligible use since it has a detrimental impact on the processing of partial opacity information which will be discussed in Section 2.4. The computation of $Q_P \cup \{Q_R=\text{'o' or } Q_L=\text{'-'}\}$ only requires information about the fully opaque region of the right operand (in addition to the fully transparent region of the left operand), whereas the expression $Q_P \cup \{Q_R=\text{'o' or } Q_L=\text{'-'}\} \cup \{Q_R=\text{'-'}\}$ requires information about the fully transparent region of the right operand as well. The one area where the addition of $\{Q_L=\text{'-'}\}$ and $\{Q_R=\text{'-'}\}$ to the obscured region can result in optimised processing is in special cases where the right operand is known to be fully opaque, which will be examined in the section 2.3.1, below.

2.3.1 Processing Fully Opaque Operands

For the in and out operators, some analysis can be possible during the determination of an obscurance quadtree when the right operand is fully opaque. In such cases, the right operand does not affect the composite image at all, but is merely used to clip in or out parts of the left operand where they intersect. Thus, the obscurance quadtree for the right operand is effectively a tree with a single hidden node that spans the entire render space in which the image is defined. This result can be formally deduced from Table 2, by first adding the set $\{Q_R=\text{'-'}\}$ to the obscurance quadtree as discussed previously, resulting in $Q_P \cup \{Q_R=\text{'o'}\} \cup \{Q_L=\text{'-'}\} \cup \{Q_R=\text{'-'}\}$.

If the right operand is fully opaque, then the set $\{Q_R=\text{'o'}\} \cup \{Q_R=\text{'-'}\}$ covers the entire render space. Therefore, $Q_P \cup \{Q_R=\text{'o' or } Q_L=\text{'-'}\} \cup \{Q_R=\text{'-'}\}$ spans the entire render space as well.

2.4 Processing Partial Opacity Information

The above description of propagating opacity and obscurance, has assumed that all such information is required and is available. However, there are situations where determination of the necessary obscurance information does not require the determination of the full opacity information of all objects, and hence further optimisation can be made to the amount of processing involved in rendering an image. For example, at the root node of a GOB tree being processed, an opacity quadtree is not required. If, in addition the node is an over operator, then the opacity quadtree for the right operand is also not required, and only the fully opaque regions of the left operand are required. To take advantage of the possible reduction in processing where propagating opacity and obscurance information is not necessary, the minimum opacity information required when encountering different types of compositing operations and different requests for opacity information needs to be identified.

There are two main types of partial opacity information that are of interest in obscurance analysis, which are referred to as inner_op and outer_max. As discussed above, the preferred opacity quadtree configuration contains nodes with 3 distinct values, namely '-' representing fully transparent regions;

'α' representing partially transparent regions; and

'o' representing fully opaque regions.

inner_op represents the case where it is necessary to accurately identify regions that are fully opaque, but it is not necessary to identify regions that are fully or partially transparent. It is of no concern whether a fully transparent region is incorrectly labelled as partially transparent, or vice versa. Similarly, outer_max denotes the case where it is necessary to identify regions that are fully transparent, but it is not necessary to identify regions that are fully opaque or partially transparent.

2.4.1 Partial information requested by a parent node.

Table 3, below, shows what opacity information is required from the left and right child operands of a binary operator when only partial opacity information needs to be determined for the parent node, for each compositing operator. This information is used to compute the opacity quadtrees of nodes during a first traversal of the GOB tree. The corresponding entries in the L and R columns of the table indicate what opacity information is required from the left and right operands.

TABLE 3

| Operator | Parent | L | R |
| --- | --- | --- | --- |
| Over, in, plusc, rops | inner_op outer_max | Inner_op Outer_max | inner_op outer_max |
| Out | inner_op outer_max | Inner_op Outer_max | outer_max inner_op |
| Atop | inner_op outer_max | — — | inner_op outer_max |
| Xor | inner_op outer_max | both both | Both Both |
| Plusw | inner_op outer_max | both Outer_max | Both outer_max |

Table 3 shows that with the exception of the xor and to some extent the plusw operators, only partial opacity information is required from the child operands when only partial information is requested at the parent node.

2.4.2 Information Required for Performing Obscurance Analysis on Operands.

Section 2.4.1 examined what opacity information is required from child operands to partially determine the opacity information of the parent compositing nodes. This information can be used to compute the opacity quadtrees of nodes during the first traversal of the GOB tree. However, opacity quadtrees determined as indicated in Table 3 do not contain sufficient information for use in constructing obscurance quadtrees in the second traversal of the GOB tree since the process of building obscurance quadtrees makes use of clipping information stored in the opacity quadtrees that may not have been included when the opacity quadtrees were constructed with partial information in the first pass.

Table 3 can be combined with Table 4, below, which lists the opacity information from each operand required to capture the clipping information. Each operator in Table 4 contains two rows of entries. The letter L or R in the column "Perform opt. on" indicates whether it is necessary to perform obscurance analysis (ie. whether parts of objects that do not need to be rendered should be clipped out) on the left or right operand. Typically, obscurance analysis is only applied to 'complex' objects such as images and perhaps edge blends, rather than on simple graphics primitives since the time spent on analysis may not be compensated by the benefits of the optimisation.

The entries in the columns "L" and "R" of Table 4 indicate what opacity information is required to do the analysis. A '-' denotes no information is required. For example, for the over operator, no opacity information is required from either operand to optimise the left operand since the left operand is on top and hence is not obscured by the right operand, whereas to optimise the right operand, information about-where the left operand is fully opaque is required.

TABLE 4

| Operator | Perform opt. on | L | R |
| --- | --- | --- | --- |
| over | L | — | — |
| | R | inner_op | — |
| out | L | — | inner_op |
| | R | outer_max | inner_op |
| in | L | — | outer_max |
| | R | outer_max | inner_op |
| atop | L | — | outer_max |
| | R | inner_op | inner_op |
| xor | L | inner_op | inner_op |
| | R | inner_op | inner_op |
| plusc, rops, plusw | L | — | — |
| | R | — | — |

The contents of Table 4 can be obtained from Table 2, as follows:
(i) For optimising the Left operand, the column named "Left operand" of Table 2 is used.
(ii) Check for the occurrence of $Q_L$='o', $Q_L$='-', $Q_R$='o', and $Q_R$='-'. The opacity information required depends on which of the above terms are present where:
  $Q_L$='o' implies that the inner_op is required from the left operand;
  $Q_L$='-' implies that the outer_max is required from the left operand;
  $Q_R$='o' implies that the inner_op is required from the right operand; and
  $Q_R$='-' implies that the outer_max is required from the right operand.

Similarly, the opacity information required when optimising the right operand can be determined by searching for the above terms from the "Right operand" column of Table 2.

2.5 Propagating Obscurance Quadtrees Using Partial Opacity Information

Figure 41:
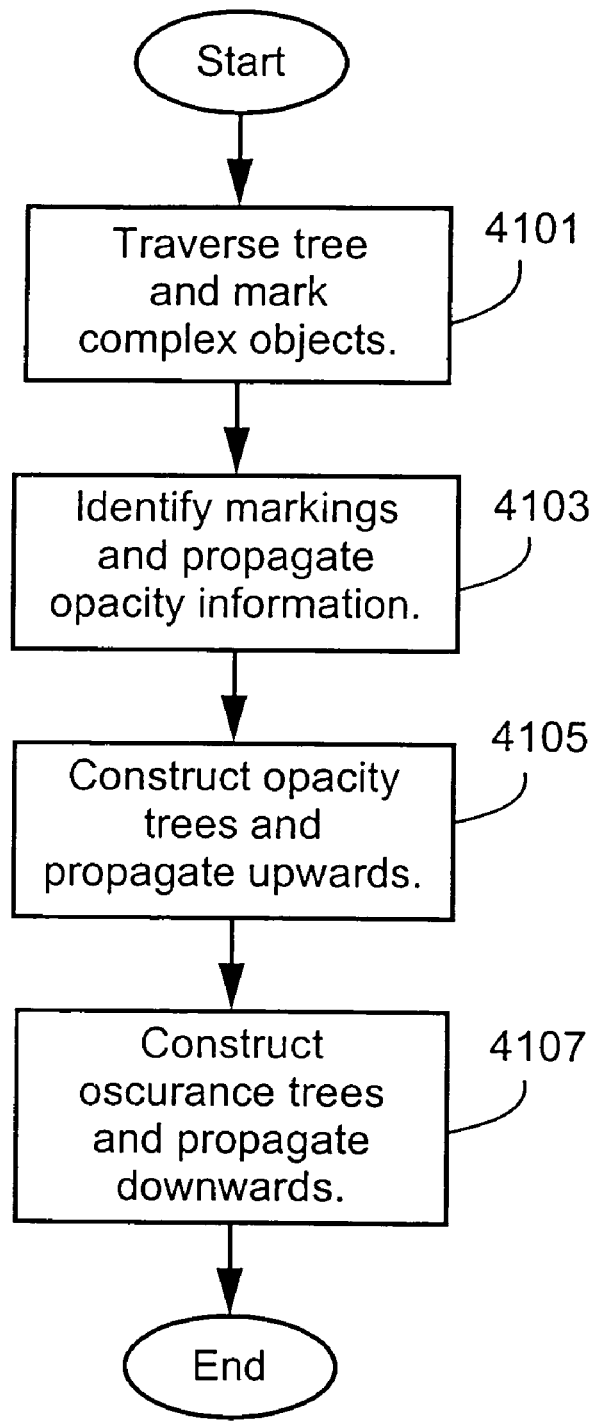
FIG. 41 is a flow chart showing a method for propagating obscurance quadtrees using partial opacity information.

FIG. 41 is a flow chart showing a method for propagating obscurance quadtrees using partial opacity information, in order to optimise a GOB tree representing an image. In order to implement selective analysis (i.e. one in which only complex objects are optimised) it is necessary to increase the number of traversals of the GOB tree over the method for propagating obscurance quadtrees discussed above, from two to three. This is because an additional step is needed to locate where the complex objects reside in the GOB tree. The process begins at step 4101, where a bottom-up traversal of the GOB tree is carried out to determine where complex objects (eg. images) are located. Each leaf node corresponding to such an object is marked as a candidate for optimisation. This marking is propagated upwards, such that every parent node whose one or more children are candidates is itself also a candidate for optimisation. At the next step 4103, a second traversal of the GOB tree is carried out whereby the traversal comprises two sub-steps (ie. a top-down process followed by a bottom-up process). The top-down process involves examining each parent node for analysis markings generated in the first traversal, at step 4101, to determine what opacity information is required from the child nodes. No opacity information is needed at the root node and if one or more child nodes of the root node are marked as candidates for optimisation, the process looks up Table 4 and records what opacity information is required for each child node. The opacity information required for each child node is propagated down to each child node. The bottom-up process at step 4103 is a recursive process in which for each parent node in the GOB tree, the opacity information required is used to look up Table 3 to determine what information is needed at each of the child nodes. In addition, if one or more child nodes have been marked as a candidate for optimisation, Table 4 is also looked up to determine what additional information is required. The combined requirements are then propagated down the GOB tree. The process continues at step 4105, where having identified what opacity information is required at each leaf node, an opacity quadtree is constructed and stored for each leaf node. The opacity quadtree for a leaf node is then propagated upwards in a post order traversal to determine the opacity quadtree of the parent node. The opacity quadtree determined for each parent node is then stored at the corresponding parent node. The method of propagating the opacity trees will be explained in more detail later in this document. The process concludes at step 4107, where a top-down traversal of the GOB tree is carried out. At each node in the top-down traversal, an obscurance quadtree is first generated from the node's opacity quadtree and the opacity quadtrees of the node's sibling. The obscurance quadtree is then combined with that of the node's parent obscurance quadtree to propagate a final obscurance quadtree for the node. The top-down traversal performed at step 4107 results in an obscurance quadtree being stored for each leaf node of the GOB tree. As discussed above and as will be discussed in further detail later in this document, the obscurance quadtrees represent the union of all obscured regions represented by a corresponding leaf node. The process concludes when the obscurance quadtree for the last leaf node is determined.

3.0 Convolutions

Figure 4:
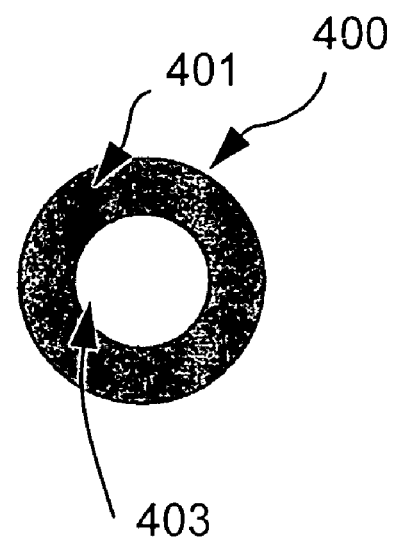
FIG. 4 shows an object comprising a fully opaque and fully transparent region.
Figure 5:
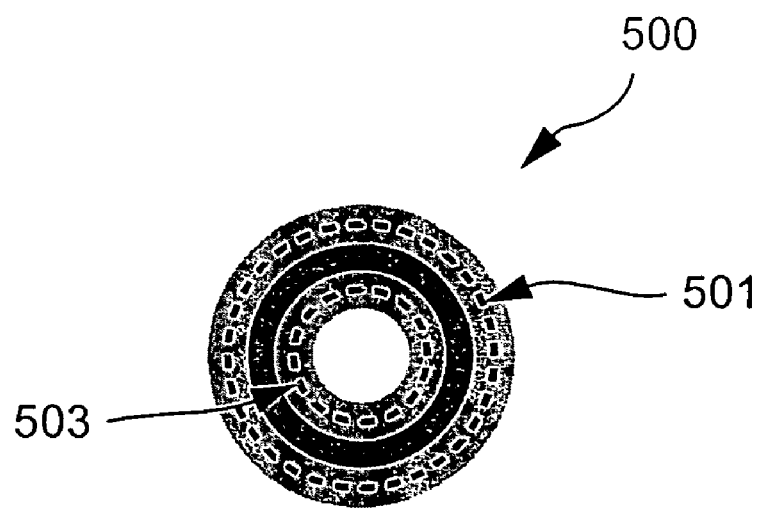
FIG. 5 shows the result of a convolution being performed on the object of FIG. 4.

A convolution operator has the effect of reducing the fully opaque region of an object by an amount equal to the convolution radius, and if the object has holes, reducing fully transparent regions of the object within the holes. FIG. 4 shows an object 400 having a fully opaque 401 and fully transparent 403 region. FIG. 5 shows the effects of convolution on the fully opaque 401 and fully transparent 403 regions of the object 400, where solid and grey areas denote the fully opaque and partially transparent regions of the convolved object 500, respectively. The convolved object 500, as seen in FIG. 5, shows the object 400 after convolution has been performed on the object 400. As seen in FIG. 5, the fully transparent 403 and fully opaque 401 regions of the object 400 are contracted by an amount equal to the convolution radius, with the areas 501 and 503 around the edges of the fully opaque 401 and fully transparent 403 regions, respectively, being transformed to partially transparent regions.

3.1 Propagating Opacity Quadtrees Through a Convolution Operator

As discussed above, a convolution operator has the effect of reducing the fully transparent and fully opaque regions of an object. Thus, in the second traversal of the GOB tree, as at step 4103 to 4105 of FIG. 41, when opacity quadtrees are generated, the fully opaque and fully transparent regions of an object need to be contracted as the opacity quadtree of the object is propagated up through a convolution operator. The amount of contraction is equal to the radius of the convolution. The contraction is preferably rounded up to the nearest integral number of mesh cells, since generally a discrete mesh size is being processed.

When there are more than one convolution operators being processed, instead of contracting the regions in a number of separate discrete steps, the regions can be combined all together, which can lead to a smaller total contraction size. However, this can only be done when the convolution operators are applied in succession, without any other intervening operators.

3.2 Propagating Obscurance Quadtrees Through a Convolution Operator

In the third traversal of a GOB tree, as at step 4107 of FIG. 41, obscurance quadtrees are generated and propagated downwards. The obscurance quadtree of a node indicates regions where the corresponding object is hidden or clipped by other objects. When propagating an obscurance quadtree through a convolution operator, any hidden regions need to be contracted by an amount equal to the radius of the convolution since an area of an object that is hidden can contribute to a pixel in a nearby visible region, due to the convolution operation.

When a succession of convolution operators are applied to an object their effects are cumulative. FIG. 6 shows an example of the effect on the hidden regions of an object A following successive convolutions. A fully opaque object 'A' is placed over another object 'B', thus obscuring part of object B. The GOB tree 600 representing the composite object is shown in FIG. 6. In this example, object B has undergone two successive convolution operations before being obscured by object A. Consider three equally spaced points X, Y, and Z of B, as shown in the FIG. 6, where y and z lie in an obscured region 601. Let the radius of both convolution operators be equal to the spacing between the x and y. Let x' and y' be the image values of B at points x and y after the application of the first convolution operator. Likewise let x" be the image value of B at point x after the application of both convolution operators.

$$\text{then } x' = f_1(x, y)$$
$$y' = f_1(x, y, z)$$
$$\text{and } x'' = f_2(x', y')$$
$$= f_2(f_1(x, y), f_1(x, y, z))$$

where $f_1$ and $f_2$ represent the convolution operations. Thus x" is a function of the original image values of B at all three points x, y and z, and hence the obscurance quadtree of B must not include point z, which is located within a distance equal to the sum of the convolution radii.

As in the propagation of opacity quadtrees, the effects of a succession of convolution operators can be lumped together into one single contraction of the obscurance quadtree. Again however, this can only be done when there are no other intervening operators present.

4.0 Processing Quadtrees

Two methods are described below for processing the opacity and obscurance information stored in the form of quadtrees. The first method is for merging two quadtrees together and is used to propagate the opacity quadtree of a parent node from those of the node's children due to the application of a binary operator. The first method can also be used for determining each operand's obscurance quadtree from the operand's opacity quadtree and the opacity quadtrees of its siblings. The second method is used for contracting certain regions in a given quadtree due to convolutions.

4.1 Merging Opacity Quadtrees

FIG. 42 is a flow chart showing the preferred method for propagating opacity quadtrees for each node, during the second traversals of the GOB tree at step 4105 of FIG. 41. The method works by traversing two input opacity quadtrees for two nodes of the GOB tee and constructing the resulting opacity quadtrees in parallel. The process begins at step 4200, where a pair of corresponding nodes in the two input opacity quadtrees is selected. At the next step 4201, if the current nodes in both input opacity quadtrees are leaf nodes, then the value stored at the nodes are used to look up Table 5, at step 4203, in order to determine the corresponding node value of the resultant opacity quadtree, based on the type of binary operator associated with the GOB tree nodes. Otherwise, the process proceeds to step 4221, where if the current nodes in both input opacity quadtrees have children, then each of these children are selected, at step 4205, in turn and the process returns to step 4201. If one of the nodes is a leaf node at step 4221, then the process proceeds to step 4223, where the node value at the leaf node is used to look up a shaded entry in Table 5 in order to determine the corresponding node value of the resultant opacity quadtree.

The methods used for the different types of compositing operators differ in the processing of cases where the current node of one input opacity quadtree is a leaf node whilst the current node of the other input opacity quadtree is not. Special processing of these cases is required since optimisation can be possible as can be seen from a restatement of Table 1, in Table 5 as follows:

TABLE 5

| Operation | L | R | Resultant |
|---|---|---|---|
| Over, | — | R | R |
| plusc, | O | X | o |
| rops | L | — | L |
|  | X | o | o |
|  | α | α | α |
| Out | — | X | — |
|  | X | o | — |
|  | L | — | L |
|  | α | α | α |
|  | O | α | α |
| In | — | X | — |
|  | O | R | R |
|  | X | — | — |
|  | L | o | L |
|  | α | α | α |
| Atop | X | R | R |
| Xor | — | R | R |
|  | α | X | α |
|  | L | — | L |
|  | X | α | α |
|  | O | o | — |
| Plusw | — | R | R |
|  | α | X | α |
|  | L | — | L |
|  | X | α | α |
|  | O | o | α |

Table 5 is a more compact representation of the same data in Table 1, where entries with the same input values for the left or right operands have been grouped together wherever possible. Table 5 is useful since for the cases shown shaded grey, the resultant values can be determined from the value of only one of the operands. For example, the second row (ie. for over) states that if the left operand of a branch is fully opaque, then the resultant value is fully opaque regardless of the value of the right operand. Similarly, the first row states that if the left operand is fully transparent, then the resultant value is the same as that of the right operand, whatever the value of the right operand is. Table 5 allows the merge operation input opacity quadtrees to performed more efficiently when handling cases where the current node of one input opacity quadtree is a leaf node whilst the current node of the other input opacity quadtree is not.

After step 4223, the process proceeds to the next step 4207, where if the value of the leaf node matches one of the shaded cases shown in Table 5, then the process continues to step 4209, where there are two possible outcomes when merging input opacity quadtrees. At step 4209, if the resultant value as indicated in Table 5 is a fixed value (ie. o/-/α) then the output resultant quadtree is appended with a leaf node at the next step 4211, or else the sub-tree below the non-leaf current input node is appended to the output quadtree, at step 4213. In either case, it is not necessary to process any part of the input opacity quadtrees below the current nodes. After step 4213, the process concludes at step 4217, when all nodes of the input opacity quadtrees have been visited. Otherwise the process proceeds to step 4200.

In contrast, if the value of the leaf node of one opacity quadtree is not one of the shaded cases shown in Table 5, at step 4207, then the region represented by this leaf node is split into four smaller quadrants, at step 4215, and the process returns to step 4205.

After either step 4203 or step 4211, the process proceeds to step 4225, where if each set of sibling nodes of the current node have not been processed, the process returns to step 4200. Otherwise, the process proceeds to step 4218, where a check is performed to determine if the resulting nodes in the output quadtree are leaf nodes and that they have been assigned identical node values. If so, then the process proceeds to step 4219, where the four sibling output nodes are combined into a single larger leaf nodes with the same node value. Otherwise, the process proceeds to step 4217, where the process concludes if all nodes of the input opacity quadtrees have been visited. If all nodes of the input opacity quadtrees have not been visited, the process proceeds to step 4200.

From the above description, it can be seen that the complexity of the method for propagating the opacity quadtrees, in terms of the number of nodes that need to be visited, is directly related to the number of nodes in the input opacity quadtrees. An upper bound on the number of nodes that need to be visited is the total number of nodes in both input quadtrees. Fewer nodes will be visited if there exists corresponding pairs of nodes in the input opacity quadtrees such that when one of the nodes is a leaf node and the other is not, the value of the leaf node is among the cases shown in grey in Table 5.

4.2 Merging Obscurance Quadtrees

The propagation of an obscurance quadtree through a binary compositing operator in the third traversal of the GOB tree, at step 4107 of the method of FIG. 41, can involve up to three merge operations. For the over operator however, only one merge operation is needed. This can be seen from Table 2. For the over operator, no processing is required to construct the obscurance quadtree for the left operand since the obscurance quadtree will be identical to that of the parent node, and only one merge operation is needed to compute the expression $Q_P \cup \{Q_L = \text{'o'}\}$.

In contrast, for the out operator, three merge operations are required in the propagation of an obscurance quadtree in the third traversal of the GOB tree, at step 4107 of the method of FIG. 41. One operation for the left operand, and two operations to compute the expression $Q_P \cup \{Q_R = \text{'o'}$ or $Q_L = \text{'-'}\}$ for the right, which comprises of first a merge between the opacity quadtrees $Q_L$ and $Q_R$, and then a merge with the parent obscurance quadtree $Q_P$.

Since the expressions for computing the obscurance quadtrees shown in Table 2 comprise mixtures of opacity quadtrees ($Q_L$ and $Q_R$) and the obscurance quadtree ($Q_P$), a number of merge methods are required for dealing with the different combinations of inputs and outputs. The merge methods comprise the merging of two opacity quadtrees to obtain an obscurance quadtree, the merging of an opacity and an obscurance quadtree to obtain an obscurance quadtree, and the merging of two obscurance quadtrees to obtain an obscurance quadtree.

The different methods are all variants of the method for propagating two opacity quadtrees in order to produce another opacity quadtree as discussed in Section 4.1, with one significant difference. Since the outputs of the merge methods are obscurance quadtrees, some conversion can be necessary if one or both of the inputs are opacity quadtrees. This conversion is undesirable since it means that all nodes in the input opacity quadtrees must be fully explored. For example, in the computation of the union between an obscurance quadtree $Q_P$ and the set $\{Q_L={}'o'\}$, if $Q_P$ is an empty set (i.e. a quadtree with a single 'visible' root node), then what is otherwise a trivial operation requires a fill traversal of $Q_L$ to convert all 'o' nodes to 'hidden' and all '-' and 'o' nodes to 'visible'.

In order to overcome the conversion if one or both of the inputs of a merge method are opacity quadtrees, obscurance quadtrees can be allowed to carry the same three possible node values (i.e. '-', 'o' and '$\alpha$') as opacity quadtrees. 'o' nodes for obscurance quadtrees are then treated as 'hidden' and the other nodes as 'visible'. However, the disadvantage of allowing obscurance quadtrees to carry the same three node values as opacity quadtrees is that these obscurance quadtrees can be slightly more complex (ie. contain more nodes) than their two-value equivalents, since merging sibling quadrants containing different ('-' and '$\alpha$') but otherwise equivalent values into a single node is unable to be done.

A conversion referred to as a 'lazy' conversion can be performed if one or both of the inputs of a merge method are opacity quadtrees. That is, the conversion of opacity quadtree nodes into the 2-value format is delayed until the nodes are visited during subsequent merge operations. Nodes that do not need to be visited are left as they are. For example, computing the set $Q_P \cup \{Q_L={}'o'\}$ when $Q_P$ is an empty set simply returns the original quadtree $Q_L$. Only when $Q_L$ is merged with another quadtree that requires some of the other quadtree's nodes to be explored are those nodes converted into the two-value format. Therefore, the number of nodes in the quadtree can be reduced without spending any additional time exploring nodes unnecessarily.

4.3 Convolution

To perform the contraction of fully opaque and fully transparent regions as a result of propagating opacity quadtrees through a convolution operator, a method for identifying 'edge' cells in the quadtrees is required. Edge cells are cells that border another cell of a different value. Thus, an essential ingredient of any edge finding method is to explore neighbouring nodes. There are two main methods for locating neighbouring nodes, namely a bottom-up or a top-down.

The bottom-up method works by traversing along upward links of a GOB tree towards a common ancestor and then downwards to locate the desired neighbour. The bottom-up method requires each node to store a link to the parent. Since it takes an average of 4 steps through the quadtree to locate a neighbouring node, independent of the depth of the tree, the bottom-up traversal method has an average complexity that is linear to the number of nodes in the quadtree being processed. However, the worst case complexity is quadratic.

The top-down edge finding method on the other hand explores nodes in a top-down manner, and hence does not require the storage of parent links. The top-down method works by maintaining a set of pointers to the 8 neighbouring nodes of each node as the opacity quadtree is traversed. The top-down method is more efficient than its bottom-up counterpart due to the maintenance of the set of neighbour pointers, which means neighbouring nodes can be located with less effort. The top-down method has a worst case linear complexity as opposed to the average linear complexity of the bottom-up method.

4.3.1 Top-Down Edge Finding Method

As discussed above, a top-down edge finding method works by maintaining a set of pointers to the neighbouring nodes of each node as the opacity quadtree is traversed in a top-down manner.

Two nodes that are not descendants of one another are said to be neighbouring nodes if their corresponding image regions share a common boundary, even if only at a single point. Note that this definition applies to all nodes in an opacity quadtree whether they are leaf or non-leaf nodes, and that a pair of neighbouring nodes can be located on different levels (ie. the image regions represented by the nodes are of different sizes). Neighbouring cells are defined as being neighbouring leaf nodes.

In order to find edges of an object, it is necessary to locate neighbouring cells. In a bottom-up method, locating neighbouring cells is done by traversing the opacity quadtree and at each leaf node, performing a search to locate neighbouring cells. In the top-down method, a set of pointers is maintained to the neighbouring nodes so that less search is needed. The set of pointers indexes the set of neighbouring nodes in the 8 different directions located on the same or higher level as the current node and can contain duplicates if some of the neighbours are of larger size than the current node.

As the opacity quadtree is traversed and a leaf node is reached, a neighbouring cell can be of the same size, larger, or smaller than the current leaf node. If the neighbouring cell is larger or equal in size, than the cell is certain to be one of the 8 neighbouring nodes referenced by the set of pointers. If the neighbouring cell is smaller, then the cell is not directly referenced by the pointers but rather the cell's ancestor is, and hence some search is necessary to locate the cell. A surprising result of this is that even though some search can be needed, the complexity of the method remains linear in the number of nodes in the opacity quadtree.

4.3.2 Region Contraction

Once all neighbouring cells of a leaf node have been located, the neighbouring cells can be examined to determine whether the leaf node is an edge node, and if it is, how the edge node is affected by the convolution. If an edge node is either fully opaque or fully transparent, then the edge node can be converted into a partially transparent node. An advantage of the use of the packed data structure described in Section 1.3.2 is that in certain situations, the edge contraction operation becomes trivial. For example, as shown in FIG. 7, during the inspection of each packed cell 700, if the 4 quadrants 701, 703, 705 and 707 are not either all fully opaque or all fully transparent, then the resulting values 709, 711, 713 and 715 of the 4 quadrants 701, 703, 705 and 707 will be all partially transparent, where grey cells denote partially transparent regions. Otherwise, the neighbouring cells need to be examined.

Figure 8A:
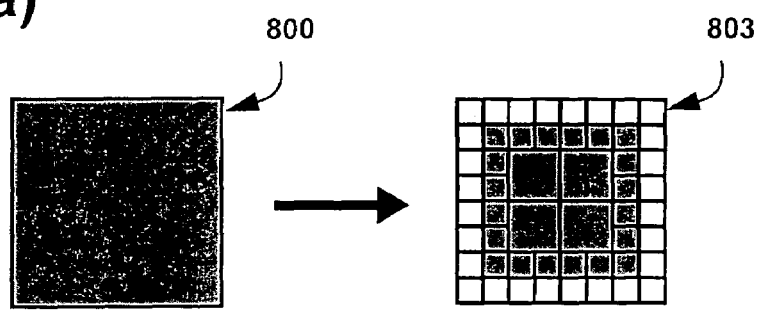
FIG. 8(a) shows a fully opaque object covering a whole image render space.
Figure 8B:
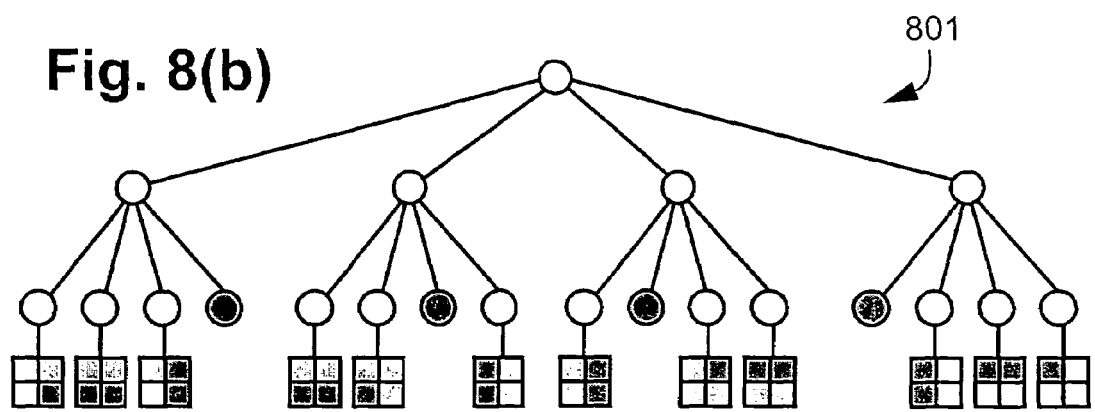
FIG. 8(b) shows a quadtree representing the object of FIG. 8(a) after an edge of one cell has been applied to the object.

As discussed above, the execution time of the edge finding component of the edge finding method is linear in the number of nodes in the quadtree being traversed. Unfortunately, the region contraction method is not linear in the number of nodes in the opacity quadtree being traversed. An example of this is shown in FIG. 8(*a*), where an object 800 that is fully opaque everywhere takes up the whole render space. The resulting opacity quadtree for the object 800, therefore comprises of a single node. However, as shown in FIG. 8(*b*), after an edge contraction of one cell is applied to the object 800, the resulting quadtree representation 801 is no longer a single node, but can contain a large number of nodes. Thus, considerable processing can be required to construct the quadtree 801. The partitioning 803 for the quadtree 801 is also shown in FIG. 8(*a*).

The amount of processing is bounded by a linear function of the perimeter of the resulting object. Since the perimeter of an object remains roughly the same after an edge contraction (i.e. a change of a factor of 2 or less), the processing required is thus linear in the perimeter of the original object as well.

Edge contraction is considerably more computationally expensive when compared to the opacity quadtree propagation method. The inventors have shown that edge contraction is of an order of magnitude slower than quadtree merging. Another contributing factor to the speed of the edge contraction method is the fact that a new and complete quadtree needs to be constructed, whereas in merge operations, parts of the input quadtrees can often be reused.

4.3.4. Region Contraction of more than One Cell Width

The edge finding and contraction methods discussed in the previous sections are only applicable when the convolution radius is less than or equal to 1 cell width. Convolutions with larger radii can be generally handled by applying the region contraction methods a number of times in succession which can be time consuming if the radii are very large, but such cases are rare.

Alternatively, radii of arbitrary sizes can be processed. However, in this instance, the top-down edge finding method discussed above requires the set pointers to index all nodes lying within a distance equal to the convolution radius from each node, and processing time grows rapidly as the radius gets larger.

For the special case where the convolution radius is 2 cell widths, the packed data structure introduced in Section 1.3.2 can be utilised to perform the region contraction with the same efficiency as the method for handling 1 cell width region contraction. In this instance, only 8 pointers need be maintained to the eight neighbouring packed cells of each node.

5.0 Selective Obscurance Analysis

During the propagation of quadtrees, there is a constant need for merging quadtrees when compositing operations are encountered. As discussed above, the merging of quadtrees occurs during both the second traversal of the GOB tree, as at step 4103, when opacity quadtrees are constructed, and the third traversal, as at step 4107, when the obscurance quadtrees are constructed.

The number of merge operations is a direct function of the number of objects in a GOB tree. Therefore, for a large GOB tree, the time spent on obscurance analysis can be quite significant. If there is a high degree of obscurance between objects, then the time spent will be easily offset by the time saved during rendering. However, if many of the objects in the GOB tree are small, then the amount of obscurance between them would not be sufficient to warrant a full obscurance analysis. Therefore, a method of identifying a objects that are worthy of having obscurance analysis performed on them is described below.

5.1 Worthiness Ratio

Two readily available attributes of an object that are directly related to whether the object is a worthy candidate for analysis are the size of the object and the number of nodes that make up the object's opacity quadtree. The later dictates the work needed to process the object since the time required for a merge operation between two opacity quadtrees is bounded above by a linear function of the total number of nodes in the quadtrees. The size of the object gives an estimate of the benefit of performing obscurance analysis on an object since the larger the object, the more probable it will obscure other objects.

Thus an indication of whether an objects is worthy of obscurance analysis is the ratio of the object's area to the number of nodes in the opacity quadtree representing the object. If the ratio is above a certain threshold value, then the object is a candidate for optimisation using obscurance analysis, or a potential obscurer. The ratio is referred to as the worthiness ratio. Advantageously, both the area and the number of nodes can be determined and maintained with each opacity quadtree, requiring very little extra processing.

Another useful property is that the number of nodes in an opacity quadtree is bounded above by the perimeter of the object that the quadtree represents. Thus the ratio between an object's area and its perimeter is also an indicator of the object's worthiness. This ratio has the desirable property that unlike the worthiness ratio defined above, the ratio between an object's area and its perimeter is independent of the position of the object in the render space.

Although the immediate amount of work needed to merge an object's opacity quadtree is more directly related to number of nodes in the opacity quadtree, this figure can change substantially after the merge operation and hence the original figure may no longer reflects the amount of subsequent work needed to process the object. In contrast, an object's perimeter does not generally change. Computing the perimeter of an object is however, a considerably involved task. Therefore, the worthiness ratio is equal to the ratio of the object's area to the number of nodes in the opacity quadtree representing the object.

5.1.1 Depth

Depth is another factor that affects the worthiness of a potential obscurer. A moderately sized object located deep down a GOB tree representing an image is not as favourable an obscurer as a similar object located further up the tree, since the object requires much processing to propagate the object's opacity information up where the opacity will be finally used. Preferably, the 'depth' of an obscurer should not be an object's absolute depth, but rather the object's depth relative to the objects being obscured. For example, three GOB trees GOB 901, 903, and 905 are shown in FIGS. 9(*a*), (*b*) and (*c*), respectively.

In the examples of FIGS. 9(*a*), (*b*) and (*c*), object A is large and hence is a potential obscurer. Object B is an image being obscured. In FIG. 9(*a*) with tree 901, both objects A and B are located in the shallow part of the GOB tree 901, and hence little processing is needed to obscure object A on B. In FIG. (*b*) with tree 903, object A is located deep down the tree 903, and hence many merge operations are needed to propagate object A's opacity quadtree up towards object B. Finally, in FIG. 9(*c*) with tree 905, object A is again located deep down the tree 905. However, object B is also located deep down the tree 905. In fact object B is as close to A in the tree 905 as in the tree 901. Thus the amount of processing required for the tree 905 is similar to the tree 901 as far as the obscurance of object B is concerned.

The worthiness ratio can be augmented with depth information, as follows $$\text{worthiness} = \text{area}/(\text{No. nodes} \times \text{relative depth}) \qquad (1)$$

The term relative depth needs to be quantified when there is more than one object being obscured (i.e. objects of high complexity such as images). Preferably the depth is taken relative to the nearest object being obscured since this depth represents the distance that the opacity information needs to be propagated for some benefit to be realised.

5.1.2 Calculation of the Worthiness Ratio

Since there are preferably three different object opacity values, namely fully transparent, fully opaque and partially opaque, the 'area' of an object needs to be precisely defined when computing the worthiness ratio as described in section 5.1.1. If an object is to be composited over other objects, then the only area of interest in the obscurance analysis is the area of the object that is fully opaque. In contrast, if the object is used to clip out other objects, then the area of the object that is fully transparent would be of interest. In other instances, both the fully opaque and fully transparent regions of the object are of interest (i.e. partially transparent regions are never of interest in an obscurance calculation).

There can be occasions where only an inner_op or outer_max region is needed from an object, which signifies the fully opaque or fully transparent region, respectively. The definition of the 'area of interest' for each object is thus dependent on which of the above partial opacity information is required for the object. This definition is appropriate since if a region (i.e. fully opaque or fully transparent) needs to be determined for an object, then that region can be used to obscure some other objects, and hence the region's area is preferably included in the calculation of the object's worthiness ratio.

Since most graphical objects do not take up anywhere near the full rendering space, their transparent regions can always be regarded as large. Therefore, whenever the outer_max region is needed for an object in an obscurance calculation, the object can be regarded as being a worthy potential obscurer. The outer_max regions are typically used in set-related operators, such as in, out, atop and xor, where the fully transparent region of an object clips out a part of the object's sibling. Alternatively, the object can be considered to 'obscure' a part of its sibling with the object's fully transparent region.

5.1.3 Properties of Objects

For some special cases involving the compositing of fully opaque objects over one another, there are three rules that can be used for determining the worthiness of a composite object based on the worthiness of the object's constituents. In this instance, an object's worthiness is preferably defined as the ratio of the object's area over the object's perimeter, rather than the worthiness ratio described in section 5.1. An object is said to be worthy if the object's area/perimeter ratio is greater than some threshold value. The rules for determining the worthiness of a composite object based on the worthiness of the object's constituents, are as follows:

(i) If a worthy, fully opaque rectangular object is placed over another worthy, fully opaque object (i.e. not necessarily rectangular), and if the area of overlap between the objects is smaller or equal to the area of the largest circle that can be enclosed within the first object, then the composite object is also worthy. FIG. 10 shows an example of where a composite object 1000 is worthy if the area of overlap 1001 is less than or equal to the area of the largest circle 1003 that can be enclosed within object A;

(ii) if a worthy, fully opaque rectangular object is placed over another worthy, fully opaque object (i.e. not necessarily rectangular), and if the area of overlap between the objects is defined solely by rectangular edges, then the composite object is also worthy. FIG. 11 shows a composite object 1100 where the overlapping area 1101 is defined by rectangular edges. Further, a composite object made up of all worthy, fully opaque and rectangular objects is also worthy.

(iii) If a worthy, fully opaque circular object is placed over any other worthy fully opaque object, then the resulting composite object is also worthy.

The worthiness ratio, described in section 5.1, can be used to determine on the fly whether an object is worthy of optimisation or not. The worthiness ratio described in section 5.1 is simple to compute and is accurate. The rules above however, are useful since they indicate that obscurance analysis is widely applicable, since a typical image comprises of mainly over operators. When worthy obscurers are composited together, the resultant composite object can in most cases be used as obscurers as well. Thus there are few situations where after propagating the opacity information of an object a long distance, the resulting object turns out to be unworthy.

5.2 Processing Small Objects

Many images contain a very large number of small objects, and hence a highly efficient method for handling the small objects is essential. Although the use of the worthiness ratios discussed in the previous section is capable of masking out small objects as poor potential obscurers, the worthiness ratio may not save sufficient processing time for an image with many small objects. This is because even though the objects have been prevented from taking part in the obscurance analysis, their opacity quadtrees have already been constructed prior to the computation of their worthiness ratios. Constructing a large number of opacity quadtrees can be time consuming.

Small objects can be afforded special treatment, which in many cases removes the need to construct their opacity quadtrees altogether. For example, where only the inner_op region of an object is required, knowing that the object is small (which is deduced from the object's bounding box) allows the object to be treated as if it were completely transparent, and hence its opacity quadtree simply consists of a single node. Performing a merge between such a quadtree with any other quadtree is a trivial operation.

Apart from graphics primitives, certain composited objects can also be deduced as small and hence be processed with similar ease. Table 6 below lists the expected size of a composite object as a function of the sizes of the individual objects that make up the composite, for each type of operator.

TABLE 6

| Operator | L | R | Resultant |
|---|---|---|---|
| over, xor, plusc, rops, plusw | Small | small | small |
| | Small | large | large |
| | Large | small | large |
| | Large | large | large |
| Out | Small | small | small |
| | Small | large | small |
| | Large | small | large |
| | Large | large | large |
| In | Small | small | small |
| | Small | large | small |
| | Large | small | small |
| | Large | large | large |
| Atop | Small | small | small |
| | Small | large | large |
| | Large | small | small |
| | Large | large | large |
| convolution | Small | | small |
| | Large | | large |

5.2.1 Inner_op Opacity Quadtree

As discussed above, when the inner_op region of a small object is of interest, the opacity quadtree of the small object can be constructed simply as a single node, since the fully opaque region of the object is so small that it can be treated as if it is empty. It is of no logical concern whether the object is treated as either fully transparent or partially transparent over the full render space, since the two are logically equivalent as long as the inner_op region is being processed. However, from the efficiency view point, it is preferable to treat the object as being fully transparent rather than partially transparent, since performing a merge operation between a fully transparent object with any other object is a trivial task, whereas merging with a partially transparent object requires some processing.

5.2.2 Outer_max Opacity Quadtree

Figure 12A:
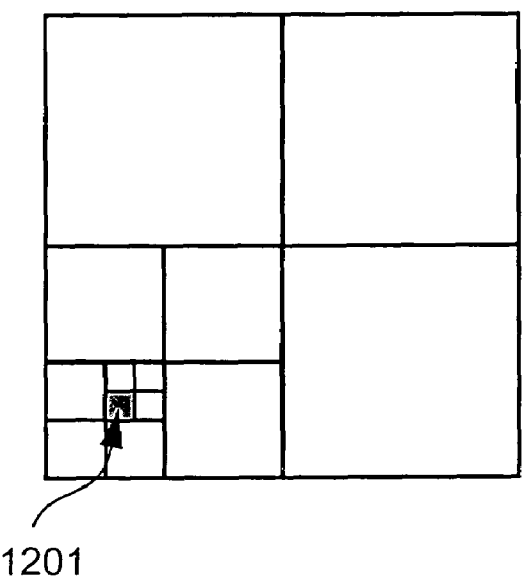
FIGS. 12(a) and (b) show an example of an opacity quadtree for a small object.
Figure 12B:
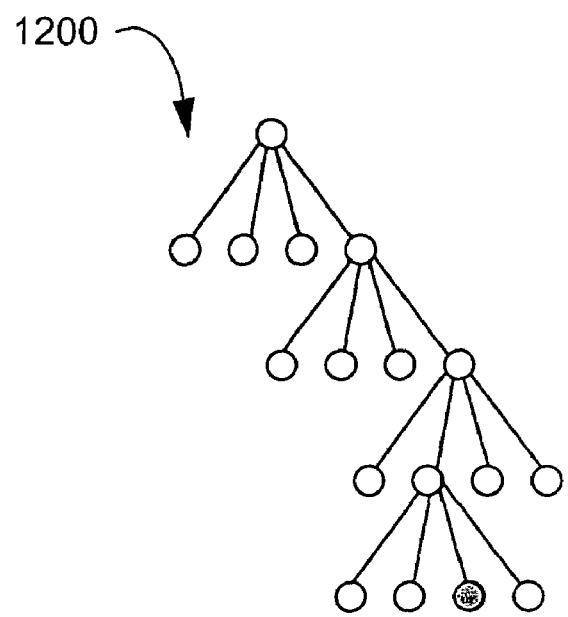

Processing the outer_max region of a small object, requires more processing than processing the inner_op region. For an object that is smaller than a single mesh cell, the opacity quadtree for the outer_max region of a small object contains a total of 4q+1 nodes, where q is the depth of the quadtree, rather than just 1 node as for the inner_op case. FIG. 12 shows an example of an opacity quadtree 1200 for a small object.

For a quadtree of depth 7, which would result in a mesh size of 2.32 mm for a render image of A4 size, the number of nodes is equal to 4(7)+1=29. This is still a small figure, at least an order of magnitude smaller than that of a moderate size object. Thus processing merge operations on such quadtrees is still relatively efficient. Furthermore, the need for the outer_max region of small objects does not occur too often since when small objects are present in an image, they are usually composited over other objects.

5.3 Incorporating the Processing of Small Objects and the Worthiness Ratio

With regard to the quadtree propagation method outlined in Section 2.5, the incorporation of the worthiness ratio and the treatment of small objects lead to the following additional sub-steps in the first and second traversals,(ie. steps 4101 and 4103), respectively, of the GOB tree.

At step 4101 of FIG. 41, small objects can be identified in a bottom-up manner, at the same time as the complex objects are identified. Graphics primitives can preferably be marked as being small or large based on their bounding boxes and composite objects can preferably be marked based on the markings of the individual objects as dictated by Table 6. To facilitate the calculation of the worthiness ratio, a distance value can be assigned to each node signifying the distance to the nearest complex object appearing at or in a subtree below the node. The distance value can be determined in accordance with the following rules:

(i) At a leaf node, if the object is a complex graphics primitive, then assign to it a distance value of zero. As at step 4101, the object can be marked as a candidate for optimisation; and (ii) The distance value of a parent node is the minimum of the distances of its children, plus 1. Again, as at step 4101, if one of its children is a candidate for optimisation, then the node can be marked as being a candidate as well.

As stated in Section 2.5, the second traversal of the GOB tree, at step 4103, comprises of two sub-steps: first a top-down procedure for identifying what opacity information is needed at each node, followed by the actual computation of the opacity values performed in a bottom-up manner. In the top-down procedure, the determination of what information is required from a child node based on the information requested by the child's parent node is simplified when the parent node is small. If this requested information is inner_op only, then the child node can be ignored, since the inner_op region of a small object is a trivial quadtree.

As for the calculation of the worthiness ratios, the value for the relative depth, as discussed above, needs to be calculated for each node as the tree is traversed downward. The calculation of relative depth can be performed as follows:

(i) At the root node, the relative depth is the distance value assigned to the node in the first traversal, at step 4101;

(ii) each time a branch is traversed downward, the relative depth is incremented by one. However, if the value thus obtained is larger than the distance value assigned to the node being visited, then the relative depth is set to the node's distance value;

In the bottom-up procedure of step 4105, as opacity quadtrees are constructed and propagated upwards, if a small object is encountered and its required opacity information is inner_op only, then an opacity quadtree comprising of a single fully transparent node that covers the entire render space is constructed. In addition, if the opacity information required at a node is inner_op only, then the node's worthiness ratio can also be determined. If the ratio is below some threshold, then the following steps can be taken:

(i) the opacity quadtree of the object can be replaced by a quadtree comprising of a single fully transparent node; and (ii) the object can be labelled as small.

Since there is a possibility of a relabelling of nodes in regards to their sizes, the changes need to be propagated upwards. Thus as the GOB tree is traversed, the size of each object can be redetermined based on the sizes of its children in accordance with Table 6.

It has been shown above that the obscurance analysis can be selectively applied, and a heuristic has been described for identifying objects that are worthy candidates for optimisation, in the form of the worthiness ratio. The heuristic essentially gives an indication of how large an object needs to be in relation to other parameters, before it can be considered as a candidate. A natural question that arises is what typically is the size of such an object.

Knowing the typical size of an object allows an indication to be determined of whether obscurance analysis is worth doing at all. For example, if the size of such objects is very large, then it is not worth performing the obscurance analysis since very large objects seldom occur. On the other hand if the size of the objects is very small, then the worthiness ratios of objects does not need to be determined.

The value of the worthiness ratio of an object not only depends on the object's properties such as size, but is also dependent on the objects being obscured. Obscurance analysis is only of benefit when applied to complex graphics primitives such as images. These are objects that require considerable computational resources to process, and hence the removal of redundant processing results in shorter overall rendering time. Simple objects can be more quickly processed and rendered in fill, rather than having to perform obscurance analysis by propagating quadtrees.

The time needed to process an image is proportional to the area of the image and the render resolution. Thus, when an image is obscured by an object, the expected time saving can be expressed as $$t_f = k \cdot area \cdot resolution$$

where k is some constant, and area is the area of the obscured region. This can be related to the area of the obscuring object itself, denoted by $area_{obj}$, by adding a constant representing the fraction of the obscuring object that actually overlaps the image, as follows $$t_I = \alpha \cdot k \cdot \text{area}_{obj} \cdot \text{resolution} \quad (2)$$

For processing quadtrees, it is assumed that the time for a single merge operation is proportional to the perimeter of the objects. Performing obscurance analysis typically requires 2 to 4 merge operations at each node in the GOB tree representing the image (i.e. 1 operation to compute the opacity quadtree of the parent node, and 1 to 3 operations to propagate the parent's obscurance quadtree down to the child nodes). Thus if a potential obscurer is located N distances away from an image object, then an average of 3N merge operations is needed to process the obscurance. The time needed to process the obscurance is then $$t_P = h \cdot \text{perimeter} \cdot 3N \quad (3)$$

where h is some constant. For obscurance analysis to be beneficial, $t_I > t_P$ or $$\alpha \cdot k \cdot \text{area}_{obj} \cdot \text{resolution} > h \cdot \text{perimeter} \cdot 3N \quad (4)$$

is required.

The constant k, which is related to the execution time of an image processing module, is dependent on the image involved. Choosing $k = 1/28700$ sec per mm$^2$ per 72 dpi resolution, $h = 0.082 \times 10^{-6}$ sec per unit perimeter (Note: the values for k and h have been determined from experiments carried out by the inventors on an arbitrary image processing module). Eq (4) then becomes:

$$\alpha \cdot (1/28700) \cdot \text{area}_{obj} \cdot (\text{resolution}/72) > 0.082 \times 10^{-6} \cdot \text{perimeter} \cdot 3N \quad (5)$$

where $\text{area}_{obj}$ is in mm$^2$, resolution is in dpi, and perimeter is in unit cell in the quadtree representation. For a quadtree of depth 7 and a render space of A4 size, a unit cell is of size 2.32 mm. Also assuming a rendering resolution of 400 dpi and that the obscuring object is a square of sides a mm, then:

$\text{area}_{obj} = a^2$ mm$^2$; and perimeter=$4a$ mm=$4a/2.32$ unit cell.

Substituting into Eq (5), $$\alpha \cdot (1/28700) \cdot a \cdot (400/72) > 0.082 \times 10^{-6} \cdot (4/2.32) \cdot 3N,$$

where $a > 0.00219$ N/$\alpha$ mm.

Finally, assuming that on average, 20% of the obscuring object overlaps the image, the relationship between a and N is then tabulated in Table 7.

TABLE 7

| N | a(mm) |
|---|---|
| 500 | 5.48 |
| 1000 | 11.0 |
| 2000 | 21.9 |
| 5000 | 54.8 |
| 10000 | 111.0 |

It can seen from Table 7 that for an object of reasonable size, say 2 cm×2 cm, benefits in performing obscurance analysis on the object can be expected, even when the object is some 2000 distances away from an image object in the GOB tree. Thus, obscurance analysis using quadtrees improves rendering efficiency.

6.0 Using Obscurance Quadtrees to Limit the Processing when Rendering Images

As described above in the preceeding sections, the resulting product of obscurance analysis is a set of obscurance quadtrees which can then be used to avoid redundant work in processing and rendering objects or parts of objects that are obscured by others. Objects that are simple to render are not assigned an obscurance quadtree, and are rendered in a conventional manner.

For complex objects that have been marked as candidates for optimisation, an obscurance quadtree has been assigned to each object. The obscurance quadtree can be overlaid on top of the object to identify regions that are hidden and need not be rendered.

FIG. 43 is a flow chart showing a method of rendering an image using quadtrees in order to avoid redundant work in processing and rendering objects or parts of objects forming the image. Opacity and obscurance quadtrees have preferably previously been propagated for the image using the methods described in section 2.5. The process begins at step 4301, the GOB tree representing the image is traversed in order to find a first object that has been previously marked as a candidate for optimisation. The object has been marked as a candidate for optimisation using the worthiness ratio as discussed above. At the next step 4303, if there are no objects marked for optimisation then the image is rendered in a conventional manner, at step 4315, and the process concludes. Otherwise, the process continues to step 4305, where the object image is partitioned into a plurality of equally sized small rectangular image cells. At the next step 4307, the obscurance quadtree that has been assigned to the first marked object is overlayed on the object. At the next step 4309, the obscurance quadtree is traversed to identify which of the image cells for the object fall under the visible region of the quadtree. At the next step 4311, the object is rendered only in regions that fall under the visible region of the quadtrees associated with the object. At the next step 4313, if the GOB tree representing the image has been fully traversed, then the process concludes. Otherwise, the process returns to step 4301.

Figure 19:
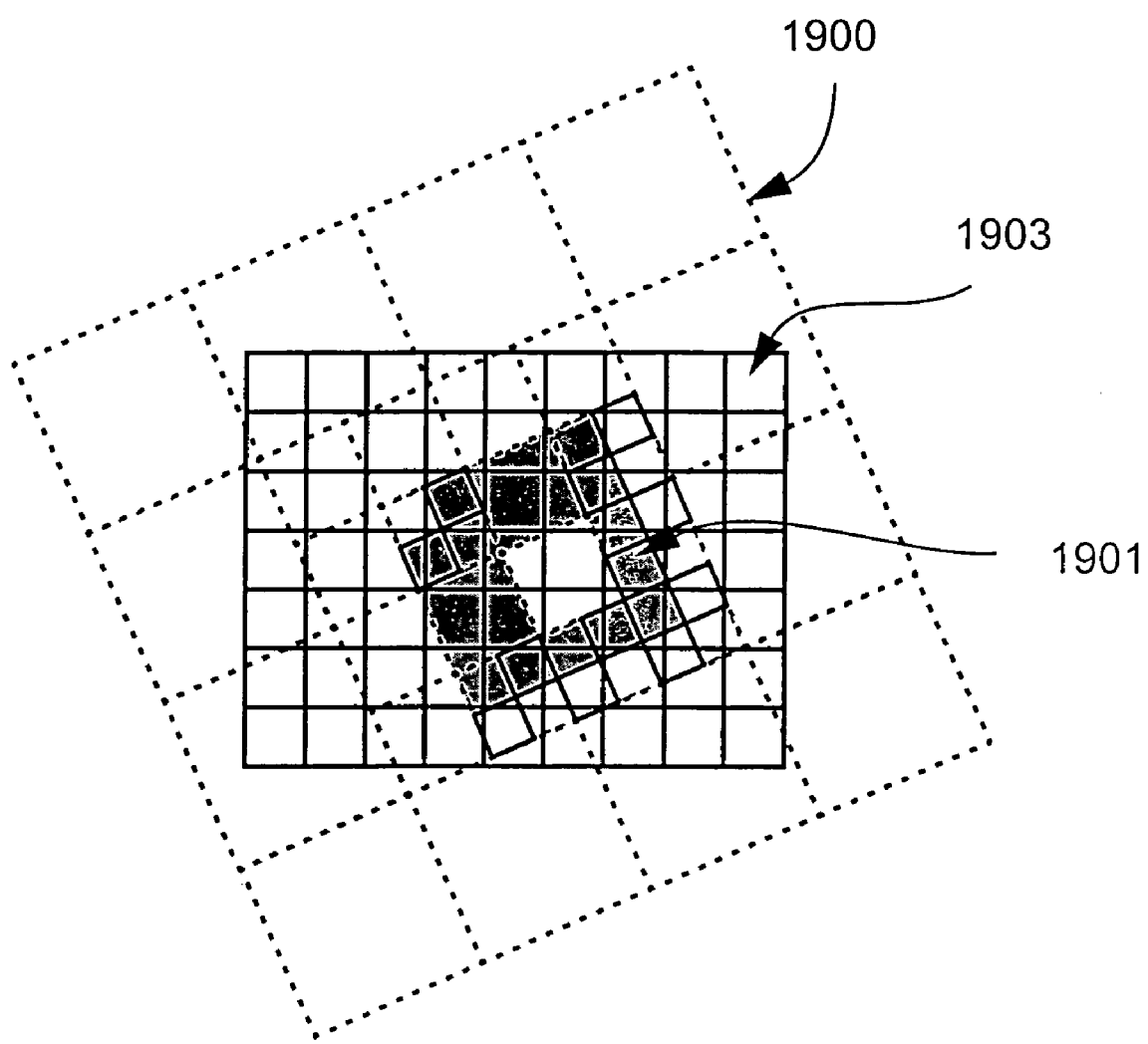
FIG. 19 shows an obscurance quadtree overlayed on top of an image object.

Due to the possible presence of rotational transformations, the orientation of an object image can be at an angle with an associated obscurance quadtree. Each image object can be viewed in terms of the image's own coordinate space, in which case an object's obscurance quadtree is oriented at an angle. FIG. 19 shows an obscurance quadtree 1900 overlayed on top of an image object 1901. The image object 1901 has been partitioned into small rectangular cells (e.g. 1903) to facilitate the application of obscurance analysis. The image can be processed and rendered on a cell-by-cell basis, whereby each cell (e.g. 1903) can be tested to determine whether it lies entirely within the hidden region of the obscurance quadtree 1900. Hidden cells can be ignored, whilst the remaining cells can be rendered in a conventional manner. Since certain graphics formats (e.g. JPEG) by nature partition images into rectangular cells, this same partitioning can be applied to obscurance analysis allowing cells to be easily addressed and retrieved.

Two variations of the method described in FIG. 43 are described below. In section 6.1 an image centric method is described and in section 6.2, a quadtree centric method is described.

6.1 Image Centric Methods

In accordance with the image centric method, the image cells are examined in a systematic manner (eg. top to bottom or left to right) at step 4309, where each cell requires a traversal of the obscurance quadtree representing an image object to locate nodes that overlap the cell, in order to determine whether the cell completely falls within the hidden region. One disadvantage of the image centric method is the difficulty of keeping the number of traversals of the obscurance quadtrees for an image object down to a minimum as it can be necessary to visit each node in a quadtree multiple times.

Figure 20:
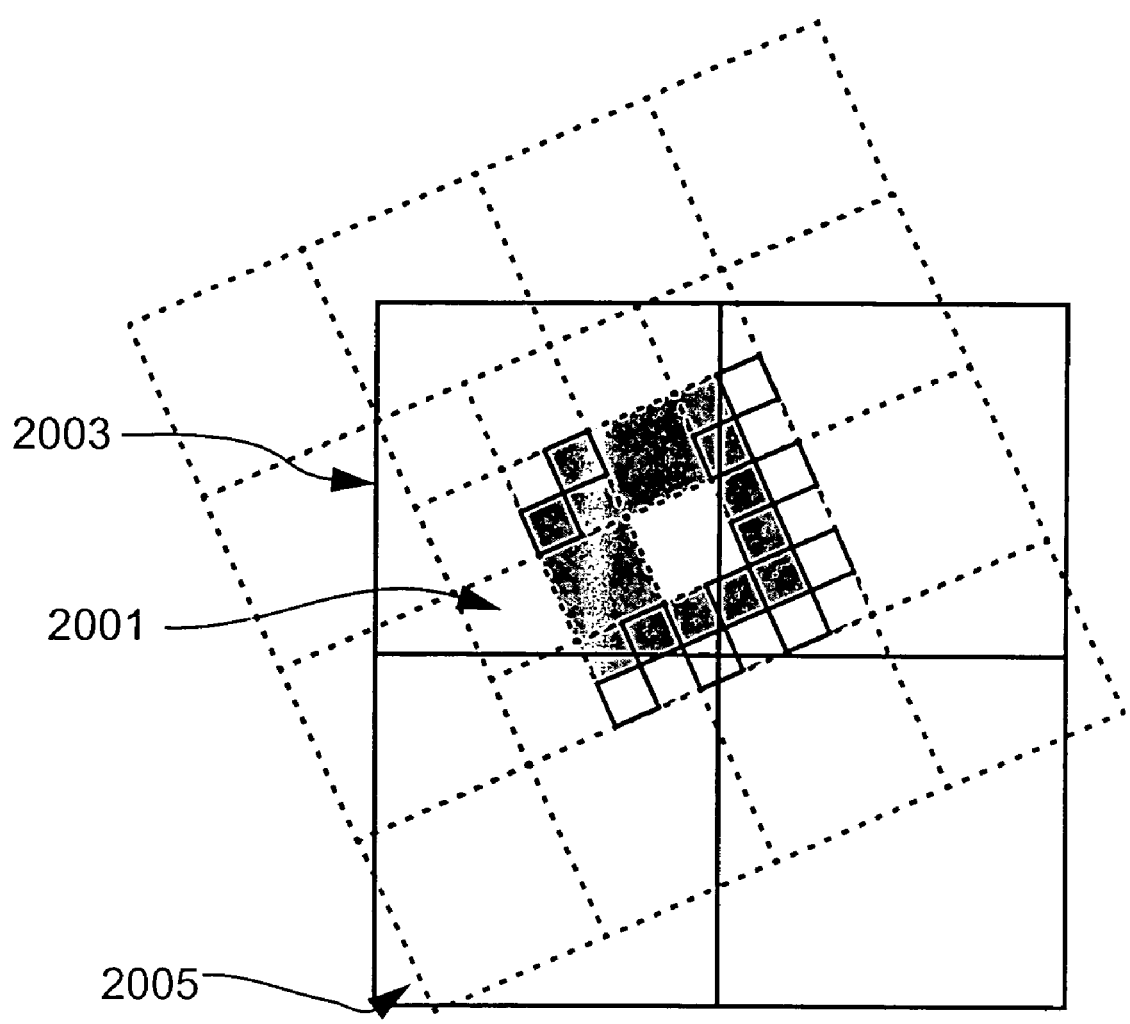
FIG. 20 shows the visibility of an image cell in accordance with an image centric method.

Testing the visibility of an image cell involves checking the node values of all quadrants in an obscurance quadtree that overlap with or are fully enclosed in the cell. Since a quadrant may touch more than one cell, image centric methods must traverse the quadtree more than once. For example as seen in FIG. 20, the quadrant 2001 is in image cells 2003 and 2005.

6.2 Quadtree Centric Method

The quadtree centric method treats the obscurance quadtree for an object as the primary object. A traversal of the quadtree is performed, at step 4309, in order to generate a map of the visible region, in the form of a scan converted representation of the quadtree. Each 'pixel' in the map corresponds to a single image cell. The map is then used to discriminate between visible and hidden image cells, at step 4313, whereby the pixels act as flags indicating visible and hidden image cells. The advantage of the quadtree centric method is the fact that the obscurance quadtree for an object is traversed only once. One disadvantage is the creation and storage of the intermediate 'visibility' maps. However, by a careful choice of the order in which a quadtree is traversed, and by using a suitable format, the map can be created efficiently and without excessive storage requirement, as will be described in more detail below.

6.2.1 Preferred Format of the Visibility Map

Since there is a 1-to-1 correspondence between a pixel in the visibility map and an image cell, the size of the map can be determined by the dimensions of the image in terms of the number of cells. For large images, representing the map in the raw pixel format can consume substantial storage space. Preferably, a form of run-length encoding is utilised. A visibility map can be decomposed into individual rows where on each row, consecutive runs of visible cells are represented by a pair of numbers signifying the starting and ending (horizontal) positions of the sequence. Although it is possible that run-length encoding can take up more storage space than the raw pixel format, for example, if there is a large number of small isolated visible cells, in practice this rarely occurs.

6.2.2 Order of Traversal of the Obscurance Quadtree

One advantage of the run-length format is that it allows the visibility map to be generated more efficiently. The visibility map can be generated by traversing the obscurance quadtree and appending visible cells to the map when visible nodes are encountered. Appending extra cells under the run length encoded format typically requires the update or insertion of two numbers, as opposed to updating the values of individual pixels in the raw pixel format. However, some search can be necessary to locate the appropriate numbers or insertion point if the new cells are added to the middle of a row. Fortunately, by traversing the quadtree in a certain order, described in detail below, searching for the appropriate numbers or insertion point is not necessary. New cells can always be appended to the end of each row, which can be performed without any search.

The order in which the obscurance quadtree for an object is traversed depends on how the obscurance quadtree is oriented with respect to the object's image coordinate space, due to the presence of rotational and reflection transformations. Regardless of how the quadtree is oriented, preferably the four quadrants at each non-leaf node are traversed in the top-down, left to right manner with respect to the image coordinate space.

Figure 21:
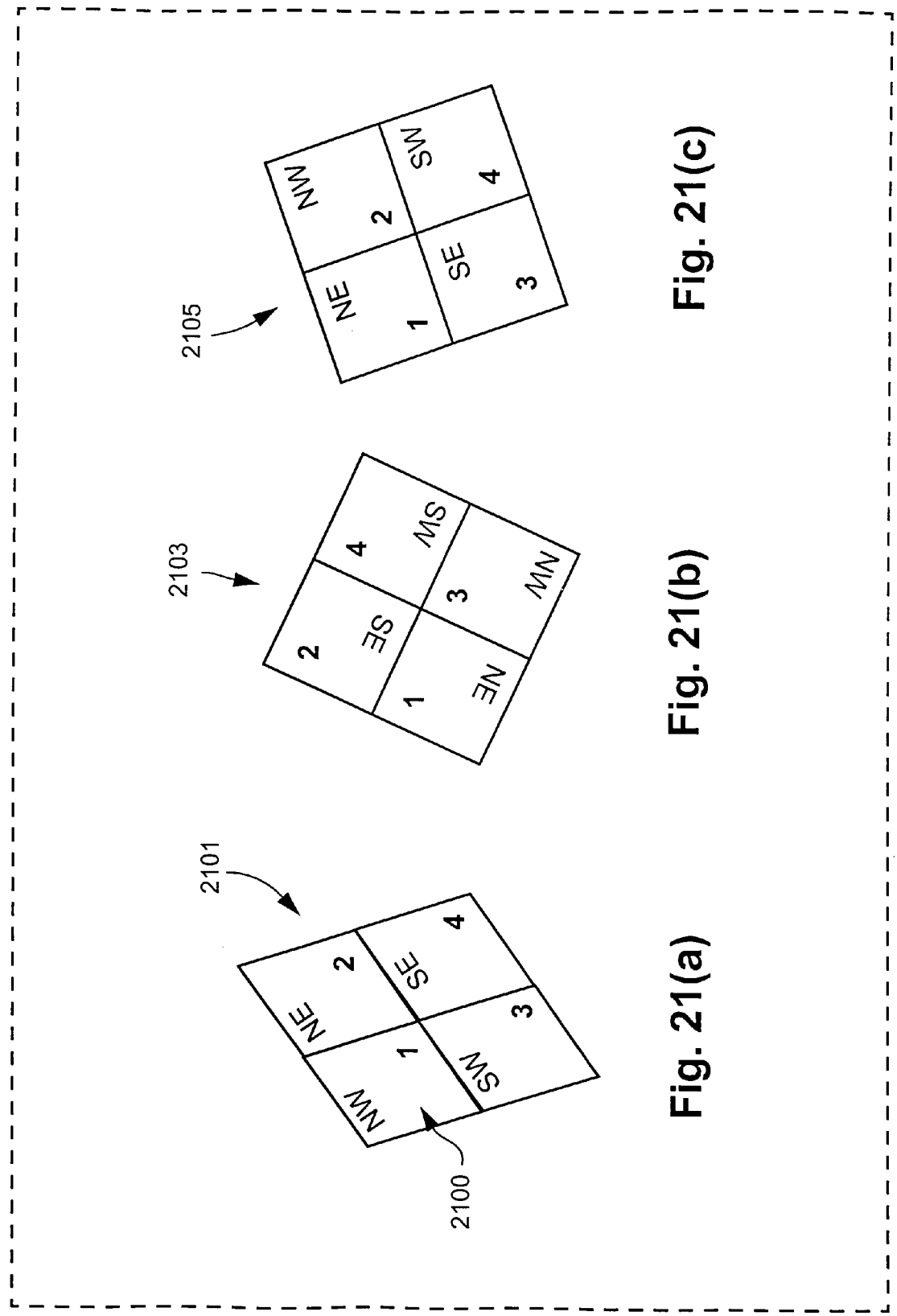
FIGS. 21(a), (b) and (c) show three examples of the order in which quadrants are visited in quadtrees that have undergone various rotations, reflections and shearing.

FIGS. 21(*a*), (*b*) and (*c*) show three examples of the order (i.e. 1, 2, 3, 4) in which quadrants (e.g. 2100) are visited in quadtrees 2101, 2103 and 2105, respectively, that have undergone various rotations, reflections and shearing. Preferably, the western most quadrant is visited first, followed by the northern most, southern most and then finally the eastern most quadrants. It can be shown why this ordering works by drawing any horizontal line over the quadrants (ie. 1, 2, 3 and 4). When scanned from left to right, the line will always intersect the quadrants in the order given above. Thus, during the generation of the visibility map, cells lying on a certain row in the quadrant numbered 1 will always be added to the map before cells lying on the same row in a sibling numbered 2, which in turn will always be added before cells in a sibling numbered 3, and so on. Therefore, new cells will always be added to the right of a row.

6.2.3 Images Lying Partially Outside of the Render Space

Figure 22:
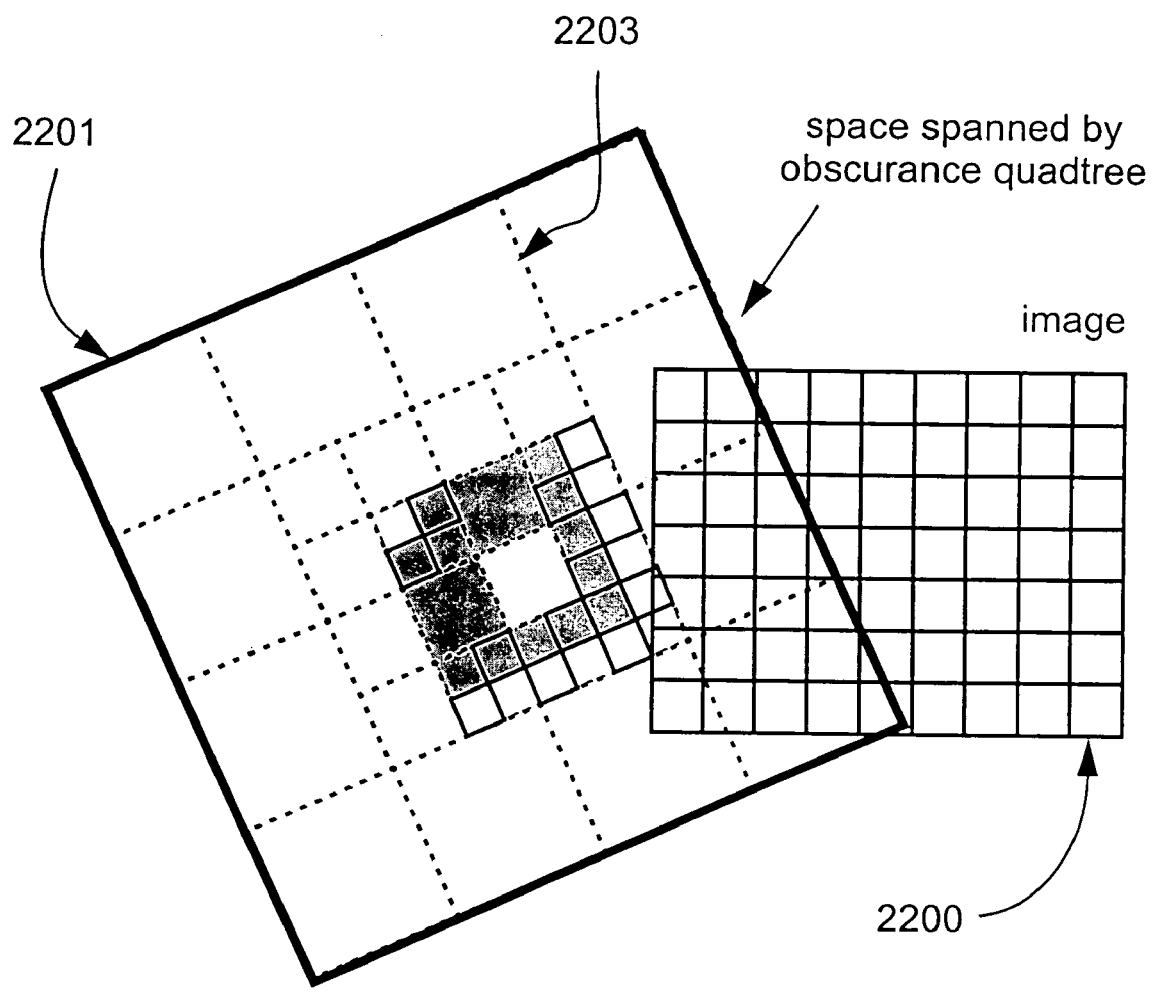
FIG. 22 shows an image lying partially outside of an image render space.

It can be possible that an image is composited such that the image lies partially outside the render space, or more precisely, outside of the space spanned by the obscurance quadtree. FIG. 22 shows an image 2200 lying partially outside of the render space 2201.

Since the space 2201 spanned by the obscurance quadtree 2203 is at least as large as the render space 2201, any point that lies outside of the space 2201 can be considered to be hidden.

6.2.4 Generating a Visibility Map

Figure 13:
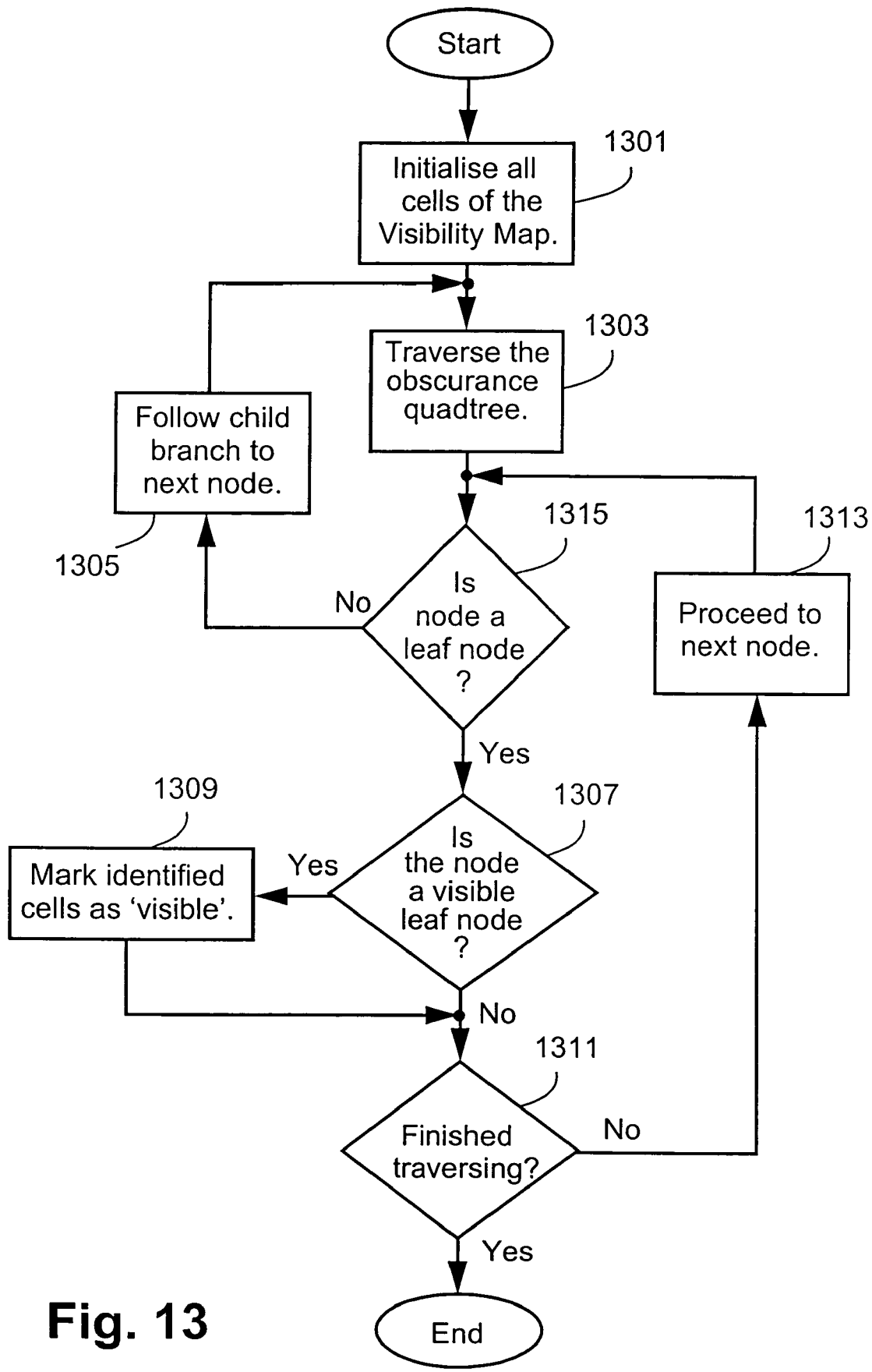
FIG. 13 is a flow chart showing a method of generating a visibility map for an image to be rendered.

FIG. 13 is a flow chart showing the method of generating a visibility map, at step 4309, for an image to be rendered. The process begins at step 1301, where all cells of the visibility map are initialised as 'hidden'. At the next step 1303, the obscurance quadtree associated with the image is traversed in a top-down manner. The process continues to step 1315, where at each node, if the node is a non-leaf node then the child branch is followed in the preferred order, at step 1305, and the process returns to step 1303. Otherwise, the process proceeds to step 1307, where if the node is a visible leaf node, then the process proceeds to step 1309 where cells that intersect with or are fully enclosed within the quadrant represented by the node are identified utilising the position, orientation and size of the quadrant. These cells are marked as being 'visible'. Otherwise, if the node is an invisible leaf node at step 1307, then the process proceeds to step 1311. At step 1311, if the entire obscurance quadtree has been traversed the process concludes. Otherwise, the process proceeds to the next node at step 1313, and then returns to step 1315.

Accordingly, by beginning with a map in which all cells are hidden, and then traversing the quadtree and 'coloring' in cells lying underneath 'visible' quadrants of the quadtree, cells that lie outside of the span of the quadtree can automatically be labelled as 'hidden' since they are never visited.

Step 1309 is the most difficult step of the method as it is preferably achieved by scan converting the rotated quadtree in the coordinate space of the visibility map. The key issues involved in performing step 1309 will now be examined in more detail.

6.3 Mapping Visible Cells

Having overlaid a rotated obscurance quadtree on top of an image object, as at step 4307, a visibility map can be generated for the image, at step 4309, by identifying which image cells fall under the visible region of the quadtree. Cells that partially fall under the visible region are also considered to be visible. Preferably the visible quadrants of the obscurance quadtree are scan converted by converting the quadtree into a series of (i.e. possibly complex) polygons and then scan converting the polygons. Alternatively, the individual visible quadrants can be scan converted separately.

One advantage of scan converting the individual visible quadrants is that it does not require the intermediate conversion step, and that scan converting a rectangle/parallelogram is considerably simpler than scan converting a complex polygon. One disadvantage of scan converting the individual visible quadrants is that the number of visible quadrants in the quadtree can be large and hence scan converting them individually can be time consuming. In particular, edges that are common between adjacent visible quadrants need to be scan converted twice, whereas by converting the quadtree into a series of polygons and then scan converting the polygons, such edges do not exist.

Figure 23:
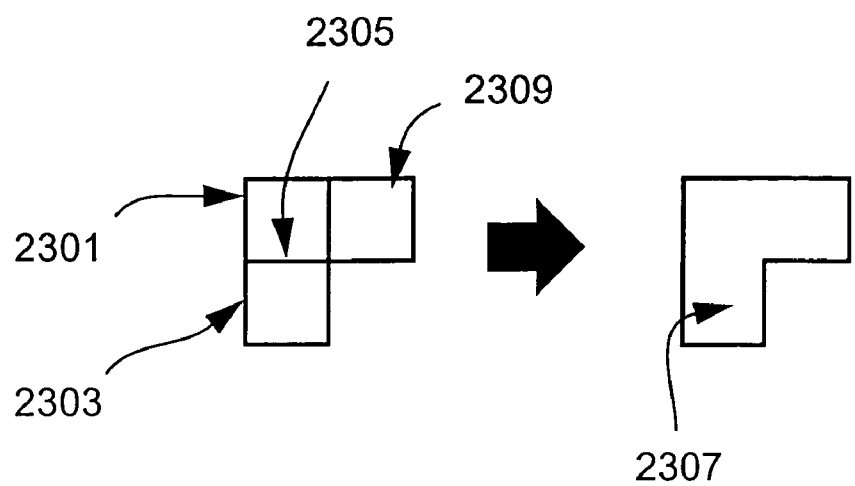
FIG. 23 shows how adjacent quadrants can be merged together to eliminate their common edges.

Preferably, adjacent quadrants 2301, 2303 and 2309 can be merged 2307 together to eliminate their common edges 2305, as illustrated in FIG. 23. Preferably, this is only performed on a selective basis to minimise processing time. In addition, the resulting polygons are preferably simple so that they can be scan converted easily. The resulting polygons can be restricted to rectangles.

Figure 24:
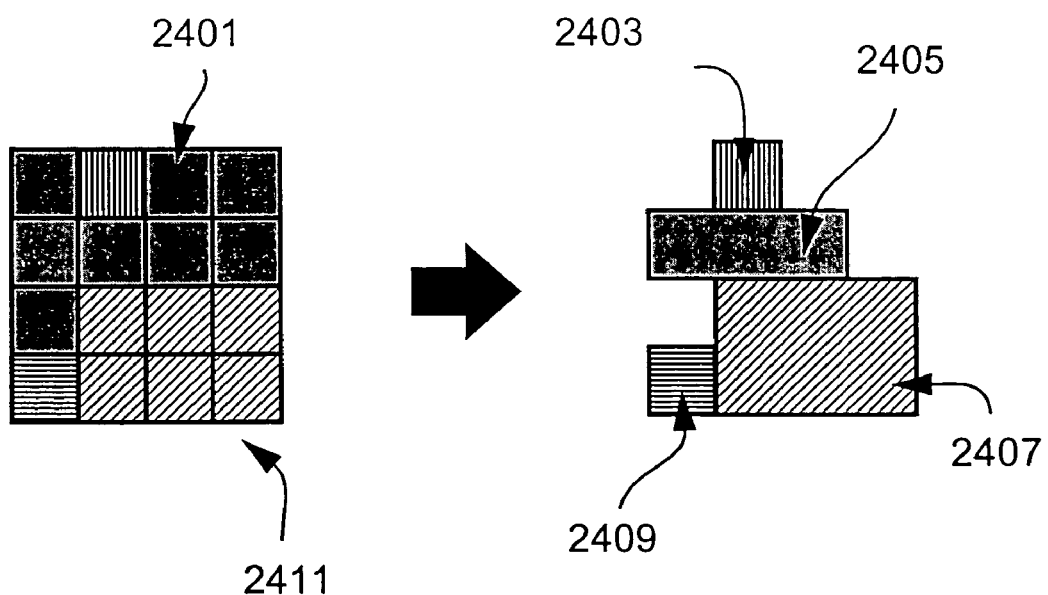
FIG. 24 shows an irregularly shaped visible region that has been converted into a series of rectangles.

The packed data representation described above can be utilised to efficiently merge quadrants lying on levels 0 and 1 that share a common ancestor into larger rectangles. In other words, each quadtree can be divided into blocks of size 4 by 4 cells and adjacent quadrants within each block can be merged together. Preferably, no cross-block merging is performed. The object of the merge operations is to describe the visible region in each block by a set of non-overlapping rectangles. For example, FIG. 24 shows an irregularly shaped visible region 2411 that has been converted into a series of rectangles 2403, 2405, 2407 and 2409. The visible region 2411 shown in FIG. 24 is comprised of 11 cells (i.e. not including the grey cells (e.g. 2401)) and can be represented by the four rectangles 2403, 2405, 2407 and 2409.

For maximum effectiveness, the number of rectangles is preferably kept to a minimum. Given an arbitrary region, determining a minimum set of rectangles that precisely represent the region is generally a complicated exercise. However, if the merging of adjacent quadrants is limited to within each 4 by 4 block as described above, then determining a minimum set of rectangles that precisely represent the region can be implemented using lookup tables.

Figure 14:
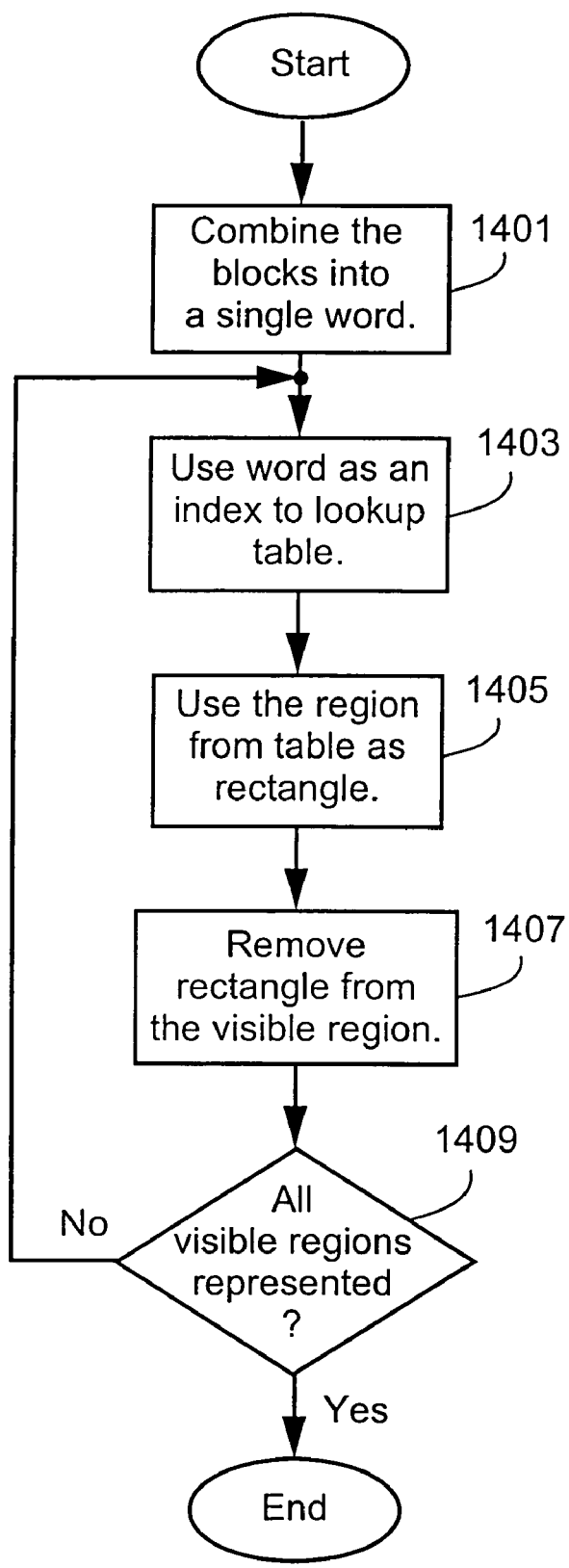
FIG. 14 is a flow chart showing a method for fitting rectangles within a 4×4 block using a table look-up.

As described above, in the packed data representation, the values of sibling nodes on the bottom most level can be packed into a single number. For obscurance quadtrees where each node can take on one of two values, 4 bits are needed (as opposed to 8 bits for opacity quadtrees). A 4 by 4 block thus requires a total of 16 bits. FIG. 14 is a flow chart showing a 'rectangularisation' method for fitting rectangles within a 4 by 4 block using table look-up. The process begins at step 1401, where the packed data structures of the four 2×2 sub-blocks are combined into a single 16 bit word. At the next step 1403, the 16 bit word is used as an index into a look up table. Each entry in the table holds the positions of the left, right, top and bottom sides of a rectangle that can fit into the region denoted by the look up word. Since each side of the rectangle can take on one of four possible positions within a 4 by 4 block, each side of the rectangle can be represented by a 2-bit number. Thus a single byte of data is sufficient to represent the four sides of the rectangle, resulting in the look up table being of size $2^{16}$=65536 bytes. At the next step 1405, the rectangular region returned by the table look up constitutes one of the resulting rectangles. At the next step 1407, the rectangle just found is removed from the visible region and a new 16-bit word representing what visible region that remains is constructed. The process then returns to step 1403, after checking whether or not all of the visible regions have been represented at step 1409.

Figure 25:
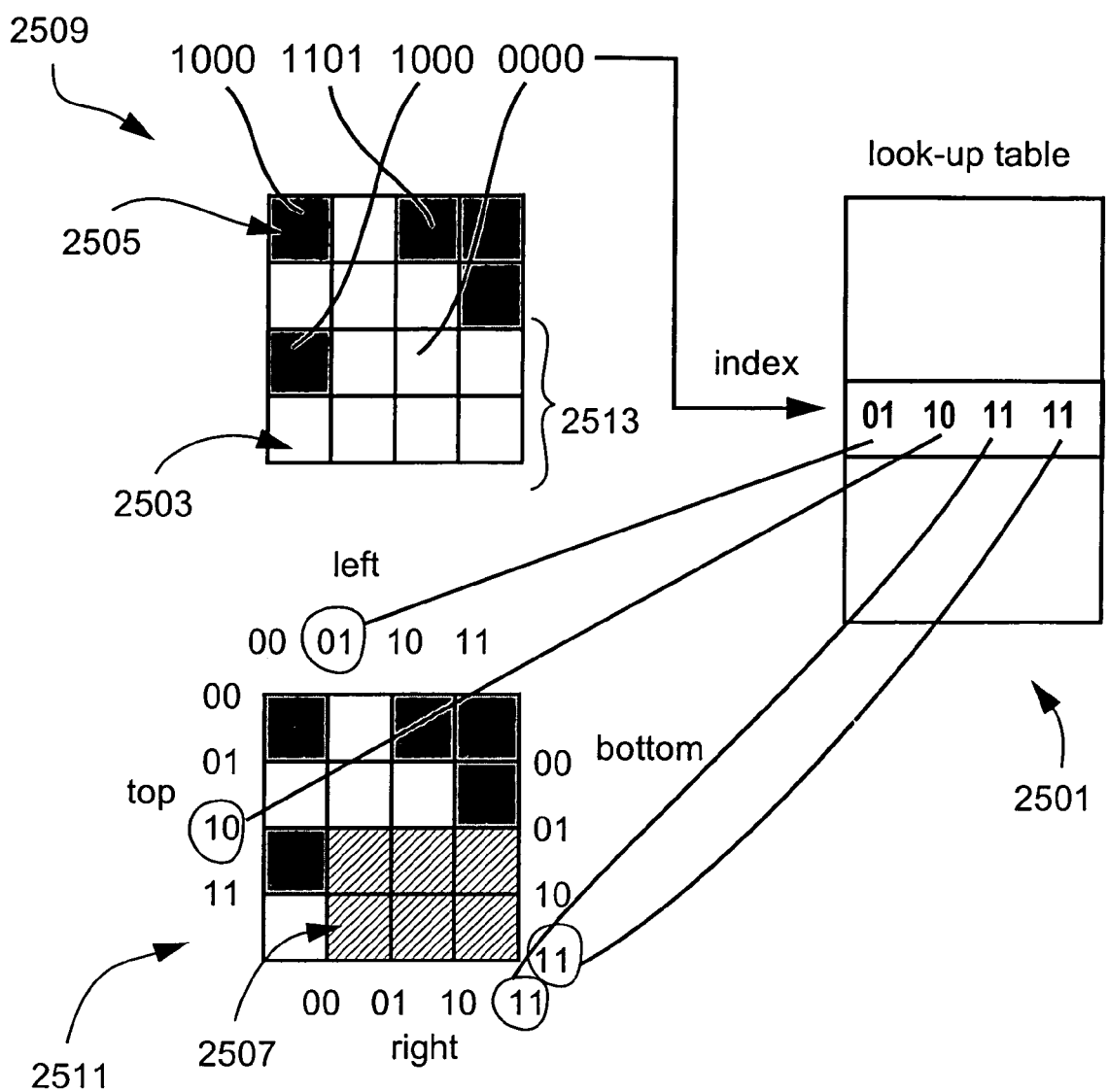
FIG. 25 shows the preferred format of a look-up table.

FIG. 25 shows the preferred format of a look-up table 2501 used in step 1403. White (e.g. 2503) and solid grey (e.g. 2505) cells denote visible and hidden quadrants respectively. Hashed cells (e.g. 2507) denote visible cells that are to be merged into a single rectangular region. The top block 2509 shows how the packed data contents of the 4 sub-blocks (e.g. 2513) can be combined to give a 16-bit index for the look up table 2501. The bottom block 2511 shows how the 8-bit entry in the table 2501 is broken up into coordinates of the 4 sides of the rectangular region (i.e. denoted by the hashed cells) residing within the visible region.

The look up table 2501 is preferably set up so that each entry in the table represents a rectangle that makes up a set of minimum number of rectangles that fits into the region denoted by the index to that entry. If each entry in the table 2501 represents a rectangle that makes up a set of minimum number of rectangles that fits into the region denoted by the index to that entry, then the method of FIG. 14 will return a minimum set of rectangles.

6.3.1 Effectiveness of the 'Rectangularisation' Method

An indication of the benefit of the rectangularisation method of FIG. 14 can be obtained by comparing the total perimeter of the resulting rectangles with the total perimeter of the individual quadrants. The perimeter of an object gives a good estimate of the processing time needed to scan convert the object since scan conversion operates on the object's edges. The inventor found through experimental results obtained from fitting rectangles to randomly generated 4×4 blocks an improvement of 20%.

The 20% figure is due to the fact that randomly generated blocks tend to be poor candidates rectangularisation. As a result, the number of cells able to be merged tends to be low. The actual advantage in practice is higher since real quadtrees have more uniform regions, which make the quadtrees better suited for rectangularisation.

6.4 Optimal Scan Conversion Ordering

In Section 6.2.2, a method of selecting an optimal order for traversing an obscurance quadtree was described. The order for traversing the obscurance quadtree can be selected regardless of the degree of rotation and shearing, such that the visibility map can be built up in a highly efficient manner. Allowing new visible cells to be appended to the end of each row rather than in the middle, thereby eliminating the need to search for the insertion point. Such a method is possible since the obscurance quadtree is mapped (ie. scan converted) onto the visibility map on a quadrant-by-quadrant basis. The order in which the quadtree is traversed guarantees that each quadrant is scan converted after its neighbour on the left.

The method described in section 6.2.2 is not applicable when adjacent quadrants have been merged as described above, since rectangles instead of individual quadrants are required to be processed when adjacent quadrants have been merged. An alternative method for identifying the optimal order in which these rectangles can be scan converted is described below, such that the visibility map can be built up with the same efficiency.

Figure 26:
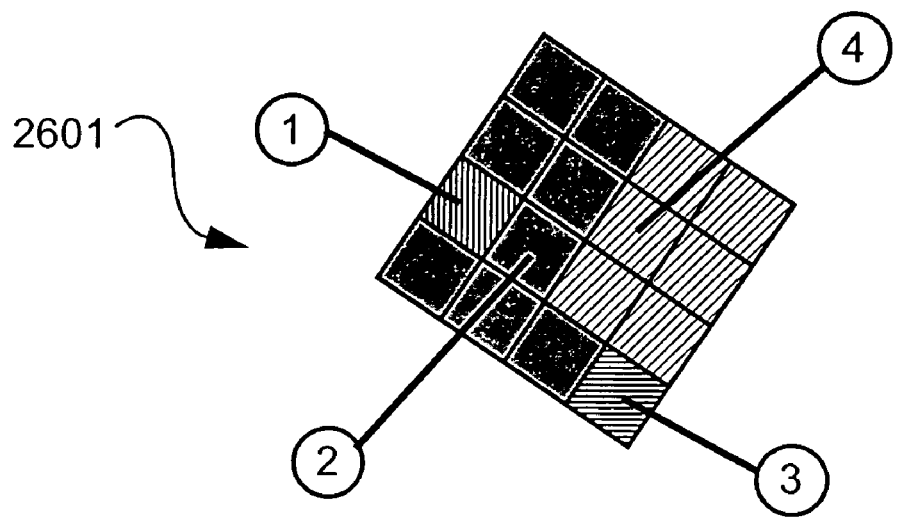
FIG. 26 shows an arbitrarily rotated 4×4 block of an obscurance quadtree in which the visible cells have been converted into non-overlapping rectangles.

Consider an arbitrarily rotated 4×4 block 2601 of an obscurance quadtree in which the visible cells (ie. excluding the solid grey cells) have been converted into non-overlapping rectangles (ie. 1, 2, 3, 4), as shown in FIG. 26. The required ordering of the rectangles is as shown in FIG. 26 (ie. 1, 2, 3, 4), which can be verified by drawing a horizontal line through the block 2601. The line should intersect the rectangles in the same order.

Although there are conventional methods for determining the priority order of a set of non-overlapping rectangles, the fact that the rectangles are confined to a 4×4 block can be utilised to provide an optimised method.

Figure 27:
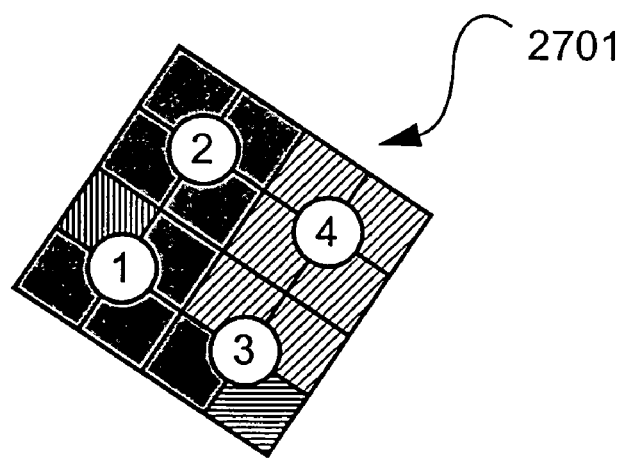
FIG. 27 shows a block divided into four 2×2 quadrants and the quadrants numbered from left to right in accordance with a preferred method.

Firstly, a number of useful properties of the rectangles will be examined. Given an arbitrarily rotated block 2701, if the block is divided into four 2×2 quadrants and the quadrants are numbered from left to right as shown in FIG. 27, then:

(i) a rectangle that resides entirely within quadrant i has higher priority than a rectangle residing entirely within another quadrant j, if i<j. However, if i=2 and j=3 or vice versa, then the relative priority between the two rectangles is immaterial;

(ii) a rectangle that appears in quadrant 1 and not in quadrant i, where i≠1, has higher priority than any rectangle that appears in quadrant i and not quadrant 1;

(iii) similarly, a rectangle that appears in quadrant 4 and not in quadrant j, where j≠4, has lower priority than any rectangle that appears in quadrant j and not quadrant 4; and (iv) if all rectangles that appear in quadrant 2 reside completely within the same quadrant, then the rectangles must have lower priority than all rectangles residing in quadrant 1, and higher priority than all rectangles residing in quadrant 4. A similar statement can be made for rectangles in quadrant 3.

In addition, within each quadrant:

(v) a rectangle occupying the left most cell has higher priority than rectangles occupying any of the three remaining cells; and (vi) similarly, a rectangle occupying the right most cell has lower priority than rectangles occupying any of the three remaining cells.

A method of utilising the above properties for determining the priority order of a set of non-overlapping rectangles on a 4×4 block is described below. The method works by examining the block on a quadrant by quadrant basis. Whilst doing so, the method maintains a working priority list by inserting rectangles that are encountered into the list at appropriate locations.

Figure 15:
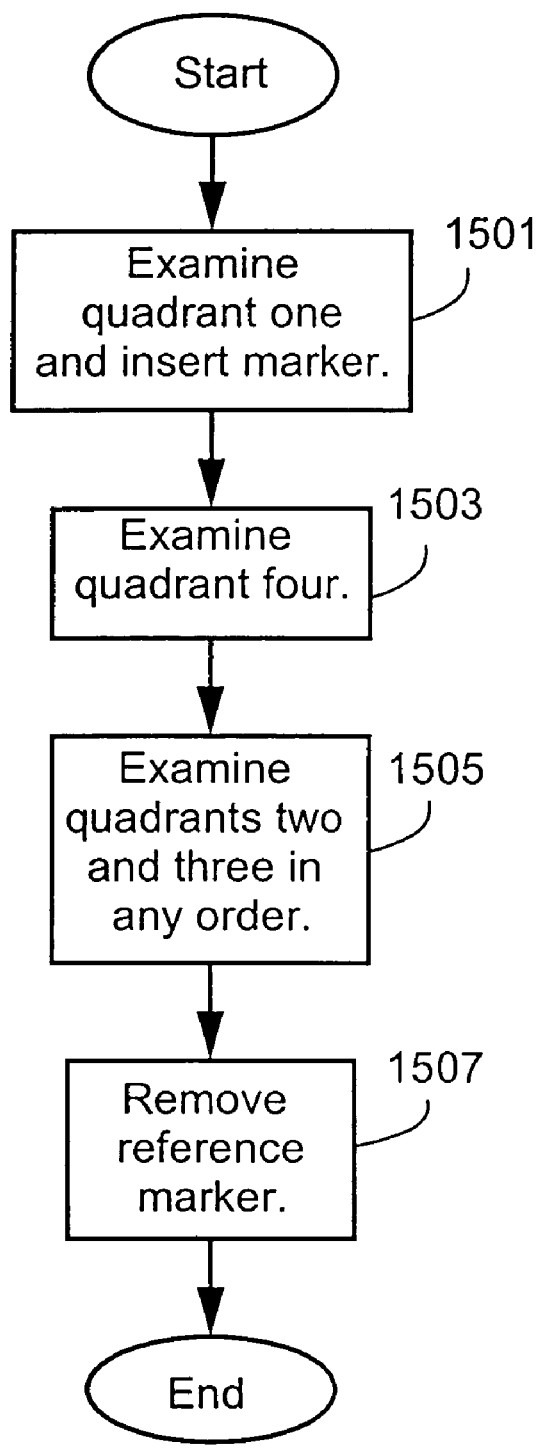
FIG. 15 is a flow chart showing a method for determining the scan conversion priority order of a set of non-overlapping rectangles on a 4×4 block.

FIG. 15 is a flow chart showing a method for determining the scan conversion priority order of a set of non-overlapping rectangles on a 4×4 block. The process begins at step 1501, where the quadrant numbered 1 (left most) of the block is examined. Properties (v) and (vi) are utilised to determine the relative priorities of all rectangles that appear in quadrant 1. References are added for the rectangles of quadrant 1 to the start of a working priority list in the order of the relative priority, followed by a dummy reference as a marker for later use. At the next step 1503, quadrant numbered 4 (right most) is examined. Again properties (v) and (vi) are utilised to determine the relative priorities of all rectangles that appear in quadrant 4. References for these rectangles are added to the end of the working priority list in the order of their relative priorities. It can be seen that if one of the rectangles (there is at most one) of quadrant 4 has already been encountered in quadrant 1 then the rectangle must occupy the right most cell of that quadrant, and is hence the lowest priority rectangle identified in step 1501. In addition, the rectangle must also occupy the left most cell of quadrant 4, and hence has highest priority out of the current set of rectangles in quadrant 4. Thus, the current set of rectangles can be joined to the end of the rectangles obtained in step 1501 to form a larger priority list. The dummy reference marker inserted at the end of step 1501 can also be removed. The process continues at step 1505, where for quadrants (2) and (3) (it does not matter which of these two quadrants is processed first), the same procedure of utilising properties (v) and (vi) is used to determine the relative priorities of the rectangles in quadrants 2 and 3. How, the rectangles of quadrant 2 and 3 are inserted into the working priority list depends on whether one of the rectangles has already been encountered in quadrant 1 and 4. If none of the rectangles of quadrant 2 and 3 have been encountered in quadrant 1 and/or 4 then property (iv) can be used to insert the new rectangles where the dummy reference marker was placed in step 1501. In this instance, the dummy marker could not have been removed at the end of step 1503 since if there exists a rectangle that resides on both quadrants 1 and 4, then the rectangle must also reside in quadrants 2 and 3 (i.e. the rectangle must occupy the four centre cells), and thus one of the rectangles in the current set must have been encountered previously. If one of the rectangles of quadrant 2 and 3 have been encountered in quadrants 1 and 4 then the priorities of the new rectangles can be determined from the relative priorities with the existing rectangles. If a new rectangle is of higher priority, then the new rectangle is inserted immediately before the existing rectangle, otherwise the new rectangle is inserted immediately after. The process concludes at step 1507, where the dummy reference marker is removed if it hasn't been removed previously.

Figure 28:
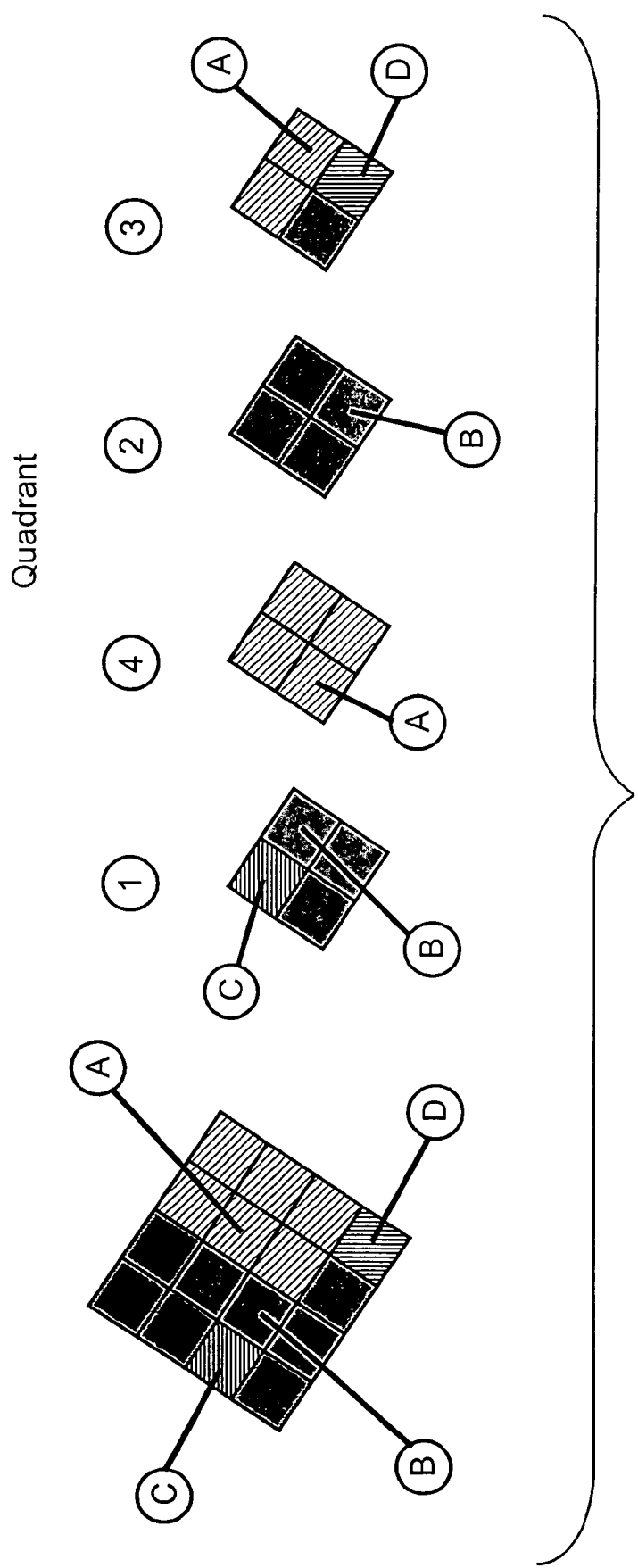
FIG. 28 shows a set of rectangles processed in accordance with the method of FIG. 15.

FIG. 28 shows an example of the method of FIG. 15. Consider the set of rectangles {A, B, C, D} shown in FIG. 28. Quadrant 1 is examined first, where B and C are present. Since B occupies the right most cell in quadrant 1, B has lower priority than C. Thus the working priority list at this point is [C, B, *], where * denotes the dummy reference marker. Next quadrant 4 is examined. In quadrant 4, A is the only rectangle present. Since A has not been encountered before, A is simply appended to the priority list, which now becomes [C, B, *, A]. The next quadrant to be examined is 2, which contains only a single rectangle B. B already appears in the priority list so B does not have to be included again. Thus the priority list remains unchanged. Upon examination of the remaining quadrant 3, it is found that D has higher priority than A, since A occupies the right most cell in quadrant 3. D is thus inserted into the priority list immediately before A, resulting in [C, B, *, D, A]. Finally, removing the unused dummy reference marker yields [C, B, D, A].

Determining the optimal scan conversion priority order of a set of non-overlapping rectangles is advantageous for two reasons. Firstly, in order to reduce the number of individual quadrants that need to be scan converted by combining adjacent ones into larger rectangles, and secondly, in order to represent the visibility map using run length encoding. Scan converting the rectangles in the correct order allows the run length encoded map to be generated highly efficiently.

There are alternative methods for generating visibility maps, that do not require the determination of priority ordering. These alternative methods include forgoing the merging of adjacent quadrants into rectangles, in which case the quadrants need to be scan converted individually, or representing the visibility map in a raw bitmap format instead of run length encoding. It has already been stated above that forgoing the merging of adjacent quadrants into rectangles leads to a potentially large number of quadrants present in a quadtree.

One disadvantage of using a raw bitmap format is that it would introduce an extra conversion step into the scan conversion process since the natural end products of scan conversion are run length-like coordinate pairs representing the starts and ends of pixel runs. The run length-like coordinate pairs would then need to be written pixel by pixel onto a visibility map and depend on the size of the map. A larger map would mean there are more pixels to 'turn on'. Another disadvantage of using raw bitmap format is the larger storage memory needed to accommodate the visibility map. Although this is probably not an issue for a single image since the resolution of the map is rather coarse compared to that of the image, it could become significant if there are many images present.

Another alternative method for generating visibility maps is to retain the use of run length encoding but avoiding the determination of priority ordering by pre-computing and storing all the necessary data in a look up table. Each entry in the look up table needs to hold the coordinates of up to 8 rectangles that make up each unique 4 by 4 block, rather than just a single rectangle as described in Section 6.3. In addition, the look-up table would need to include extra data to allow the priorities of the rectangles to be determined under any arbitrary orientation. It can be shown that such a look up table needs to be of 2 Megabytes in size, which is rather excessive.

7.0 Combining Obscurance Analysis and GOB Tree Optimisation

Of the different binary operators, the over (or rover) and in (or rin) operators are associative. That is, the composition a over (b over c) is equivalent to (a over b) over c. This property allows a sequence of over and rover operations, or a sequence of in and rin operations, to be rearranged and represented by a right leaning GOB tree. The rearrangement is known as GOB tree optimisation. A right leaning GOB tree is desirable since it can be rendered more efficiently.

This section describes how obscurance analysis can be combined with GOB tree optimisation. Preferably, the obscurance analysis and GOB tree optimisation methods are performed in parallel in order to reduce the total number of GOB tree traversals.

7.1 GOB Tree Optimisation

A GOB tree can be optimised by firstly, re-configuring the GOB into a right leaning structure where sequences of over and rover, or in and rin are encountered. Secondly, nodes can be arranged in such a structure so that more complex objects are located towards the bottom.

Figure 34:
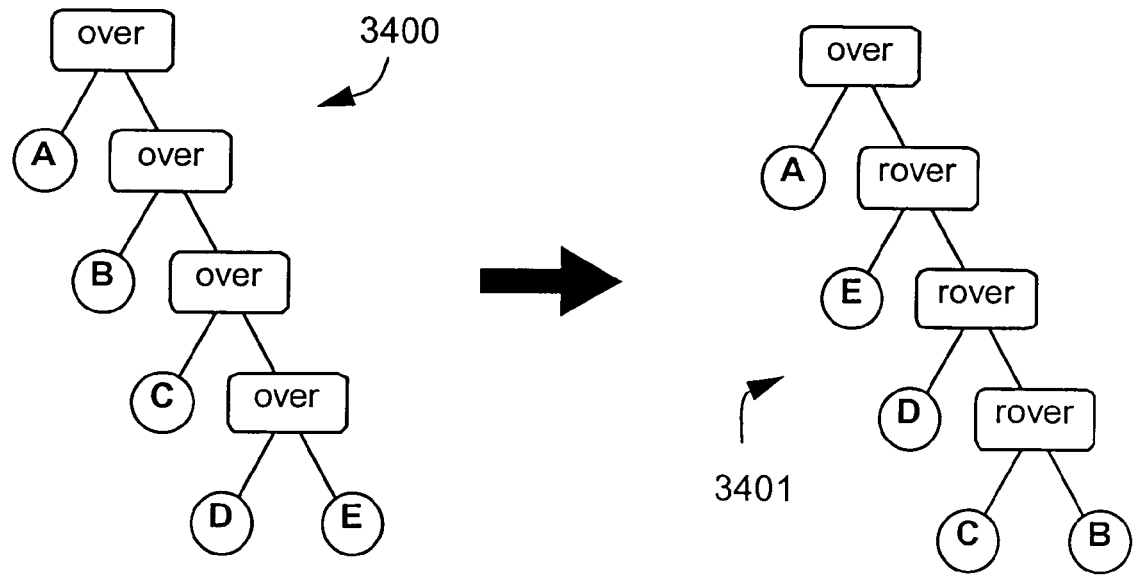
FIG. 34 shows the result of rearranging a right-leaning GOB tree in order to place some given node at the bottom of the tree.

For example, consider the GOB tree 3400 of FIG. 34. B is the most complex object in the chain. By converting some operators to rover, B can be placed at the bottom of the chain of GOB tree 3401. This conversion can be performed by keeping track of the most complex object found on the left side as the tree 3400 is traversed from the top down, and then reverse the chain from there onwards upon reaching the end of the chain. Thus in the example of FIG. 34, the chain of nodes found below B (i.e. B-C-D-E) in tree 3400, is reversed to form E-D-C-B in tree 3401.

Figure 35:
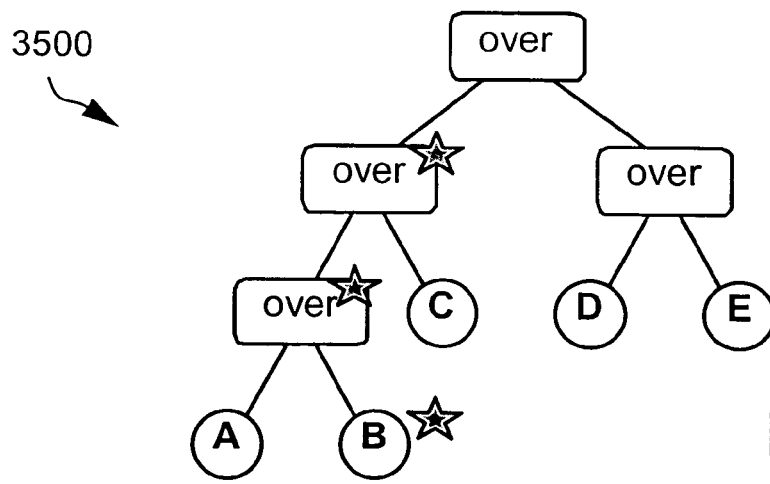
FIG. 35 shows a GOB tree with a tagged complex object node.

The GOB tree optimisation method outlined above generally requires two traversals of a chain and performs two updates to the GOB tree. However, the first traversal can be eliminated. For example, consider the GOB tree 3500 of FIG. 35 that is logically equivalent to the tree 3400 of the example in the preceding section. The GOB 3500 can be the original tree prior to having been transformed into a right leaning configuration. Assuming that object B of the GOB 3500 has been previously identified and tagged as the most complex object. Further assuming that B's ancestors have also been tagged as shown in FIG. 35. The tagging can be done at the same time as the computation of the objects' bounding boxes.

Figure 16:
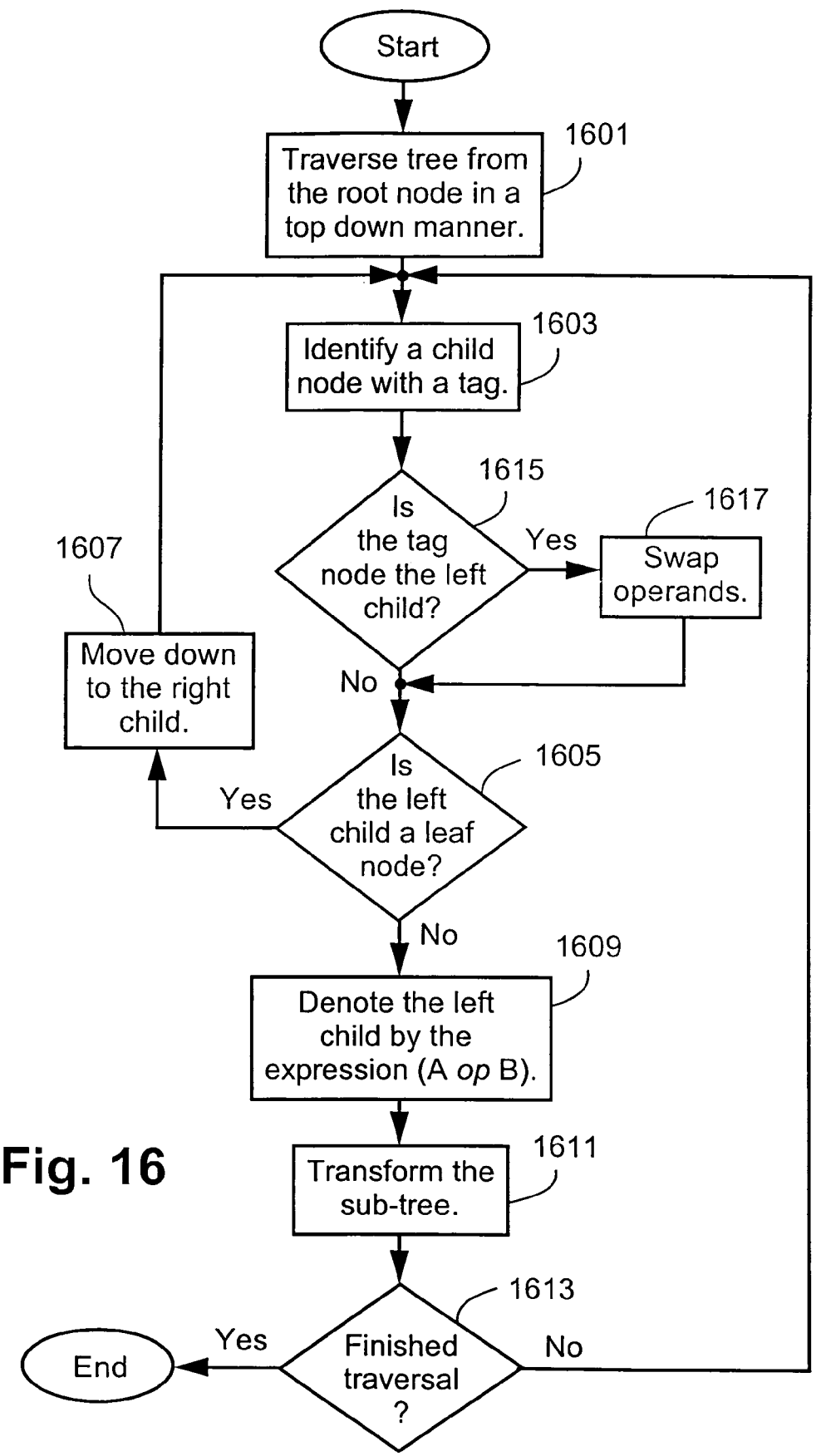
FIG. 16 is a flow chart showing an alternative method of optimising a GOB tree.

FIG. 16 is a flow chart showing an alternative method of optimising a GOB tree using obscurance analysis. The process begins at step 1601, at the top node of the GOB tree 3500. The GOB 3500 is traversed in a top-down manner. At the next step 1603, the child node with a tag (e.g. 3501) is identified. The process continues at the next step 1615, where if the tagged node 3501 is on the left child, then the process proceeds to step 1617 before proceeding to step 1605. At step 1617, the node's 3501 children are swapped and the operator is replaced by its opposite, as shown by the GOB 3601 of FIG. 36(a). At step 1605, if the left child is a leaf node, then move down to the right child node, at step 1607, and return to step 1601. Otherwise the left child is denoted by the expression (A op B), at step 1609. Also the right child is set to C. Thus, the subtree below the current node is denoted by (A op B) op C. At the next step 1611, the subtree is rearranged according to the following transformation:

(A op B) op C≡A op (B op C)

Before the transformation can be applied however, if the operator at the left child is not the same as that at the parent node, then the former needs to be inverted, as shown by the tree 3605 shown at FIG. 36(b). The resulting GOB tree 3603 after the transformation is shown in FIG. 36(c). If the whole tree 3500 has not been traversed at step 1613, then the process returns to step 1603. Otherwise the process concludes.

Figure 37:
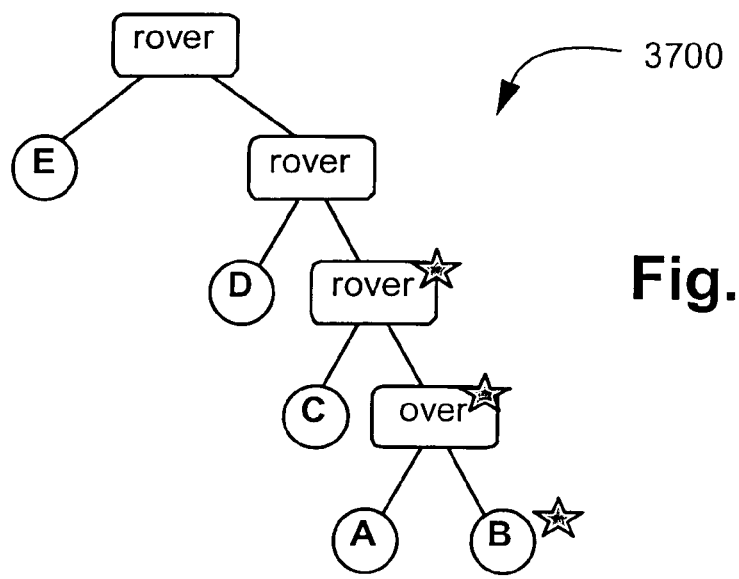
FIG. 37 shows the GOB tree of FIG. 35 after being processed in accordance with the method of FIG. 16.

The resulting GOB tree at the completion of the method of FIG. 16 is shown as the GOB 3700 in FIG. 37. Note that the GOB 3700 has a different structure but is otherwise logically equivalent to the tree 3400 shown in FIG. 34.

7.2 Performing Obscurance and GOB Tree Optimisation Using a Minimum Number of Tree Traversals The number of GOB tree traversals necessary to separately perform obscurance analysis and GOB tree optimisation can be summarised as follows. For obscurance analysis, one traversal is required to identify small objects and optimisation candidates, one traversal is required to compute the opacity quadtrees and one traversal is required to compute the obscurance quadtrees. For GOB tree optimisation, one traversal is required to compute the bounding boxes and one traversal is required to reorganise the GOB tree into a right-leaning structure. Thus up to 5 traversals of the GOB tree can be required in total. Preferably, the obscurance analysis and GOB tree optimisation method can be performed simultaneously. Fortunately, the computation of bounding boxes is quite independent of the obscurance analysis process and can hence be done in parallel with the first traversal of the quadtree propagation, as at step 4101. Note however, that bounding box minimisation in the presence of in and out binary operators can lead to part of the GOB tree being re-traversed multiple times, and possibly can result in parts of the GOB tree being removed due to total obscurance. If re-traversal occurs, the small object and optimisation candidate flags and the "distance to the nearest complex object" value at each node for use in obscurance analysis need to be redetermined with each re-traversal.

Combining the second traversal in the GOB tree optimisation process with the remaining steps in obscurance analysis is more complicated, since GOB tree analysis can alter the structure of the GOB tree, and hence can invalidate attributes assigned to each node for use in obscurance analysis. To avoid this problem, the restructuring of the GOB tree is preferably performed during the third traversal of the obscurance analysis method as at step 4107, when the final obscurance quadtrees have been obtained for nodes undergoing the transformation.

An example in which obscurance quadtrees and GOB tree optimisation is carried out in one traversal is given in section 8.3.1.

Figure 17:
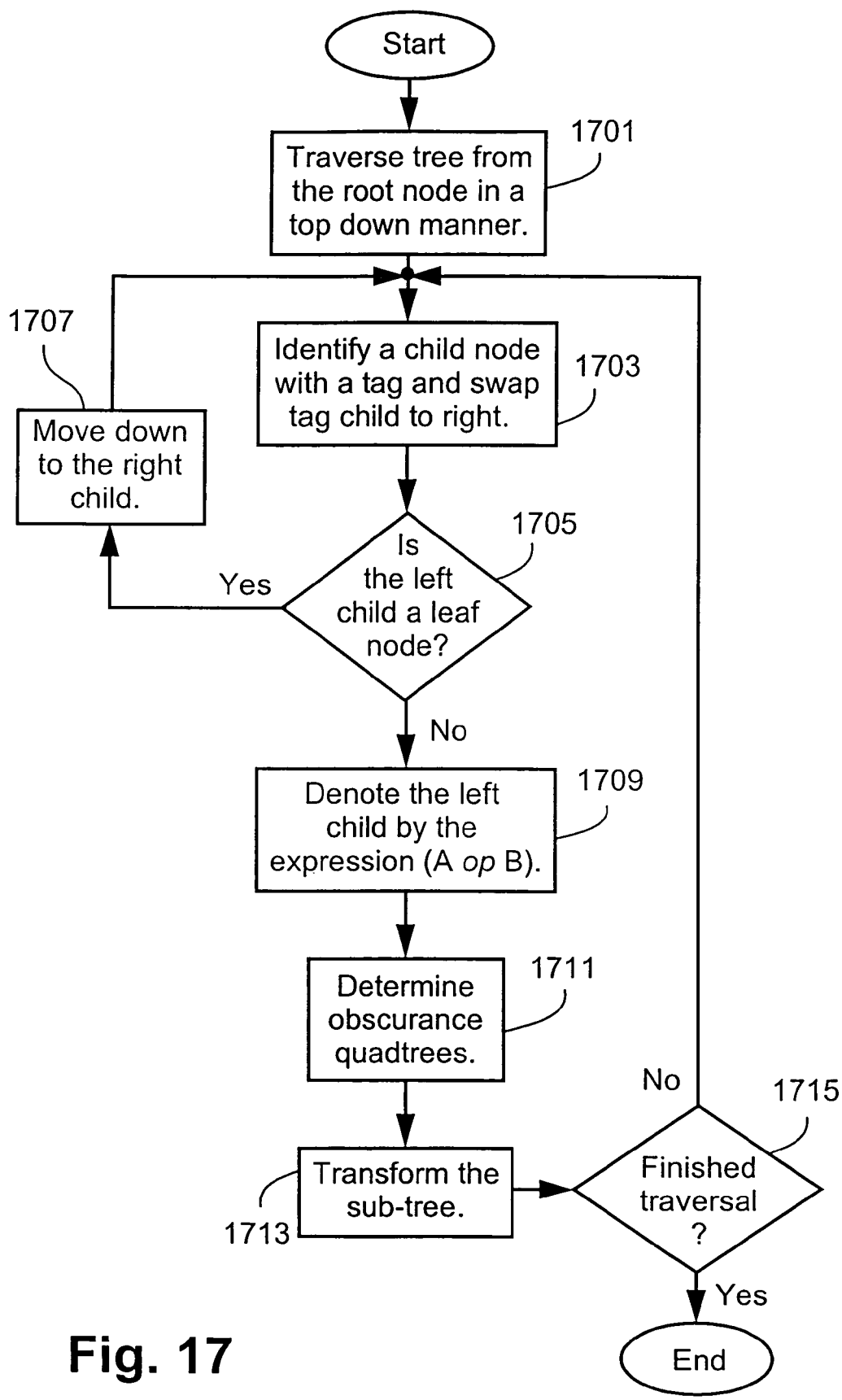
FIG. 17 is a flow chart showing a method for determining the obscurance quadtrees and reorganising a GOB tree into a right leaning structure in a single traversal of the GOB tree.

7.2.1 Computing Obscurance Quadtrees and GOB Tree Optimisation in One Traversal FIG. 17 is a flow chart showing a method of computing the obscurance quadtrees and reorganising the GOB tree into a right leaning structure in a single traversal of the GOB tree. The method of FIG. 17 is dependent on the following assumptions:

(i) assume the second traversal of the GOB tree has been completed as at step 4105, and hence the opacity quadtrees of each node in the GOB tree have been determined. At the same time the bounding boxes, have been determined for each node; and (ii) assume that the most complex objects within sequences of over/rover have been identified and marked as described in Section 9.2. How this tagging can be done within the same GOB tree traversal as the computation of the bounding boxes will be described in more detail later in the document.

As described above the computation of the obscurance quadtrees is a top-down procedure where the obscurance quadtree of a parent node is propagated down and combined with the opacity quadtrees of its children to form their obscurance quadtrees. Once the obscurance quadtrees of the child nodes have been determined, their opacity quadtrees and the obscurance quadtree of the parent node are no longer needed and can be discarded. Thus the child nodes can be rearranged without affecting the validity of the opacity information of their descendants.

Figure 36:
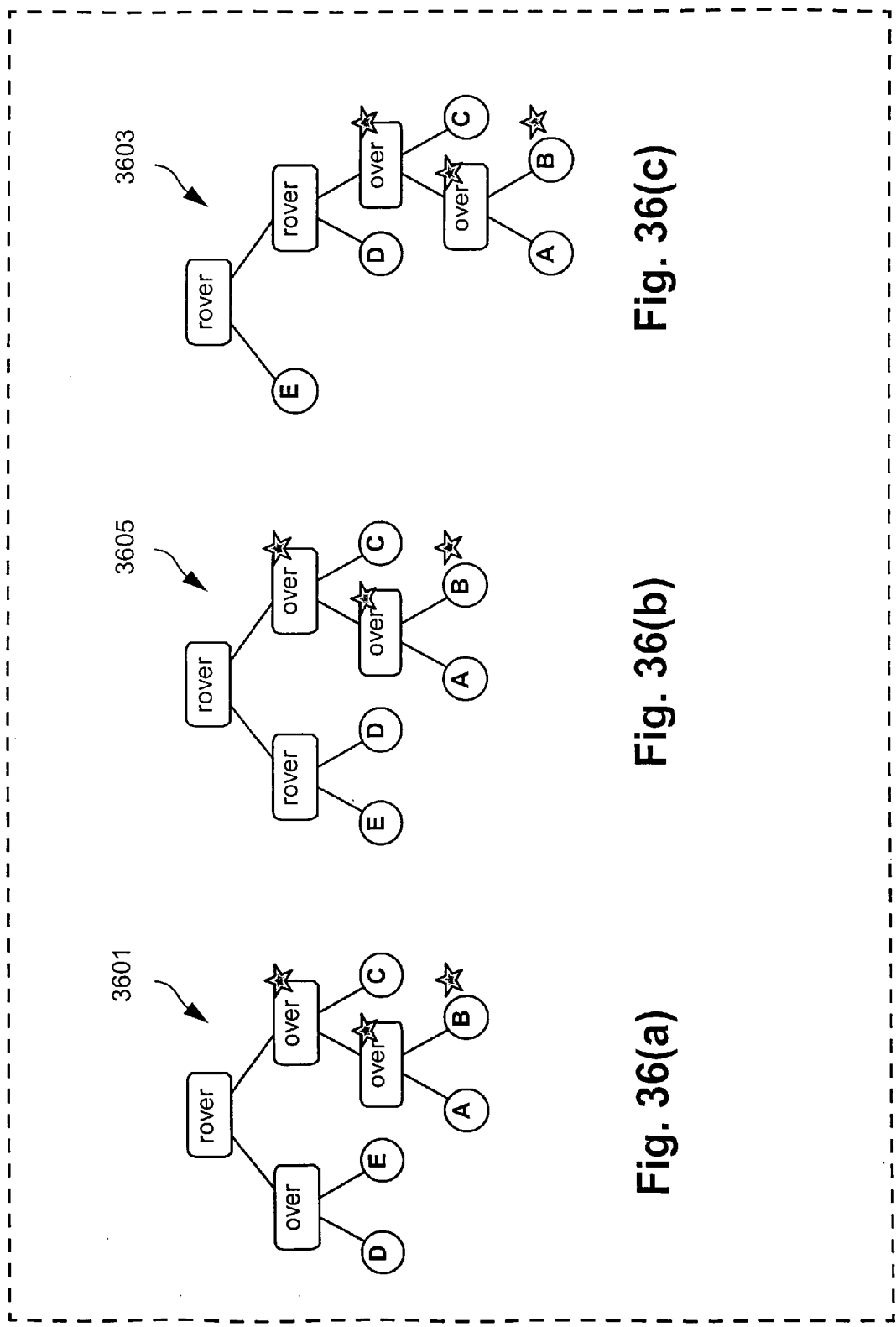
FIG. 36(a) shows the GOB tree of FIG. 35 after the children of a tagged node have been swapped and the operator being replaced by its opposite.
FIG. 36(b) shows the GOB tree of FIG. 36(a) after the operator of a left child has been inverted.
FIG. 36(c) shows the GOB tree of FIG. 36(b) after having been transformed.

Consider the example shown in FIG. 35, and the sequence of GOB tree transformations that result in a right leaning structure shown in FIGS. 36(*a*)-(*c*) and FIG. 37. Step 1601, as shown in FIG. 36(*a*), involves a simple operand swap and operator inversion from over to rover and hence can be done safely without affecting the opacity information of any node. Step 1607, as shown in FIG. 36(*b*), is also a simple operand swap. Step 1609 however, is a rearrangement of the operator sequence using the associative property of over. The transformation is illustrated again in FIG. 38.

Notice that node F' in the transformed GOB tree 3603 does not represent the same entity as node F in the original GOB tree 3500, since F=E rover D whereas F'=D rover G. Thus, the opacity quadtree determined for F cannot be used as if it were the opacity quadtree for F'. Preferably, the recomputation of the opacity quadtree for F' can be avoided by ensuring that the obscurance quadtrees for E, D and G are computed prior to the transformation. Alternatively, prior computation of these obscurance quadtrees is possible since the structure of the subtrees below G, E and D (E and D may represent complex subtrees rather than the primitive nodes shown in FIG. 38) do not change in the transformation. Once the obscurance quadtrees for G, E and D have been determined, the opacity and obscurance quadtrees of their ancestor nodes (eg. F') are no longer needed.

Figure 38:
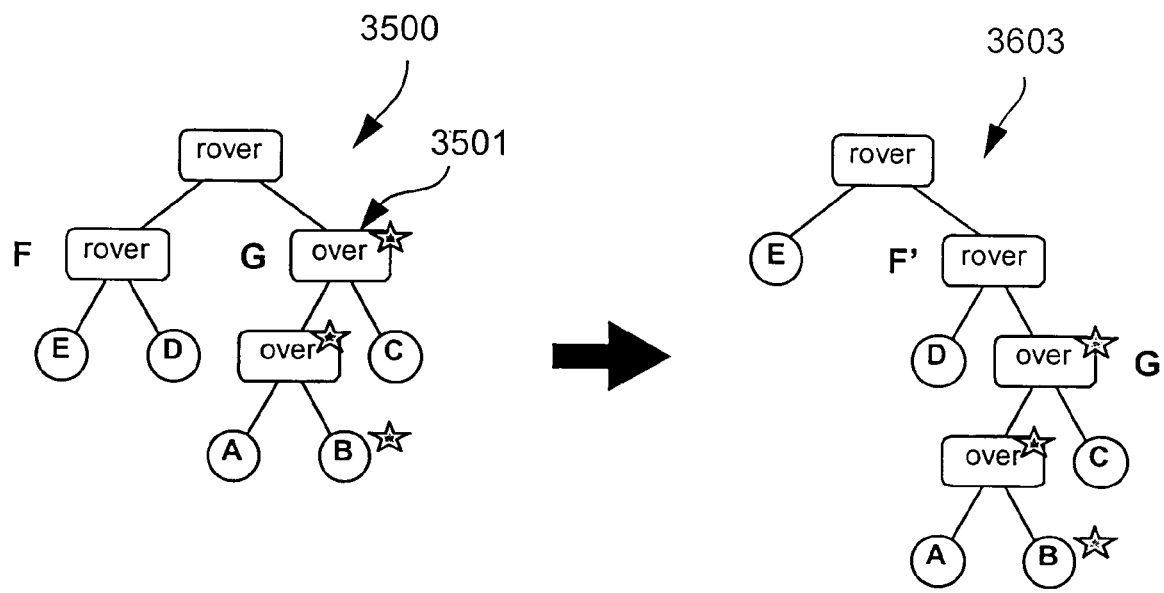
FIG. 38 shows the GOB tree of FIG. 36(a) after being rearranged using the associative property.

With reference to FIG. 38, the process of FIG. 17 begins at step 1701 at the top node of the GOB tree 3500. The GOB 3500 is traversed in a top-down manner. At the next step 1703, a child node with a tag (e.g. 3501) is identified. If the tagged node 3501 is on the left child, then the children are swapped and the operator is replaced by its opposite. At the next step 1705, if the left child is a leaf node, then the traversal moves down to the right child node, at step 1707, and returns to step 1703. Otherwise, the left child is denoted by the expression (A op B), at step 1707. Also, the right child is denoted by C. Thus the subtree below the current node is denoted by (A op B) op C. At the next step 1711, the obscurance quadtrees for nodes F and G, and subsequently for nodes E and D are determined. At the next step 1713, the subtree is rearranged according to the following transformation:

$$(A \text{ op } B) \text{ op } C \equiv A \text{ op } (B \text{ op } C)$$

The obscurance quadtree for F' is now incorrect and can be discarded. The correct obscurance quadtree for F' needs not be determined since the obscurance quadtrees of its children, D and G, have already been obtained. F' is then tagged as having already been processed, to avoid having to propagate down to D and G its incorrect obscurance quadtree. If the whole tree has not been traversed at step 1715, then the process returns to step 1703. Since E may be a complex subtree rather than a primitive node, it may contain rover/over operators which need to be transformed over to the right side of the tree in the same manner as already discussed. When E has been fully traversed, processing returns to the right hand side. Subsequently, node F' is skipped over since it has already been processed.

7.2.2 Tagging the Most Complex Node for GOB Tree Optimisation

Tagging of the most complex node for GOB tree optimisation is performed in the post-order traversal stage at step 4105. At each parent node, the bounding boxes of its children and hence their complexity values can be fully determined. The complexity values of the most complex node's children are compared based on a predetermined criteria, and a tag placed on the child node with the highest value. This can be repeated as the GOB tree is traversed upward. The result of the tagging is that at each node, there is a sequence of tags that leads to the most complex object in the subtree below it. Not all tags can be subsequently used in the GOB tree optimisation process. Only those that lead to the most complex objects in sequences of over/rover, or in/rin operators can be used, the remaining nodes are ignored.

8.0 Minimising Memory Usage

When operating under an environment of limited memory resources, the method for propagating quadtrees can be modified to minimise the memory footprint of the method.

The major consumer of memory within the preferred method for propagating quadtrees lies in the storage of opacity quadtrees generated during the second GOB tree traversal, as at step 4103. At the completion of this traversal, there can potentially be one opacity quadtree stored at each node in the GOB tree. Comparatively, the storage requirement for obscurance quadtrees is considerably less, since they are only kept at leaf nodes and only for complex primitives (eg. images). The obscurance quadtrees generated for non-leaf nodes during the third GOB tree traversal, at step 4107, are immediately discarded once they have been propagated downwards. It should be noted that the opacity and obscurance quadtrees of the same node are not stored simultaneously. Once the obscurance quadtree has been determined for a node, its opacity quadtree can be discarded.

8.1 Discarding Unwanted Opacity Quadtrees

All opacity quadtrees need to be maintained through to the third traversal at step 4107. However, as discussed above only relevant opacity quadtrees are generated through the treatment of partial opacity information. The opacity quadtree of a node is determined for two reasons. Firstly, to compute the opacity quadtree of its parent node, and secondly, if the parent is a binary operator, to compute the obscurance quadtrees of itself and its sibling. The second reason for storing opacity quadtrees through to the third traversal, at step 4107, can be avoided if the parent node is a unary operator or if the parent node is a binary operator but the opacity quadtrees of one or both of the siblings do not take part in the computation of the siblings obscurance quadtrees, as dictated in Table 2, reproduced below, as Table 8, for convenience:

TABLE 8

| Operator | Left operand | Right operand |
|---|---|---|
| Over | $Q_P$ | $Q_P \cup \{Q_L = \text{'o'}\}$ |
| Out | $Q_P \cup \{Q_R = \text{'o'}\}$ | $Q_P \cup \{Q_R = \text{'o'} \text{ or } Q_L = \text{'—'}\}$ |
| In | $Q_P \cup \{Q_R = \text{'—'}\}$ | $Q_P \cup \{Q_R = \text{'o'} \text{ or } Q_L = \text{'—'}\}$ |
| Atop | $Q_P \cup \{Q_R = \text{'—'}\}$ | $Q_P \cup \{Q_L = \text{'o'} \text{ and } Q_R = \text{'o'}\}$ |
| Xor | $Q_P \cup \{Q_L = \text{'o'} \text{ and } Q_R = \text{'o'}\}$ | $Q_P \cup \{Q_L = \text{'o'} \text{ and } Q_R = \text{'o'}\}$ |
| Plusc, plusw, rops | $Q_P$ | $Q_P$ |

Depending on whether the sibling nodes have been tagged as candidates for optimisation, Table 8 can indicate whether the opacity quadtrees of either, both, or none of the siblings are needed. Opacity quadtrees that are not needed can be discarded as soon as the opacity quadtree of the parent node has been determined. For example, if the right child of an over operator is a candidate for optimisation, then only the opacity quadtree of the left child needs to be kept, since $Q_R$ does not appear in the "Right operand" column in Table 8 for over. On the other hand, if the left child is a candidate for optimisation (but not the right), then the opacity quadtrees for both child nodes can be discarded, since neither $Q_L$ nor $Q_R$ appear in the "Left operand" column for over.

8.2 Early Computation of Obscurance Quadtrees

Figure 40:
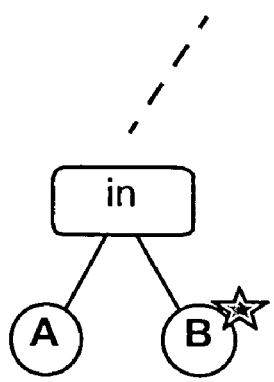
FIG. 40 shows a GOB tree in which one node has been marked as a candidate for optimisation.

Memory usage can also be reduced by beginning a computation of obscurance quadtrees during the second, as at step 4103, rather than the third GOB tree traversal, as at step 4107, so that all opacity quadtrees can be discarded. The computation of obscurance quadtrees can not be completed until the third traversal however, so the partial results (in the form of quadtrees) need to be kept instead of the original opacity quadtrees. For cases where only one operand of a binary operator is a candidate for optimisation, this can lead to fewer quadtrees being kept. As shown in FIG. 40, B is a candidate for optimisation, whereas A is not. From Table 8, B's obscurance quadtree is given by $Q_P \cup \{Q_R = \text{'o'} \text{ or } Q_L = \text{'-'}\}$. Thus, if the computation of B's obscurance quadtree is delayed until a third traversal of the GOB tree, then the opacity quadtrees of both A and B need to be kept until then. However, if B's partial obscurance quadtree is pre-determined, as $Q_B' = \{Q_R = \text{'o'} \text{ or } Q_L = \text{'-'}\}$, then both $Q_L$ and $Q_R$ can be immediately discarded after the parent's opacity quadtree has been determined. Thus, only one quadtree, $Q_B'$, needs to be stored as compared to two. The computation of B's obscurance quadtree can be completed during the third traversal, as at step 4107, when $Q_P$ is known.

Note that pre-computing obscurance quadtrees can lead to longer computation time in cases where both child operands of a binary operator are candidates for optimisation. For example, this is true for the out operators. Without pre-computation, it takes two quadtree merge operations to compute the obscurance quadtrees of both child operands (i.e. first compute right's obscurance quadtree=$Q_P \cup \{Q_R = \text{'o'}\}$, then left's obscurance quadtree=right's obscurance quadtree $\cup \{Q_L = \text{'-'}\}$). With pre-computation however, it takes three merge operations (first pre-compute $Q_{temp} = \{Q_R = \text{'o'} \text{ or } Q_L = \text{'-'}\}$, then compute right's obscurance quadtree=$Q_P \cup \{Q_R = \text{'o'}\}$, and left's obscurance quadtree=$Q_P \cup Q_{temp}$ in the third traversal).

In a memory constrained system, any slight inefficiency can be more than offset by the reduced memory usage. Preferably, pre-computation of obscurance quadtrees can be applied selectively (ie. to binary operators with only one child that is a candidate for optimisation), rather than to the whole GOB tree representing the full rendered image.

9.0 Compositing Analysis

Compositing analysis can be used to optimise the time needed to render an object by compositing the object only within the object's non-empty, visible region described by a quadtree, rather than compositing within the object's bounding box, as has been conventionally done. In order to perform this optimisation on a given object, a quadtree describing regions where the object is empty and regions where the object is obscured by other objects is determined. The quadtree can be determined from the object's opacity and obscurance quadtrees. The obscurance quadtree alone does not contain sufficient information, since it only describes the obscured regions of an object.

Compositing analysis can not only identify where an object is empty and need not be rendered, but also where the object can be rendered using a simpler and faster load rather than a full compositing operation. This functionality requires a new quadtree, which is referred to as a compositing quadtree. The compositing quadtree carries three distinct node values, as opposed to the two values carried by the obscurance quadtree. The three node values are denoted by '-', '1' and 'c', representing regions where the object needs to be rendered, where the object can be rendered by a load operation (i.e. a load region) and where the object must be rendered using a full compositing operation, respectively. With the addition of the compositing quadtree, the obscurance quadtree is no longer required for rendering the image. Opacity quadtrees are still required since they are the source from which compositing quadtrees are obtained.

When performing a compositing operation, only the compositing quadtree of the object being composited is needed. The compositing quadtree of the object being composited upon is not required. Preferably, objects that are composited onto others are primitives that appear as the left operands of a binary operator in the GOB tree, and non-primitives appear on the right.

10.0 Propagating Compositing Quadtrees

Like the obscurance quadtrees discussed above, compositing quadtrees are propagated during a second phase of obscurance/compositing analysis, and are propagated downwards from the top of a GOB tree.

When propagating a compositing quadtree through a binary operator, the compositing quadtrees of the child operands are obtained from their opacity quadtrees and also the compositing quadtree of the parent node, in a two step process. Firstly, obscurance information is extracted from the parent's compositing quadtree and applied to the opacity quadtrees of both operands to propagate the obscured region of the parent to the operands, which will be described in more detail in Section 11.4. This has the effect of converting the operands' opacity quadtrees that lie in the obscured regions into fully transparent nodes. Second, the modified opacity quadtrees of the child nodes are merged with each other to generate the children's compositing quadtrees. The second step depends on the type of binary operator involved. The resulting compositing quadtree for the left operand is described in Table 9 below:

TABLE 9

| Operator | L | R | Resultant |
|---|---|---|---|
| Over | — | X | — |
|  | o | X | 1 |
|  | α | — | 1 |
|  | α | α | c |
|  | α | o | c |
| Rover, out | — | X | — |
|  | X | o | — |
|  | α | — | 1 |
|  | α | α | c |
|  | o | — | 1 |
|  | o | α | c |
| In | — | X | — |
|  | X | — | — |
|  | α | α | c |
|  | α | o | 1 |
|  | o | α | c |
|  | o | o | 1 |
| rin, rout | — | X | — |
|  | X | — | — |
|  | o | X | — |
|  | α | α | c |
|  | α | o | c |
| Atop | — | X | — |
|  | X | — | — |
|  | α | α | c |
|  | α | o | c |
|  | o | α | c |
|  | o | o | 1 |
| Ratop, xor | — | X | — |
|  | α | — | 1 |
|  | α | α | c |
|  | α | o | c |
|  | o | — | 1 |
|  | o | α | c |
|  | o | o | — |
| Plusc, plusw, rops | — | X | — |
|  | α | — | 1 |
|  | α | α | c |
|  | α | o | c |
|  | o | — | 1 |
|  | o | α | c |
|  | o | o | c |

10.1 Partial Opacity Information

As discussed above, for obscurance analysis, processing time can be reduced by generating only partial opacity information, where the opacity information is needed. This is effective since common operators such as over only require partial opacity information (i.e. typically the inner_op region) to generate the necessary obscurance information. Unfortunately with the introduction of compositing analysis, it is no longer adequate to compute partial opacity information in most situations, as seen from Table 10 below. Table 10 lists the opacity information required to compute the compositing quadtree of the left operand for each binary operator. Table 10 can be derived from Table 9. It can be seen from Table 10 that in all cases where full opacity information is not required, the only information that can be left out is the inner_op region of operands.

TABLE 10

| Operator | L | R |
|---|---|---|
| over, rin, rout | both | outer_max |
| rover, in, out | outer_max | both |
| atop, ratop, xor | both | both |
| plusc, plusw, rops | outer_max | outer_max |

In addition to Table 10, the opacity information needed from the operands to compute the opacity quadtree of the parent node, is shown in Table 3 and reproduced in Table 11. For example, in order to determine the inner_op region of the over operator, the inner_op regions of both child operands need to be determined. Further, the outer_max opacity information of both operands needed to compute the left operand's compositing quadtree is required. Therefore, the fall opacity information from both operands is required and there would be no benefit in incorporating the treatment of partial opacity information into compositing analysis.

TABLE 11

| Operator | Parent | L | R |
|---|---|---|---|
| over, in, | inner_op | inner_op | inner_op |
| plusc, rops | outer_max | outer_max | outer_max |
| out | inner_op | inner_op | outer_max |
|  | outer_max | outer_max | inner_op |
| atop | inner_op | — | inner_op |
|  | outer_max | — | outer_max |
| xor | inner_op | Both | both |
|  | outer_max | Both | both |
| plusw | inner_op | Both | both |
|  | outer_max | outer_max | outer_max |

11.0 Processing Small Objects

The result of not being able to take advantage of partial opacity information is that an effective means of handling small objects is lost. In some cases, GOB trees containing a large number of small objects can be encountered. It would be very time consuming to have to compute full opacity and compositing quadtrees for every single object of such a GOB.

Without the use of partial opacity information, another method for handling small objects is needed. A new method of propagating opacity quadtrees, is described below, in which bounding boxes are maintained instead of quadtrees for small objects whenever possible (the rectangular regions defined by the bounding boxes are considered to be partially transparent). Since bounding boxes are much easier to process than quadtrees, it should be possible to handle large numbers of such objects without consuming significant computing resources.

11.1 Using Bounding Boxes to Represent Opacity Information for Small Objects.

The principle difficulty of using bounding boxes to represent opacity information for small objects is the issue of how the bounding boxes can coexist with opacity quadtrees in the same GOB tree. A GOB tree usually contains large objects as well as smaller ones, whose opacity information is best represented by quadtrees. When small objects are composited together, the fast computation can be utilised to represent the opacity information of the resulting composite object using a bounding box. When a large object and a small object are composited together however, a quadtree is preferably used except for cases where the composite object is known to be small.

Using bounding boxes and quadtrees in the two instances discussed in the previous paragraph works well when the small objects are clustered together in a separable part of the GOB tree. When this is not the case, the use of bounding boxes can prove ineffective. For example, a GOB tree 4500 is shown in FIG. 45 where a large number of small objects, 4501-4505, are placed over a large object 'A'. The composite object 4509 is also shown in FIG. 45. The five small objects, 4501-4505 are located together and fully reside in a subtree 4507 of their own that can be separated out from the large object A. Thus a simpler bounding box computation can be performed within the subtree 4507. At node N, where the small objects, 4501-4505, are composited over A, a merge operation between the small objects' overall bounding box and A's opacity quadtree can be performed to compute the opacity quadtree for the whole composite object. The merge operation can be done with approximately the same efficiency as a merge between two quadtrees.

In the example of FIG. 45, the presence of a large number of small objects 4501-4505 can be handled efficiently using bounding box optimisation.

Figure 46:
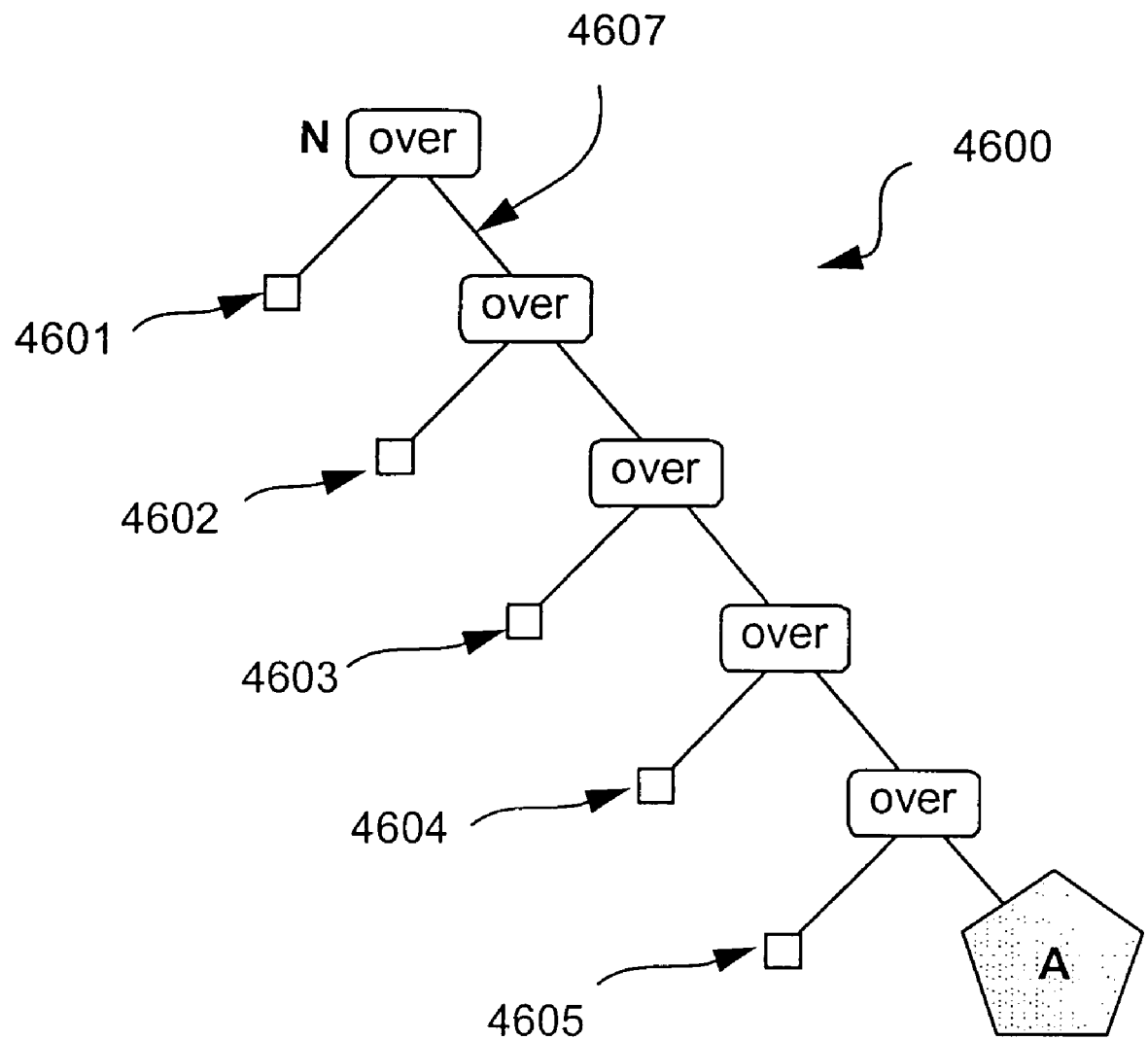
FIG. 46 shows a GOB tree where a number of small objects share the same subtree as a large object.

Now consider the equivalent GOB tree 4600 shown in FIG. 46. In this example, small objects 4601-4605 do not appear by themselves but instead share the same subtree 4607 as object A. The example of FIG. 46 causes a problem since the small objects 4601-4605 can not be handled separately from object A. As A's opacity quadtree (not illustrated) is propagated upwards, it needs to be successively merged with the opacity information of each of the five small objects, 4601-4605. Representing the small objects using bounding boxes does not result in any benefit since it takes the same amount of effort to merge a quadtree with a bounding box as it does to merge two quadtrees.

A solution to the problem of the example of FIG. 46 is to rearrange the GOB tree 4600 into the more favourable structure depicted in FIG. 45, but this raises other issues. Firstly, rearranging the GOB tree 4600 requires an extra traversal of the GOB tree 4600 to do so, which can be time consuming if the GOB tree 4600 is large. More importantly however, the opacity quadtrees (not illustrated) determined for the rearranged GOB tree may not be of much use since the rearranged GOB tree will need to revert back to its original structure due to any GOB tree optimisation step. Although the opacity quadtrees of leaf nodes will not be affected, those determined for intermediate nodes will no longer be valid.

GOB tree optimisation is preferably completed prior to obscurance and compositing analysis. Since the GOB tree optimisation method described above tends to produce right leaning trees, it is likely that the type of GOB tree 4600 depicted in FIG. 46 would occur quite frequently. It is thus essential for us to provide an effective method for handling these cases.

11.2 Processing Small Objects in Right Leaning GOB Trees

Figure 47:
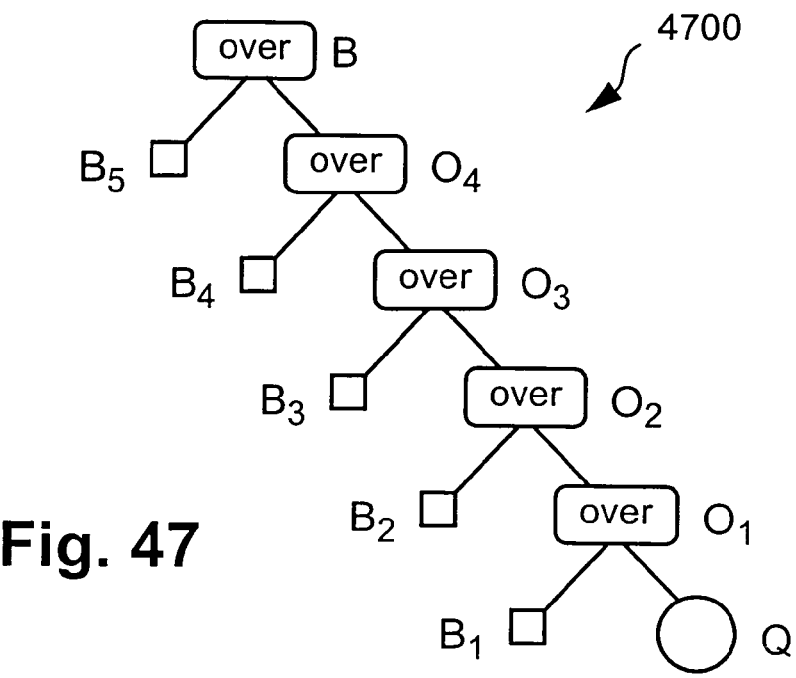
FIG. 47 shows a right leaning GOB tree comprising of small and large objects.

Consider the GOB tree 4700 of FIG. 47, where there is a large object Q at the bottom of a right biased chain. Suppose that the opacity quadtree for the node 'B' at the top of the chain needs to be determined. This would require that the opacity quadtrees of all nodes in the chain be determined and propagated upwards. As already discussed in Section 13.1, such an example poses a problem since using bounding boxes rather than quadtrees results in very little benefit. However, by taking advantage of the fact that only the compositing quadtree of the left operand of a binary operation needs to be determined, the opacity quadtrees can be propagated to allow the effective use of bounding boxes. Since the opacity quadtrees stored at the intermediate nodes simply act as place holders for intermediate results generated in the course of propagating the quadtree from each leaf node up to node B, these opacity quadtrees need not be determined explicitly.

11.3 Propagation of Opacity Information

A method of propagating opacity quadtrees using bounding boxes will be described with reference to the example of FIG. 47. Considering the example of FIG. 47 further, at the bottom of the GOB tree 4700, instead of computing the opacity quadtree of node $O_1$, its construction can be delayed by storing both the bounding box $B_1$ of the small left operand and the opacity quadtree $Q_1$ of the large right operand 'Q'. A flag can be stored at node $O_1$ to indicate that the true opacity is obtained by placing the bounding box over the quadtree 4700. Moving up one level, the opacity quadtree of node $O_2$ is given by $B_2$ over ($B_1$ over $Q_1$). But this is equivalent to ($B_2$ over $B_1$) over $Q_1$. From the separate bounding box $B_1$ and quadtree $Q_1$ propagated from node $O_1$, the resulting opacity can be represented by a combined bounding box enclosing $B_1$ and $B_2$ (denoted by $[B_2 \cup B_1]$), and stored along with the unprocessed quadtree $Q_1$ at node $O_2$. Therefore, at each node of the chain, a new bounding box can be merged with the propagated bounding box. At the top of the chain (i.e. node B), a merge between the propagated bounding box and quadtree can be performed to obtain the required opacity quadtree for the node B. The right biased tree has been effectively transformed into a structure of the type shown in FIG. 46, without explicitly rearranging the GOB tree 4700.

Figure 48:
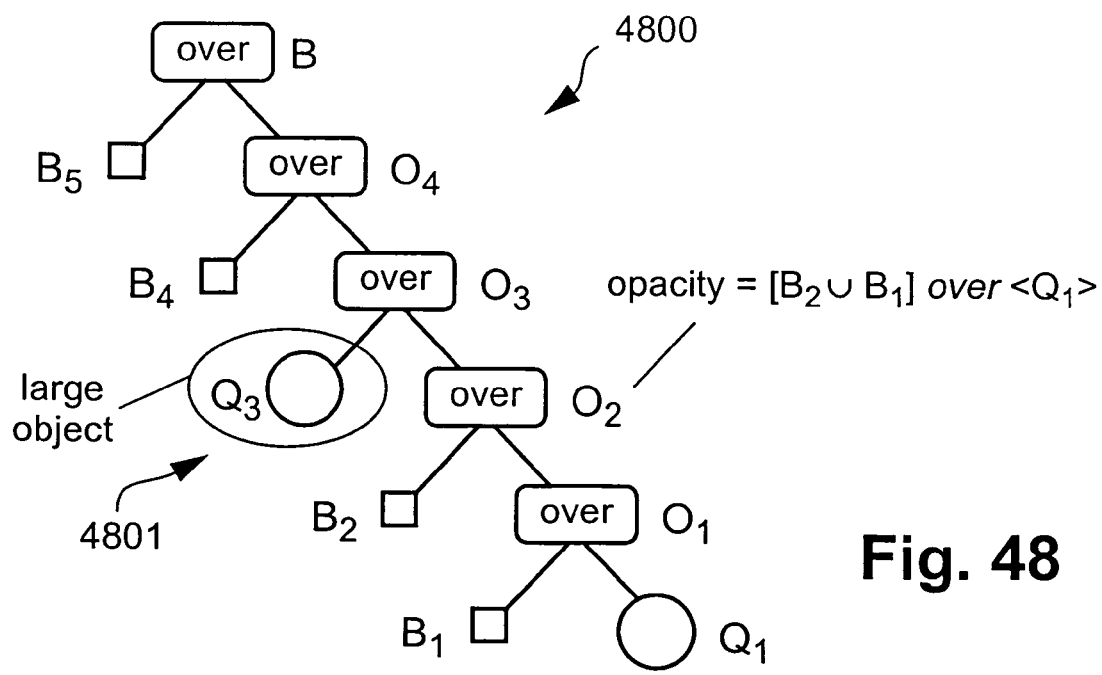
FIG. 48 shows a right leaning GOB tree with a large object midway through the chain.

The example of FIG. 47 is a somewhat idealised example in that it assumes that the opacity of each left operand encountered as the tree 4700 is traversed upward is represented solely by a bounding box. If a left operand 4801 along a GOB tree 4800 is a large object, as shown in FIG. 48, then the opacity of the left operand 4801 needs to be represented by an opacity quadtree instead of a bounding box. In such a situation, the implicit bounding box-quadtree opacity combination can not be propagated all the way up to the node B, but rather the true opacity quadtree has to be explicitly determined mid way through a GOB tree traversal, upon reaching the large left operand 4801.

In the example of FIG. 48, node $O_3$ contains a large left operand 4801 whose opacity is represented by the opacity quadtree $Q_3$. The opacity of its right operand $O_2$ is represented implicitly as $[B_2 \cup B_1]$ over $<Q_1>$, where the expression $B_2 \cup B_1$ within square brackets is a rectangular bounding box and the term $Q_1$ within angle brackets is an opacity quadtree. The opacity of node $O_3$ is therefore $Q_3$ over $(B_2 \cup B_1)$ over $Q_1$. Since the expression $Q_3$ over $(B_2 \cup B_1)$ over $Q_1$ cannot be represented as a combination of a bounding box and an opacity quadtree, it must be determined explicitly. Once the opacity quadtree for node $O_3$ is determined, it can be propagated to the node $O_4$.

The effectiveness of the method of propagating opacity quadtrees using bounding boxes is dependent on how large objects are intermixed with small objects. In the example of FIG. 48, the presence of a large object results in more quadtree-to-quadtree and quadtree-to-bounding box merge operations being performed than if the object was small. Nevertheless, the method of propagating opacity quadtrees using bounding boxes is still more efficient than having to explicitly compute the opacity quadtrees of all nodes. The same situation arises when a left operand is a complex expression whose opacity is represented by a quadtree. It should be noted that the opacity of a complex left operand can never be represented implicitly as a combination of a bounding box and a quadtree since it needs to be explicitly determined to construct the compositing quadtree required to composite the operand.

Another situation that can result in the computation of opacity quadtrees at intermediate nodes during the propagation of opacity quadtrees using the bounding box method is where an operator that features in the implicit opacity information of the right operand differs from the parent node's operator. Since the propagation of opacity can also be applied to other associative operators, namely rover, plusc and plusw, (N.B. it will be shown that the method of propagating opacity quadtrees using bounding boxes does not need not be applied to in and rin), then it is possible that an operator featured in the right operand is different from the parent node's operator.

Table 12, below, lists the result of propagating each possible combination of opacity representations of the left and right operands through the over operator utilising the method of propagating opacity quadtrees and bounding boxes. The left column of the Table 12 represents possible forms of the opacity of the right operand. The middle column lists corresponding opacity of the parent node when the opacity of the left operand is a bounding box $B_L$. Similarly, the right column lists the corresponding opacity of the parent node when the left operand's opacity is a quadtree $Q_L$. Expressions within square brackets '[]' denote bounding boxes and those within angle brackets '<>' denote quadtrees. The absence of a square bracket or angle bracket signifies that the operand's opacity is represented solely by a bounding box or by a quadtree. The term R represents the true opacity of the right operand and its presence indicates that the associated opacity needs to be explicitly evaluated. Similarly, a complex term within angle brackets represents an opacity quadtree obtained by explicitly merging the objects that appear in the term. The operator plus denotes either the plusc or plusw operator.

TABLE 12

| R | Resultant when L = [$B_L$] | Resultant when L = <$Q_L$> |
|---|---|---|
| [$B_R$] | [$B_L \cup B_R$] | [$B_R$] rover <$Q_L$> |
| <$Q_R$> | [$B_L$] over <$Q_R$> | <$Q_L$ over $Q_R$> |
| [$B_R$] over <$Q_R$> | [$B_L \cup B_R$] over <$Q_R$> | <$Q_L$ over R> |
| [$B_R$] rover <$Q_R$> | [$B_L$] over <R> | [$B_R$] rover <$Q_L$ over $Q_R$> |
| [$B_R$] plus <$Q_R$> | [$B_L$] over <R> | <$Q_L$ over R> |

Tables similar to Table 12 can be determined for the operators rover, plusc, and plusw. It is not necessary to have a table for in and rin, since of their property that if one operand is small, then the other operand as well as the parent must also be small. Thus the opacity of all nodes in a chain of in/rin operators are preferably represented solely by bounding boxes or solely by opacity quadtrees, and hence can be explicitly determined.

11.4 Selective Merging of Bounding Boxes

Figures 49, 49B:
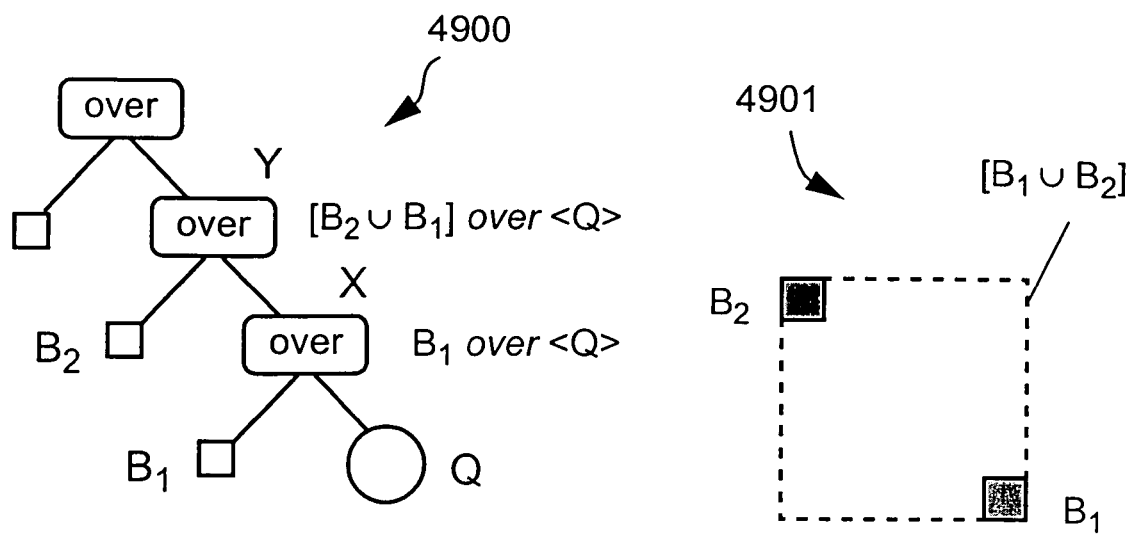
FIG. 49(b) shows two objects after being combined into the same bounding box.

Section 11.3 described how small objects can be efficiently handled by storing opacity information implicitly as a combination of a bounding box and a quadtree. A method of propagating opacity quadtrees using bounding boxes was described that can process small objects together using bounding box computation instead of quadtrees, even though these small objects do not appear by themselves in their own subtree. The method of propagating opacity quadtrees using bounding boxes described in section 11.3, assumes that it is always more beneficial to process bounding boxes together whenever possible. This is not always the case, even though bounding boxes can be very easily combined. For example, consider the quadtree 4900 shown in FIG. 49(a). Using the method of propagating opacity quadtrees using bounding boxes described in Section 11.3, the opacity of node Y is [$B_2 \cup B_1$] over <Q>. That is, the opacity of node Y is made up of a quadtree Q, and a bounding box which has a rectangular outline of the union of two small bounding boxes $B_1$ and $B_2$. Preferably, $B_1$ and $B_2$ are not combined into a single bounding box since the rectangular union 4901 of two small rectangles is not necessarily small when the rectangles are far apart, as shown in FIG. 49(b). In the example of FIG. 49(b), it would be detrimental to represent the opacity of the combined rectangles using a bounding box, since much of the space inside the box would be interpreted as non-empty, and hence full compositing operations would then need to be performed there. In contrast a better method would be to adopt a quadtree to represent the opacity of the combined rectangles.

For the example of FIG. 49, it is not necessary to obtain the explicit opacity quadtree for node Y, which would require two quadtree merge operations. It is sufficient to compute $B_1$ over Q in a single merge operation and then represent Y's opacity as [$B_2$] over <$B_1$ over Q>. Therefore, there is now less area of the resulting object to composite.

Since compositing time varies with the area being composited, given two possibly overlapping bounding boxes $B_1$ and $B_2$, the extra time needed to composite their rectangular union as compared to compositing their actual areas is proportional to $$\text{Area}(B_1 \cup B_2) - \text{Area}(B_1) - \text{Area}(B_2) + \text{Area}(B_1 \cap B_2)$$

This time can be saved when Y's opacity is represented as '[$B_2$] over <$B_1$ over Q>' as described above. However, an extra quadtree-to-bounding box merge operation is needed to determine <$B_1$ over Q>, requiring a processing time that is approximately proportional to the perimeter of the bounding box $B_1$. A possible test to determine whether to composite the rectangular union 4901 of $B_1$ and $B_2$ as compared to compositing their actual areas is given by the following comparison:

$$\text{Area}(B_1 \cup B_2) - \text{Area}(B_1) - \text{Area}(B_2) + \text{Area}(B_1 \cap B_2) > \lambda \cdot \text{Perimeter}(B)$$

where $\lambda$ is some constant. If the above expression is true, then node Y's opacity is represented as [$B_2$] over <$B_1$ over Q>, otherwise it is represented as [$B_2 \cup B_1$] over <Q>.

12.0 Propagation of Compositing Quadtrees

Unlike the computation of opacity information, it is possible to compute only partial information when it comes to propagating compositing quadtrees. As described above, when performing a compositing operation, the compositing quadtree of the left operand is required to identify how and where the object needs to be composited. It is not necessary to compute the compositing quadtree for the right operand. However, the right operand can have children and hence would need to collate the obscurance information passed down from its parent, and any additional obscurance due to its sibling, and pass this down to its own children. Since obscurance information can be encapsulated within compositing quadtrees, the compositing quadtree for the right operand may need to be generated as well.

The information that needs to be propagated down from a parent node to its children is obscurance information, rather than compositing information. Thus, preferably obscurance quadtrees are propagated from a parent node to its children as in the obscurance analysis described in sections 1.0 to 10.0, rather than propagating compositing quadtrees. However, since compositing quadtrees also carry the necessary obscurance information, propagating compositing quadtrees avoids the need to construct separate obscurance quadtrees.

Where a compositing quadtree is not needed, an obscurance quadtree is sufficient for the purpose of propagating the necessary obscurance information. An obscurance quadtree can be viewed as a compositing quadtree with only partial information, and can be constructed with less effort. Constructing an obscurance quadtree for a node generally involves the obscurance/compositing quadtree of the parent and the opacity quadtree of its sibling, whereas constructing a compositing quadtree also involves the node's own opacity quadtree. In other words, constructing an obscurance quadtree generally requires one less quadtree merge operation.

Instead of using the node values '0' and '1' to represent visible and hidden regions, as previously described for obscurance quadtrees, when performing compositing analysis the same node values used in compositing quadtrees are used. Hidden regions are assigned the node value '-', whilst visible regions are assigned the node value 'c' or '1'. Therefore, a compositing quadtree can play the role of an obscurance quadtree without having to convert between node values.

The hidden '-' region of the obscurance quadtree for the right operand of each binary operator is given in Table 13 below. $Q_P$ is the compositing/obscurance quadtree of the parent node, whilst $Q_L$, $Q_R$ are the opacity quadtrees of the left and right operands respectively. It can be seen from Table 13 that for the most common operators over and rover, the obscurance quadtree of the right operand does not depend on its own opacity quadtree. The compositing quadtree of the right operand on the other hand, depends on the opacity quadtrees of both itself and its sibling.

TABLE 13

| Operator | Right operand's hidden region |
|---|---|
| over, rout | $\{Q_P = \text{'-'}\} \cup \{Q_L = \text{'o'}\}$ |
| rover, plusc, plusw, rops | $\{Q_P = \text{'-'}\}$ |
| in, out | $\{Q_P = \text{'-'}\} \cup \{Q_R = \text{'o' or } Q_L = \text{'-'}\}$ |
| rin, ratop | $\{Q_P = \text{'-'}\} \cup \{Q_L = \text{'-'}\}$ |
| atop, xor | $\{Q_P = \text{'-'}\} \cup \{Q_L = \text{'o' and } Q_R = \text{'o'}\}$ |

A significant benefit of propagating obscurance instead of compositing quadtrees lies in the processing of small objects. Consider the GOB tree 4400 shown in FIG. 44 where a series of small objects appear in a right biased chain of over operations. Assume that obscurance information in the form of a compositing/obscurance quadtree $Q_P$ is to be propagated from the top of the GOB tree 4400 to the large object Q at the bottom of the tree 4400. Obscurance/compositing analysis is not required for small objects so the obscurance information does not need to be propagated down the left side of the GOB tree 4400. Using the bounding box method of opacity quadtree propagation described above, the opacity information of intermediate nodes $O_1$-$O_3$ has been represented implicitly as combinations of quadtrees and bounding boxes as shown in the FIG. 44.

Now if the compositing quadtrees were being propagated down the tree 4400, then the true opacity of each of these nodes $O_3$-$O_1$ needs to be determined since in order to compute the compositing quadtree of a node, its opacity quadtree must be explicitly available. But this would defeat the purpose of representing small objects using bounding boxes.

On the other hand, it can be seen from Table 13 that the computation of obscurance quadtrees for the above intermediate nodes $O_1$-$O_3$ does not depend on their opacity quadtrees, and hence they do not need to be explicitly evaluated. In fact since the left siblings of the nodes $O_1$-$O_3$ are small objects, which do not contain any fully opaque regions, the definition of the obscurance quadtrees of these nodes reduces from $\{Q_P = \text{'-'}\} \cup \{Q_L = \text{'o'}\}$ to $\{Q_P = \text{'-'}\}$. Thus the quadtree $Q_P$ passed down from the top of the chain can simply be propagated down unaltered.

The same advantage of propagating obscurance rather than compositing quadtrees also applies to the other associative operators that can possess implicit opacity information, namely rover, plusc and plusw.

In situations where a GOB tree does not include an uninterrupted chain of small objects, but instead has a large object in the middle of the chain as shown in FIG. 48, then some adjustment is necessary. Although it is still valid to propagate obscurance quadtrees down to each right operand along the chain, the need to compute the compositing quadtree for the large object in the middle of the chain would mean that the opacity of the object's right sibling would need to be determined since a compositing quadtree of any node is dependent on the opacity quadtrees of not only the node concerned but also its sibling. Thus in FIG. 48, the opacity of node $O_2$ would need to be explicitly determined. The opacity of the remaining nodes however can still be represented implicitly as described above.

12.1 Testing for Fully Obscured Objects

Compositing analysis as described in the previous sections only allows for partial testing of totally obscured objects. Such an object can be identified from its compositing quadtree comprising of a single empty node '-'. Since compositing quadtrees are only determined for the left operands of binary operators, only the left operands of binary operators can be tested for total obscurance.

The obscurance quadtrees determined for the right operands only contain information about regions that are hidden, which as currently defined, exclude regions where the operands are empty. In order to detect total obscurance, regions that are either hidden or empty need to be detected. Although the computation of obscurance quadtrees can be modified to detect total obscurance, doing so increases an obscurance quadtree's computational complexity. Considering that compositing analysis can detect totally obscured left operands in addition to those detected during bounding box minimisation, and the fact that undetected objects will not be composited at the final rendering stage, such a modification to obscurance quadtrees is not worthwhile.

13.0 Compositing with Small Objects

For compositing analysis to produce correct outputs, it is essential when rendering objects that the obscurance/compositing information given to the objects is strictly obeyed. This means that if an object is hidden in a particular region, as dictated by its obscurance quadtree, then it should not be rendered in that region. Similarly, if an object is to be rendered using a load operation in a particular region, then it must not be rendered using compositing. By the same reason, when rendering a primitive, its boundary must be padded with transparent pixels to the outline indicated by the primitive's opacity quadtree.

In using compositing analysis, preferably rendering should be pixel-accurate. That is, two adjacent rectangular regions must be rendered without any visible pixel gaps since overlapping objects can now be rendered on a piece-wise basis, rather than by depositing one fully formed object on top of another fully formed object.

Small objects are preferably treated differently in compositing analysis since there should not be a need to compute the small object's opacity/obscurance/compositing quadtrees. Instead their opacity can be represented by bounding boxes.

It would be invalid to render an object without giving regards to its obscurance information. However, this does not necessarily mean that a new obscurance quadtree for each object in the GOB tree needs to be determined. Instead, in most situations where a small object is encountered, its obscurance/compositing quadtree is identical to the obscurance quadtree propagated down from its parent. There are three possible scenarios involving binary composition of small objects, namely when the left, right or both operands are small.

13.1 Compositing with a small right operand

Figure 32:
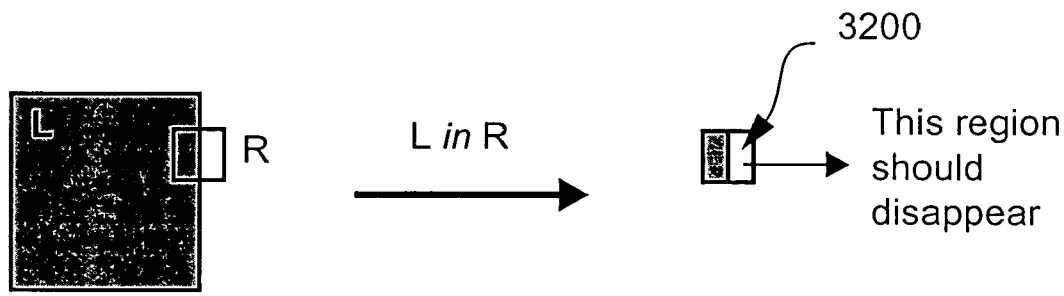
FIG. 32 shows two objects processed in accordance with a binary operation.

Consider the binary operation L in R shown in FIG. 32, where object R is small. If object R is rendered in its entirety and then composited onto by the left operand L, then the region of R 3200 that falls outside of L will remain after the operation, which is incorrect since preferably the compositing operation is performed only within the outline of the left operand, rather than over the entire render space. This problem does not occur if the right operand is rendered according to its obscurance information, which would indicate that the operand is invisible outside of L's outline. However, this would require that R's obscurance quadtree be determined, which is preferably avoided when R is small.

Alternatively, the compositing region of the left operand can be enlarged beyond its outline to encompass R. However, the most effective solution is to compute an obscurance quadtree for the right operand even if it is a small object.

The above problem is only present with binary operators in, rin, out and ratop. These operators have the special property that the parts of the right operands that do not intersect with the left are altered by the application of the operators. Since small objects are usually not composited using the above operators, the need to compute their obscurance quadtrees does not arise too frequently.

For other operators, a small right operand can be rendered without the need to consider any obscurance from its left sibling. If the operator involved in the example of FIG. 32 were 'over' instead of 'in', then the hidden part of R would preferably automatically be overwritten by L. The obscurance quadtree passed down from the parent node needs to be considered and the primitive in the hidden regions need not be rendered. However, this does not require a new obscurance quadtree to be determined for the right operand.

Figure 33A:
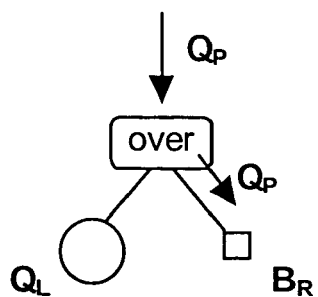
FIG. 33(a) shows the flow of compositing/obscurance information for a GOB tree when a large left operand is composited onto a small right operand.
Figure 33B:
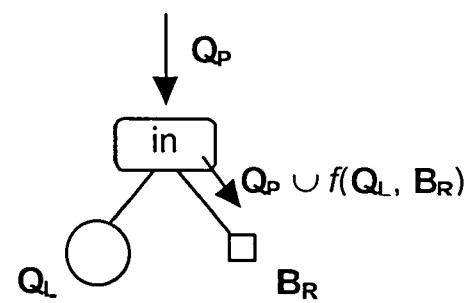
FIG. 33(b) shows the an example of the determination of compositing/obscurance information when a large left operand is composited onto a small right operand for an in operator.

FIG. 33(*a*) shows the propagation and computation of compositing/obscurance information when a large left operand is composited onto a small right operand for an over operator where the right operand's obscurance quadtree $Q_P$ is identical to the parents. FIG. 33(*b*) shows the computation of compositing/obscurance information when a large left operand is composited onto a small right operand for an in operator where the obscurance quadtree needs to be determined from the parent node's obscurance quadtree, the left operand's opacity quadtree and the right operand's bounding box. Regardless of whether the right operand is small or not, a compositing quadtree needs to be determined for the left operand to identify regions that can be rendered using a load operation, and regions that require full compositing.

13.2 Compositing with a Small Left Operand

When the left operand of a compositing operation is small, the left operand is preferably rendered by performing a full compositing operation over its bounding box after the bounding box has been reduced by the parent's obscurance quadtree.

In addition to identifying how an operand is rendered, a compositing quadtree can perform as an obscurance quadtree when the operand is complex. The obscurance quadtree is propagated down to the child nodes below. In the case where the left operand is small and hence its compositing quadtree is not determined, its obscurance quadtree is taken to be the parent's obscurance quadtree, unless the reduced compositing region described in the preceding paragraph is empty.

The obscurance quadtree for the right operand is determined from its opacity quadtree and the left operand's bounding box. This is not necessary for operators such as over since the left operand is small and can not obscure any part of the right operand. It is necessary however, for operators such as in and out that have 'clipping' actions.

13.3 Compositing with Two Small Operands

When compositing with two small operands, since both operands are small, any obscurance that may occur between the operands can be disregarded. Any 'clipping' actions between the operands due to operators such as in and out can also be disregarded since the clipping operations are preferably accounted for by bounding box minimisation. The right operand's obscurance quadtree is thus identical to the parent's obscurance quadtree, and the left operand's compositing region is the intersection of its bounding box and the visible region in the parent's obscurance quadtree.

14.0 Using Compositing Quadtrees to Limit the Processing when Rendering Images

14.1 Preliminary Processing

Preferably, compositing analysis is carried out after any GOB tree optimisation methods such as rearranging the GOB tree. Compositing analysis is most beneficial when applied to the final GOB tree prior to rendering, since the resulting compositing quadtrees are particular to the structure of the GOB tree in which they are produced.

Further, compositing analysis preferably occurs after bounding box minimisation, since the later is a prerequisite to GOB tree optimisation, where bounding boxes are used to determine the complexity of each primitive and composite object. Thus, bounding boxes obtained through bounding box minimisation can be utilised as a means for identifying small objects, for both primitive and complex objects.

14.2 Preferred Method for Propagating Compositing Quadtrees

Figure 50:
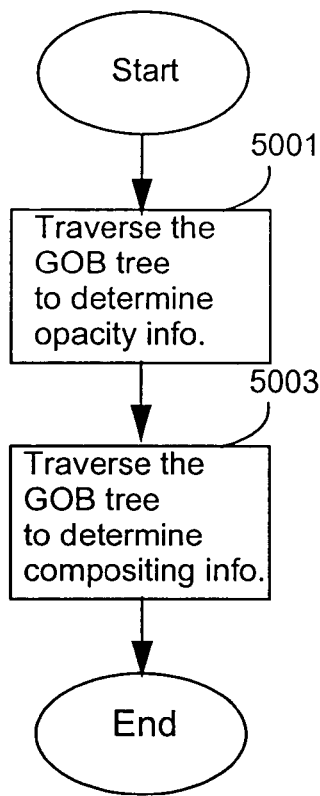
FIG. 50 is a flow chart showing a method of propagating compositing quadtrees in order to optimise a GOB tree representing an image.

FIG. 50 is a flow chart showing a method of propagating compositing quadtrees in order to optimise a GOB tree representing an image. The method of FIG. 50 comprises two traversals of the GOB tree. The first traversal is a bottom up process in which opacity information in the form of opacity quadtrees and bounding boxes are generated and propagated upwards. In the second traversal, compositing/obscurance quadtrees are produced and propagated downwards.

In compositing analysis, as opposed to obscurance analysis, almost every node in the GOB tree not associated with small objects requires it's opacity information to be determined. As described in section 14.0, compositing quadtrees do not need to be fully evaluated for every node. For certain nodes, it is sufficient to compute the obscurance quadtrees. For other nodes, no compositing/obscurance quadtrees need to be determined. Details on which nodes need to have their opacity/compositing/obscurance information evaluated are described below.

The process of FIG. 50 begins at step 5001, where a first traversal of the GOB tree is performed to determine opacity information for each node of the tree. As discussed above, opacity information represents combined opacity information for a node based on regions associated with the node. At the next step 5003, the GOB tree is optimised by performing a second traversal of the tree to determine compositing information for at least one node of the tree. The compositing information for a node is determined using opacity information associated with the node. As discussed above and as will be discussed in the following paragraphs, the compositing information represents at least obscured regions, load regions and regions to be composited for an object associated with the node.

Figure 51A:
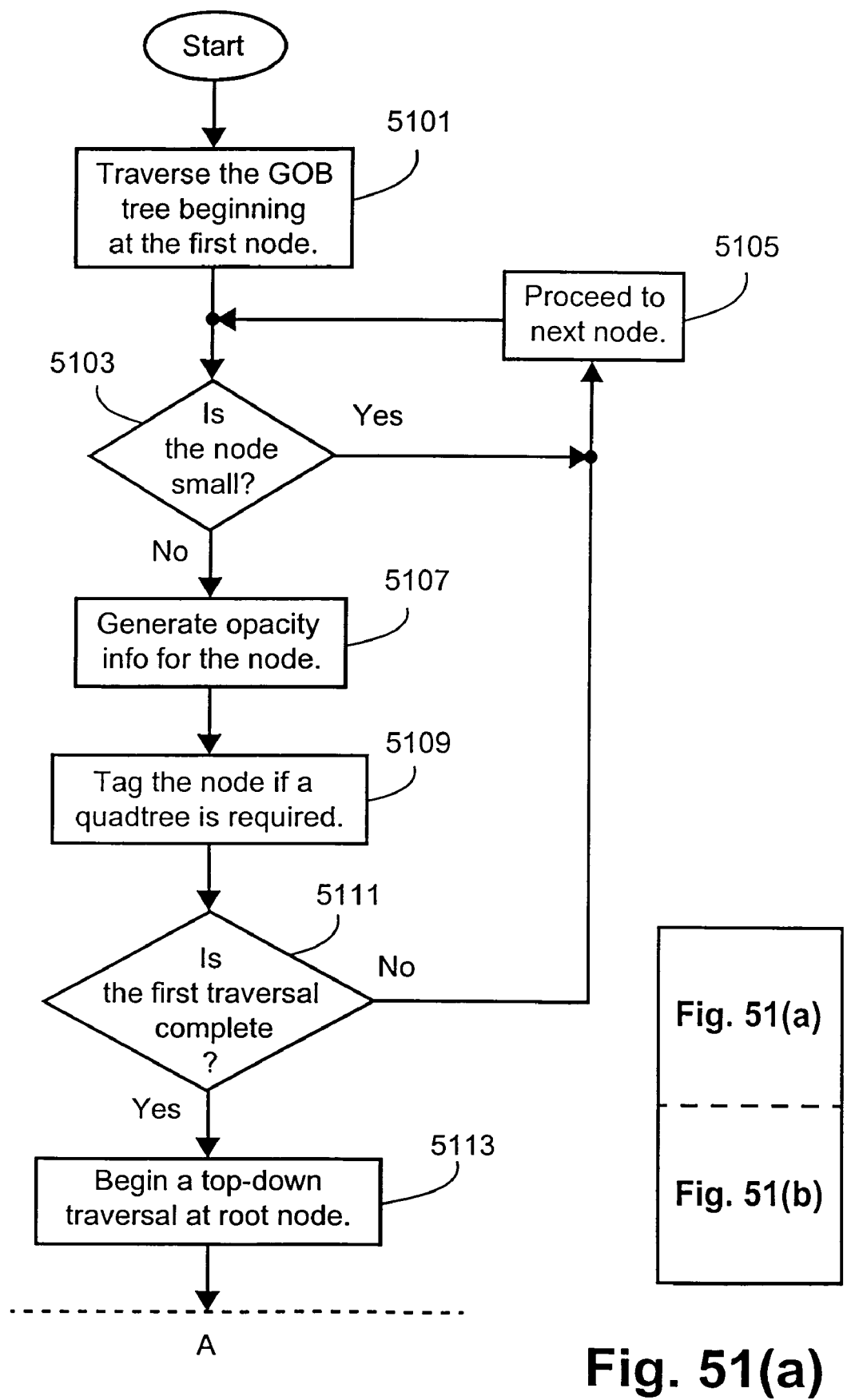
FIG. 51 is a flow chart showing the method of FIG. 50 in more detail.
Figure 51B:
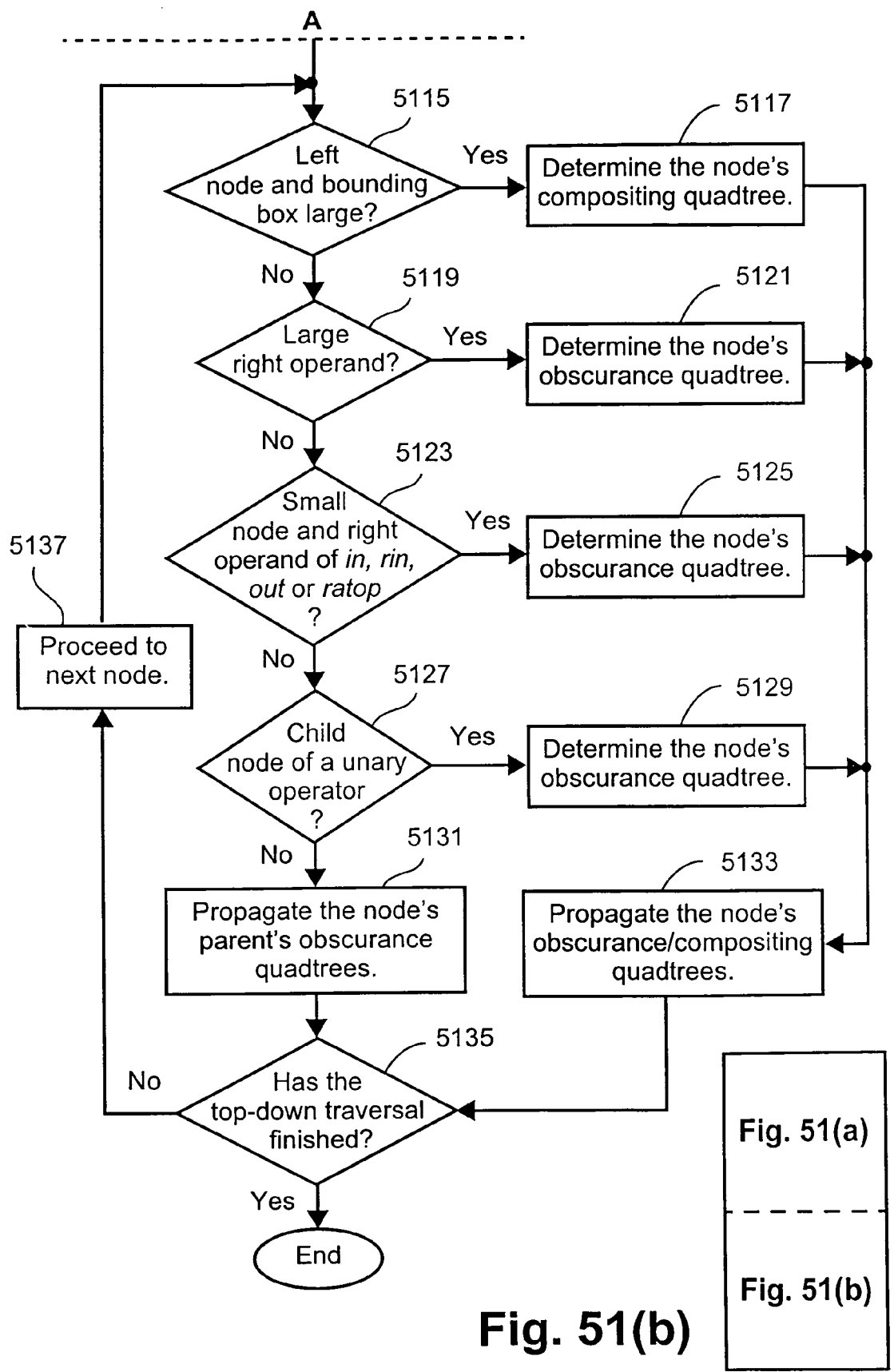

FIG. 51 is a flow chart showing a method of propagating compositing quadtrees in order to optimise a GOB tree representing an image, in more detail. The process of FIG. 51 begins at step 5101, where a bottom-up traversal of the nodes of the GOB tree is started. At the next step 5103, when a node is encountered, if the node is 'small', the entire subtree below the node can be ignored, since every node in that subtree would also be small, and hence no opacity information is required for the subtree. A primitive or complex object is considered small if the size of its bounding box is below a predetermined threshold. This threshold is determined experimentally. If the node is small, the process continues to step 5105 and the traversal proceeds to the next node. Otherwise, the process proceeds to step 5107, where opacity information in the form of bounding boxes and quadtrees is generated and propagated upwards. The rules governing the computation of opacity information depend on whether the node is a primitive or a non-primitive and are as follows:

Primitives (i) If a primitive is small, then its opacity is represented by its bounding box, otherwise an opacity quadtree is constructed.

Non Primitives (i) The opacity of a complex left operand of a binary operator must be evaluated explicitly either as a bounding box if the operand is small, or as a quadtree but not as a combination of both. The opacity is required to compute the operand's compositing quadtree.

(ii) The opacity of a complex right operand of a binary operator must be evaluated explicitly if its left sibling requires a compositing quadtree.

(iii) The opacity of the complex child operand of a convolution/gradient/unsharp mask operator must be represented either as bounding box or a quadtree, but not as a combination of both. The opacity is required to perform the necessary processing on the opacity as a result of the convolution operation.

(iv) If the opacity of one or both operands of a binary operator contain a bounding box, then Table 12 dictates the form of the resulting opacity of the parent node. If an operand's opacity is implicitly represented as a combination of a bounding box and a quadtree, then Table 12 also dictates cases where the information needs to be explicitly evaluated.

At the next step 5109, the node is tagged as to whether its compositing/obscurance quadtree needs to be determined in the next GOB tree traversal. The process continues at step 5111, where if the bottom-up traversal has not finished the process returns to step 5105, where the traversal proceeds to the next node. Otherwise, the process proceeds to the next step 5113, where a top-down traversal of the GOB tree is begun starting at the root node of the GOB tree and proceeding to the first node. The root node's obscurance quadtree comprises a single visible node, signifying that this node is visible everywhere. At each node, a decision is made as to whether a compositing or an obscurance quadtree needs to be determined. At the next step 5115, if the node is the left operand of a binary operator and its bounding box is large, then the process proceeds to step 5117 where the node's compositing quadtree is determined. Otherwise, the process continues to the next step 5119, where if the node is large and it is the right operand of a binary operator, then the process proceeds to step 5121, where the node's obscurance quadtree is determined. Otherwise, the process continues to the next step 5123, where if the node is small and it is the right operand of a binary in, rin, out or ratop operator, then the process proceeds to step 5125, where the node's obscurance quadtree is determined. Otherwise, the process continues to the next step 5127, where if the node is a child operand of a unary operator, then the process proceeds to step 5129, where the node's obscurance quadtree is computed. A compositing quadtree is not needed for unary operators since no compositing operations are performed. Otherwise, the process continues to the next step 5131, where the node's parents' obscurance quadtrees are propagated down and becomes the node's obscurance quadtree. The obscurance and compositing quadtrees determined at one of steps 5117, 5121, 5125, 5129 and 5131 for the node are passed down to any children of the node at the next step 5133. The process continues at the next step 5135, where if the top-down traversal of the GOB tree has not finished, then the process continues to step 5137, where the traversal proceeds to the next node. Otherwise the process concludes.

The aforementioned preferred methods comprise a particular control flow. There are many other variants of the preferred methods which use different control flows without departing the spirit or scope of the invention. Furthermore one or more of the steps of the preferred methods may be performed in parallel rather sequential.

15.0 Preferred Apparatus

Figure 29:
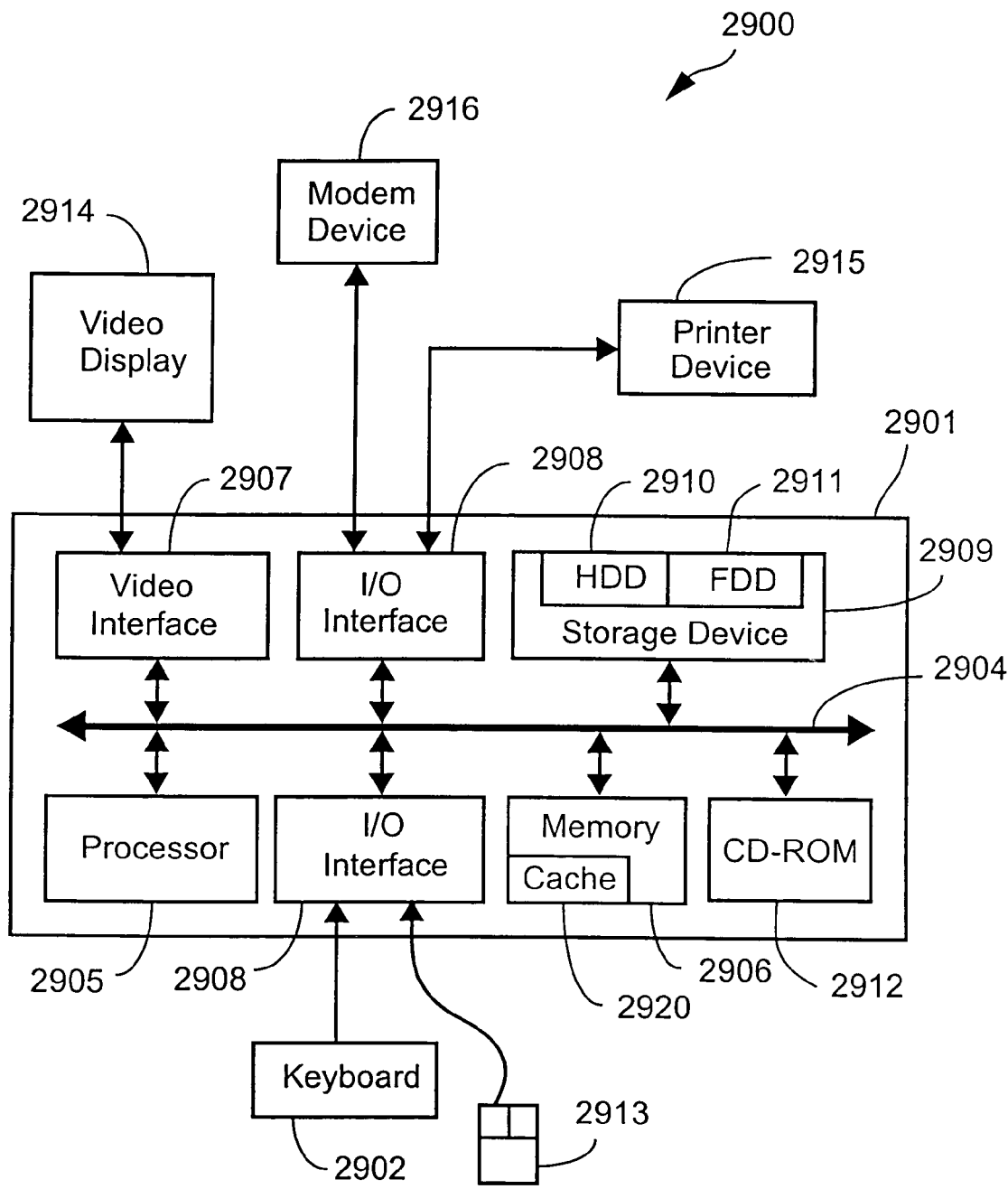
FIG. 29 is a schematic block diagram of a general purpose computer upon which the preferred embodiment of the present invention can be practiced.

The methods described above are preferably practiced using a general-purpose computer system 2900, such as that shown in FIG. 29 wherein the processes of FIGS. 1 to 28 and 30 to 51 can be implemented as software, such as an application program executing within the computer system 2900. In particular, the steps of the methods can be effected by instructions in the software that are carried out by the computer. The instructions may be formed as one or more code modules, each for performing one or more particular tools. The software may be divided into two separate parts; one part for carrying out the methods; and another part to manage the user interface between the latter and the user. The software may be stored in a computer readable medium, including the storage devices described below, for example.

The software is loaded into the computer from the computer readable medium, and then executed by the computer. A computer readable medium having such software or computer program recorded on it is a computer program product. The use of the computer program product in the computer preferably effects an advantageous apparatus for performing the methods described above.

The computer system 2900 comprises a computer module 2901, input devices such as a keyboard 2902 and mouse 2903, output devices including a printer 2915 and a display device 2914. A Modulator-Demodulator (Modem) transceiver device 2916 is used by the computer module 2901 for communicating to and from a communications network 2920, for example connectable via a telephone line 2921 or other functional medium. The modem 2916 can be used to obtain access to the Internet, and other network systems, such as a Local Area Network (LAN) or a Wide Area Network (WAN).

The computer module 2901 typically includes at least one processor unit 2905, a memory unit 2906, for example formed from semiconductor random access memory (RAM) and read only memory (ROM), input/output (I/O) interfaces including a video interface 2907, and an I/O interface 2913 for the keyboard 2902 and mouse 2903 and optionally a joystick (not illustrated), and an interface 2908 for the modem 2916. A storage device 2909 is provided and typically includes a hard disk drive 2910 and a floppy disk drive 2911. A magnetic tape drive (not illustrated) may also be used. A CD-ROM drive 2912 is typically provided as a non-volatile source of data. The components 2905 to 2913 of the computer module 2901, typically communicate via an interconnected bus 2904 and in a manner which results in a conventional mode of operation of the computer system 2900 known to those in the relevant art. Examples of computers on which the embodiments can be practised include IBM-PC's and compatibles, Sun Sparcstations or alike computer systems evolved therefrom.

Typically, the application program is preferably resident on the hard disk drive 2910 and read and controlled in its execution by the processor 2905. Intermediate storage of the program and any data fetched from the network 2920 may be accomplished using the semiconductor memory 2906, possibly in concert with the hard disk drive 2910. In some instances, the application program may be supplied to the user encoded on a CD-ROM or floppy disk and read via the corresponding drive 2912 or 2911, or alternatively may be read by the user from the network 2920 via the modem device 2916. Still further, the software can also be loaded into the computer system 2900 from other computer readable medium including magnetic tape, a ROM or integrated circuit, a magneto-optical disk, a radio or infra-red transmission channel between the computer module 2901 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The methods described above can alternatively be implemented in dedicated hardware. such as one or more integrated circuits performing the functions or sub functions of FIGS. 1 to 28 and 30 to 51. Such dedicated hardware may include graphic processors, digital signal processors, or one or more microprocessors and associated memories.

The foregoing describes only some embodiments of the present invention, and modifications and/or changes can be made thereto without departing from the scope and spirit of the invention, the embodiments being illustrative and not restrictive. For example, bounding boxes can be used to represent opacity, obscurance and compositing information for an image, in accordance with the above described embodiments.

The invention claimed is:

1. A method of creating an image using a computer comprised of a processor and a memory, the image being formed by rendering a plurality of graphical objects to be composited according to an expression tree representing a compositing expression for the image, the expression tree including a plurality of nodes each representing an object of the image or an operation for combining sub-expressions of the compositing expression, said method comprising the steps of:

determining an opacity region representation for each leaf node of the nodes of the expression tree, the opacity region representation comprising one or more of three predetermined values, each predetermined value distinctly identifying whether a corresponding region of an object represented by the leaf node is an opaque region, a transparent region or a partially transparent region such that the opacity region representation simultaneously represents each opaque region, transparent region and partially transparent region of the object represented by the leaf node, wherein a union of each opacity region representation for the expression tree includes at least one of each of the three predetermined values;

determining an obscurance region representation for at least one leaf node based on an analysis of the opacity region representation associated with the at least one leaf node, such that, for the image, the at least one leaf node simultaneously comprises both the opacity region representation and the obscurance region representation, with the obscurance region representation being separate from the opacity region representation of the at least one leaf node, the obscurance region representation being assigned one or more of a plurality of further predetermined values, each further predetermined value of the obscurance region representation distinctly identifying whether a corresponding region of the object represented by the at least one leaf node is hidden by another object or is visible in the image;

partitioning the object into a plurality of regions;

overlaying the obscurance region representation on the partitioned object such that the partitioned object is substantially encompassed within the obscurance region representation;

traversing the overlaid obscurance region representation to identify any of the plurality of regions of the partitioned object which include at least a portion of the visible region;

rendering the identified regions of the object that are visible in the image, based on the traversal of the overlayed obscurance region representation to create the image, wherein the opacity region representation and the obscurance region representation are associated with the same leaf node; and outputting the formed image to an image output device.

2. The method according to claim 1, said method including the further step of traversing the expression tree to detect the node including the obscurance region representation.

3. The method according to claim 1, wherein the obscurance region representation is traversed for each of the plurality of regions of the partitioned object.

4. The method according to claim 1, said method including the further step of producing a map for the plurality of regions, wherein the map at least indicates any region which includes at least a portion of the visible region.

5. The method according to claim 4, wherein the map includes a flag for each of the regions which includes at least a portion of the visible region.

6. The method according to claim 4, wherein the map is produced using run-length encoding.

7. The method according to claim 4, wherein the map is traversed in a predetermined order to determine the identified regions.

8. The method according to claim 1, said method including the further step of converting the expression tree into a right leaning expression tree.

9. The method according to claim 1, wherein the expression tree is a graphic object tree.

10. The method according to claim 1, wherein the obscurance region representation is a quadtree.

11. A computer apparatus having a processor and a memory for creating an image, the image being formed by rendering a plurality of graphical objects to be composited according to an expression tree representing a compositing expression for the image, the expression tree including a plurality of nodes each representing an object of the image or an operation for combining sub-expressions of the compositing expression, said apparatus further comprising:

opacity region representation determining means for determining an opacity region representation for each leaf node of the nodes of the expression tree, the opacity region representation comprising one or more of three predetermined values, each predetermined value distinctly identifying whether a corresponding region of an object represented by the leaf node is an opaque region, a transparent region or a partially transparent region such that the opacity region representation simultaneously represents each opaque region, transparent region and partially transparent region of the object represented by the leaf node, wherein a union of each opacity region representation for the expression tree includes at least one of each of the three predetermined values;

obscurance region representation determining means for determining an obscurance region representation for at least one leaf node of the expression tree based on an analysis of the opacity region representation associated with the at least one leaf node, such that, for the image, the at least one leaf node simultaneously comprises both the opacity region representation and the obscurance region representation, with the obscurance region representation being separate from the opacity region representation of the at least one leaf node, the obscurance region representation being assigned one or more of a plurality of further predetermined values, each further predetermined value of the obscurance region representation distinctly identifying whether a corresponding region of the object represented by the at least one leaf node is hidden by another object or is visible in the image;

partitioning means for partitioning the object into a plurality of regions;

overlaying means for overlaying the obscurance region representation on the partitioned object such that the partitioned object is substantially encompassed within the obscurance region representation;

traversing means for traversing the overlaid obscurance region representation to identify any of the plurality of regions of the partitioned object which include at least a portion of the visible region;

rendering means for rendering the identified regions of the object that are visible in the image, based on the traversal of the overlayed obscurance region representation to create the image, wherein the opacity region representation and the obscurance region representation are associated with the same leaf node; and an image output device for outputting the formed image.

12. The apparatus according to claim 11, wherein said traversing means further traverses the expression tree to detect the node including the obscurance region representation.

13. The apparatus according to claim 11, wherein the obscurance region representation is traversed for each of the plurality of regions of the partitioned object.

14. The apparatus according to claim 11, further comprising map producing means for producing a map for the plurality of regions, wherein the map at least indicates any region which includes at least a portion of the visible region.

15. The apparatus according to claim 11, wherein the expression tree is a graphic object tree.

16. The apparatus according to claim 11, wherein the obscurance region representation is a quadtree.

17. A computer-readable storage medium storing computer-executable instructions causing a computer to perform a method of creating an image, the image being formed by rendering a plurality of graphical objects to be composited according to an expression tree representing a compositing expression for the image, the expression tree including a plurality of nodes each representing an object of the image or an operation for combining sub-expressions of the compositing expression, said computer-readable storage medium comprising:

means for determining an opacity region representation for each leaf node of the nodes of the expression tree, the opacity region representation comprising one or more of three predetermined values, each predetermined value distinctly identifying whether a corresponding region of an object represented by the leaf node is an opaque region, a transparent region or a partially transparent region such that the opacity region representation simultaneously represents each opaque region, transparent region and partially transparent region of the object represented by the leaf node, wherein a union of each opacity region representation for the expression tree includes at least one of each of the three predetermined values;

means for determining an obscurance region representation for at least one leaf node based on an analysis of the opacity region representation associated with the at least one leaf node, such that, for the image, the at least one leaf node simultaneously comprises both the opacity region representation and the obscurance region representation, with the obscurance region representation being separate from the opacity region representation of the at least one leaf node, the obscurance region representation being assigned one or more of a plurality of further predetermined values, each further predetermined value of said obscurance region representation distinctly identifying whether a corresponding region of the object represented by the at least one leaf node is hidden by another object or is visible in the image;

means for partitioning the object into a plurality of regions;

means for overlaying the obscurance region representation on the partitioned object such that the partitioned object is substantially encompassed within the obscurance region representation;

means for traversing the overlayed obscurance region representation to identify any of the plurality of regions of the partitioned object which include at least a portion of the visible region;

means for rendering the identified regions of the object that are visible in the image, based on the traversal of the overlayed obscurance region representation to create the image, wherein the opacity region representation and the obscurance region representation are associated with the same leaf node; and means for outputting the formed image to an image output device.

18. A method of creating an image using a computer comprised of a processor and a memory, the image being formed by rendering at least a plurality of graphical objects to be composited according to an expression tree, the expression tree representing a compositing expression for the image and comprising a plurality of nodes, each node of the expression tree representing an object of the image or an operation for combining sub-expressions of the compositing expression, said method comprising the steps of:

determining an opacity region representation for each leaf node of the nodes of the expression tree, the opacity region representation comprising one or more of three predetermined values, each predetermined value distinctly identifying whether a corresponding region of an object represented by the leaf node is an opaque region, a transparent region or a partially transparent region such that the opacity region representation simultaneously represents each opaque region, transparent region and partially transparent region of the object represented by the leaf node; and determining an obscurance region representation for at least one leaf node of the expression tree based on an analysis of the opacity region representation associated with the at least one leaf node, such that, for the image, the at least one node simultaneously comprises both the opacity region representation and the obscurance region representation, with the obscurance region representation being separate from the opacity region representation of the at least one leaf node, the obscurance region representation being assigned one or more of a plurality of further predetermined values, each further predetermined value of the obscurance region representation distinctly identifying whether a corresponding region of the object represented by the node is hidden by another object or is visible in the image;

rendering the regions of the object that are visible in the image, based on a traversal of the obscurance region representation, to create the image, wherein the opacity region representation and the obscurance region representation are associated with the same leaf node; and outputting the formed image to an image output device.

19. The method according to claim 18, wherein the opacity region representation is a first hierarchical structure.

20. The method according to claim 19, wherein the first hierarchical structure is dependent on an operation associated with a node for which the first hierarchical structure is constructed.

21. The method according to claim 19, wherein each leaf node of the first hierarchical structure is assigned one of the predetermined values depending on an opacity of a region associated with the leaf node.

22. The method according to claim 19, wherein each node of the first hierarchical structure comprises a pointer indicating children nodes associated with the node.

23. The method according to claim 18, wherein the obscurance region representation is a second hierarchical structure.

24. The method according to claim 23, wherein the second hierarchical structure for a node is constructed by combining any first hierarchical structures associated with the node.

25. The method according to claim 23, wherein the second hierarchical structure is a quadtree.

26. The method according to claim 18, said method comprising the further step of identifying nodes representing a complex graphical object.

27. The method according to claim 26, said method comprising the further step of determining an opacity region representation for each node identified.

28. The method according to claim 18, wherein an opacity region representation of a child node is at least propagated to a parent node associated with the child node.

29. The method according to claim 18, wherein an obscurance region representation of a parent node is at least propagated to a child node associated with the parent node.

30. The method according to claim 18, said method including the further step of converting the expression tree into a right leaning tree.

31. The method according to claim 18, wherein the opacity region representation is a bounding box.

32. The method according to claim 18, wherein the obscurance region representation is a bounding box.

33. A computer apparatus having a processor and a memory for creating an image, the image being formed by rendering at least a plurality of graphical objects to be composited according to an expression tree, the expression tree representing a compositing expression for the image and comprising a plurality of nodes, each node of the expression tree representing an object of the image or an operation for combining sub-expressions of the compositing expression, said apparatus further comprising:

means for determining an opacity region representation for each leaf node of the nodes of the expression tree, the opacity region representation comprising one or more of three predetermined values, each predetermined value distinctly identifying whether a corresponding region of an object represented by the leaf node is an opaque region, a transparent region or a partially transparent region such that the opacity region representation simultaneously represents each opaque region, transparent region and partially transparent region of the object represented by the leaf node; and means for determining an obscurance region representation for at least one leaf node of the expression tree based on an analysis of the opacity region representation associated with the at least one leaf node, such that, for the image, the at least one node simultaneously comprises both the opacity region representation and the obscurance region representation, with the obscurance region representation being separate from the opacity region representation of the at least one leaf node, the obscurance region representation being assigned one or more of a plurality of further predetermined values, each further predetermined value of the obscurance region representation distinctly identifying whether a corresponding region of the object represented by the node is hidden by another object or is visible in the image;

means for rendering the regions of the object that are visible in the image, based on a traversal of the obscurance region representation, to create the image, wherein the opacity region representation and the obscurance region representation are associated with the same leaf node; and an image output device for outputting the formed image.

34. The apparatus according to claim 33, wherein the opacity region representation is a first hierarchical structure.

35. The apparatus according to claim 33, wherein the obscurance region representation is a second hierarchical structure.

36. The apparatus according to claim 35, wherein the second hierarchical structure is a quadtree.

37. The apparatus according to claim 33, further comprising means for identifying nodes representing a complex graphical object.

38. The apparatus according to claim 37, further comprising means for determining an opacity region representation for each node identified.

39. The apparatus according to claim 33, wherein the opacity region representation is a bounding box.

40. The apparatus according to claim 33, wherein the obscurance region representation is a bounding box.

41. A computer-readable storage medium storing computer-executable instructions causing a computer to perform a method of creating an image, the image being formed by rendering at least a plurality of graphical objects to be composited according to an expression tree, the expression tree representing a compositing expression for the image and comprising a plurality of nodes, each node of the expression tree representing an object of the image or an operation for combining sub-expressions of the compositing expression, said computer-readable storage medium comprising:

means for determining an opacity region representation for each leaf node of the nodes of the expression tree, the opacity region representation comprising one or more of three predetermined values, each predetermined value distinctly identifying whether a corresponding region of an object represented by the leaf node is an opaque region, a transparent region or a partially transparent region such that the opacity region representation simultaneously represents each opaque region, transparent region and partially transparent region of the object represented by the leaf node;

means for determining an obscurance region representation for at least one leaf node of the expression tree based on an analysis of the opacity region representation associated with the at least one leaf node, such that, for the image, the at least one leaf node simultaneously comprises both the opacity region representation and the obscurance region representation, with the obscurance region representation being separate from the opacity region representation of the at least one leaf node, the obscurance region representation being assigned one or more of a plurality of further predetermined values, each further predetermined value of the obscurance region representation distinctly identifying whether a corresponding region of the object represented by the node is hidden by another object or is visible in the image;

means for rendering the regions of the object that are visible in the image, based on a traversal of the obscurance region representation, to create the image, wherein the opacity region representation and the obscurance region representation are associated with the same leaf node; and means for outputting the formed image to an image output device.

42. A method of creating an image using a computer comprised of a processor and a memory, the image being formed by rendering at least a plurality of graphical objects to be composited according to an expression tree, the expression tree representing a compositing expression for the image and comprising a plurality of nodes, each node of the expression tree representing an object of the image or an operation for combining sub-expressions of the compositing expression, said method comprising the steps of:

performing a first traversal of the expression tree to determine an opacity region representation for each leaf node of the expression tree, the opacity region representation comprising one or more of three predetermined values, each predetermined value distinctly identifying whether a corresponding region of an object represented by the leaf node is an opaque region, a transparent region or a partially transparent region such that the opacity region representation simultaneously represents each opaque region, transparent region and partially transparent region of the object represented by the leaf node;

identifying leaf nodes of the expression tree, for which compositing information is required, depending on the opacity region representation associated with each leaf node;

performing a second traversal of the expression tree to determine compositing region representations for each identified leaf node of the expression tree, such that, for the image, the leaf node simultaneously comprises both the opacity region representation and the compositing region representation, wherein the compositing region representation for each leaf node is separate from the opacity region representation for each leaf node and is determined using the opacity region representation determined for each leaf node, and wherein the compositing region representation indicates at least regions of an object represented by the leaf node that are hidden by another object, load regions and visible regions;

rendering the regions of the object that are visible in the image, based on a traversal of the compositing region representation, to create the image, wherein the opacity region representation and the compositing region representation are associated with the same leaf node; and outputting the formed image to an image output device.

43. The method according to claim 42, wherein the compositing information is represented by a first hierarchical structure.

44. The method according to claim 43, wherein the opacity region representation comprises a second hierarchical structure representing an opacity of a region associated with a node.

45. The method according to claim 44, wherein opacity region representation of a child node is at least propagated to a parent node associated with the child node.

46. The method according to claim 45, wherein an opacity region representation of the parent node is determined by merging at least two second hierarchical structures.

47. The method according to claim 45, wherein opacity region representation of the parent node is determined by merging at least one second hierarchical structure and a bounding box.

48. The method according to claim 43, wherein the first hierarchical structure is dependent on the opacity region representation.

49. The method according to claim 42, wherein the opacity region representation is a bounding box representing an opacity of a region associated with a node.

50. The method according to claim 42, wherein the first traversal is a bottom-up traversal.

51. The method according to claim 42, wherein the second traversal is a top-down traversal.

52. The method according to claim 51, wherein a first hierarchical structure of a parent node is at least propagated to a child node associated with the parent node.

53. A computer apparatus having a processor and a memory for creating an image, the image being formed by rendering at least a plurality of graphical objects to be composited according to an expression tree, the expression tree representing a compositing expression for the image and comprising a plurality of nodes, each node of the expression tree representing an object of the image or an operation for combining sub-expressions of the compositing expression, said apparatus further comprising:

> means for performing a first traversal of the expression tree to determine an opacity region representation for each leaf node of the nodes of the expression tree, the opacity region representation comprising one or more of three predetermined values, each predetermined value distinctly identifying whether a corresponding region of an object represented by the leaf node is an opaque region, a transparent region or a partially transparent region such that the opacity region representation simultaneously represents each opaque region, transparent region and partially transparent region of the object represented by the leaf node;
>
> means for identifying leaf nodes of the nodes of the expression tree, for which compositing information is required, depending on the opacity region representation associated with each node;
>
> means for performing a second traversal of the expression tree to determine compositing region representations for each identified leaf node, such that, for the image, the leaf node simultaneously comprises both the opacity region representation and the composite region representation, wherein the compositing region representation for each leaf node is separate from the opacity region representation for the leaf node and is determined using the opacity region representation determined for each leaf node, and wherein the compositing region representation indicates at least regions of an object represented by the node that are hidden by another object, load regions and visible regions;
>
> means for rendering the regions of the object that are visible in the image, based on a traversal of the compositing region representation, to create the image, wherein the opacity region representation and the compositing region representation are associated with the same leaf node; and
>
> an image output device for outputting the formed image.

54. A computer-readable storage medium storing computer-executable instructions causing a computer to perform a method of creating an image, the image being formed by rendering at least a plurality of graphical objects to be composited according to an expression tree, the expression tree representing a compositing expression for the image and comprising a plurality of nodes, each node of the expression tree representing an object of the image or an operation for combining sub-expressions of the compositing expression, said computer-readable storage medium comprising:

> means for performing a first traversal of the expression tree to determine an opacity region representation for each leaf node of the nodes of the expression tree, the opacity region representation comprising one or more of three predetermined values, each predetermined value distinctly identifying whether a corresponding region of an object represented by the leaf node is an opaque region, a transparent region or a partially transparent region such that the opacity region representation simultaneously represents each opaque region, transparent region and partially transparent region of the object represented by the leaf node;
>
> identifying leaf nodes of the expression tree for which compositing information is required, depending on the opacity region representation associated with each leaf node;
>
> means for performing a second traversal of the expression tree to determine compositing region representations for each identified leaf node, such that, for the image, the leaf node simultaneously comprises both the opacity region representation and the compositing region representation, wherein the compositing region representation for each leaf node is separate from the opacity region representation for each leaf node and is determined using the opacity region representation determined for each leaf node, and wherein the compositing region representation indicates at least regions of an object represented by the node that are hidden by another object, load regions and visible regions;
>
> means for rendering the regions of the object that are visible in the image, based on a traversal of the compositing region representation, to create the image, wherein the opacity region representation and the compositing region representation are associated with the same leaf node; and
>
> means for outputting the formed image to an image output device.

* * * * *

UNITED STATES PATENT AND TRADEMARK OFFICE
CERTIFICATE OF CORRECTION

PATENT NO. : 7,292,255 B2
APPLICATION NO. : 09/863405
DATED : November 6, 2007
INVENTOR(S) : Khanh Phi Van Doan et al.

It is certified that error appears in the above-identified patent and that said Letters Patent is hereby corrected as shown below:

SHEET 30:

FIG. 41, "oscurance" should read --obscurance--.

Figure 42B:
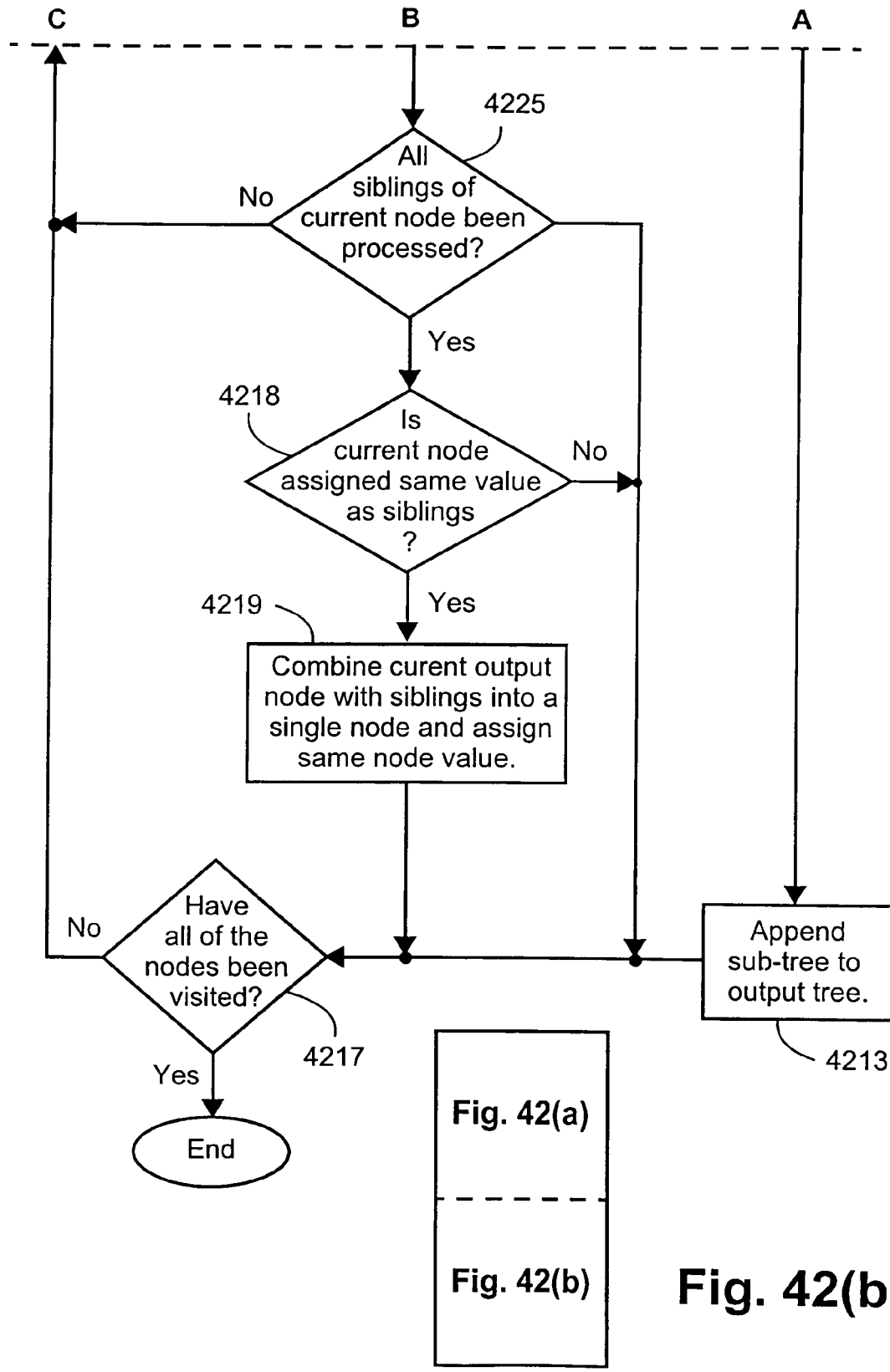
FIG. 42 is a flow chart showing a method for propagating opacity quadtrees for each node during the first traversals of the GOB tree in accordance with the method of FIG. 41.

SHEET 32:

FIG. 42(b), "curent" should read --current--.

COLUMN 2:

Line 37, "fall" should read --full--.

COLUMN 6:

Line 19, "expression-and" should read --expression and--.

COLUMN 7:

Line 53, "ated-with" should read --ated with--.

COLUMN 14:

Line 64, "composite-object" should read --composite object--.

COLUMN 17:

Line 47, "$Q_{p\cup\{QR}='o'\}$" should read --$Q_p \cup \{Q_R='o'\}$--.
    Line 60, "$Q_pU\{Q_R='o'$" should read --$Q_p \cup \{Q_R='o'$--.

COLUMN 19:

Line 50, "about-" should read --about--.

COLUMN 25:

Line 9, "and 'o'" should read --and '$\alpha$'--.

UNITED STATES PATENT AND TRADEMARK OFFICE
CERTIFICATE OF CORRECTION

PATENT NO. : 7,292,255 B2
APPLICATION NO. : 09/863405
DATED : November 6, 2007
INVENTOR(S) : Khanh Phi Van Doan et al.

It is certified that error appears in the above-identified patent and that said Letters Patent is hereby corrected as shown below:

COLUMN 32:

Line 56, "fill," should read --full,--.

COLUMN 33:

Line 33, "$\alpha \cdot (1/28700) \cdot area_{obj} \cdot (resolution/72) > 0.082 \times 10^-_6 \cdot perimeter \cdot 3N$" should read --$\alpha \cdot (1/28700) \cdot area_{obj} \cdot (resolution/72) > 0.082 \times 10^{-6} \cdot perimeter \cdot 3N$.--.

COLUMN 47:

Line 67, "fall" should read --full--.

Signed and Sealed this

Third Day of February, 2009

JOHN DOLL
*Acting Director of the United States Patent and Trademark Office*